(12) United States Patent
    Teraoka

(10) Patent No.: US 11,734,663 B2
(45) Date of Patent: Aug. 22, 2023

(54) PRODUCT SALES DATA PROCESSING SYSTEM AND WEIGHING APPARATUS

(71) Applicant: Teraoka Seiko Co., Ltd., Tokyo (JP)

(72) Inventor: Kazuharu Teraoka, Tokyo (JP)

(73) Assignee: Teraoka Seiko Co., Ltd., Tokyo (JP)

( * ) Notice: Subject to any disclaimer, the term of this patent is extended or adjusted under 35 U.S.C. 154(b) by 180 days.

(21) Appl. No.: 17/144,569

(22) Filed: Jan. 8, 2021

(65) Prior Publication Data

US 2021/0216989 A1 Jul. 15, 2021

(30) Foreign Application Priority Data

Jan. 10, 2020 (JP) .................. 2020-003001
Feb. 14, 2020 (JP) .................. 2020-023680

(51) Int. Cl.
| | | |
|---|---|---|
| G06Q 20/00 | (2012.01) | |
| G06Q 20/20 | (2012.01) | |
| G01B 21/22 | (2006.01) | |
| G01G 19/414 | (2006.01) | |
| G01G 23/14 | (2006.01) | |
| G01G 23/42 | (2006.01) | |
| G06K 1/22 | (2006.01) | |
| G06K 19/07 | (2006.01) | |
| G06K 15/02 | (2006.01) | |

(52) U.S. Cl.
CPC ........... *G06Q 20/208* (2013.01); *G01B 21/22* (2013.01); *G01G 19/4144* (2013.01); *G01G 23/14* (2013.01); *G01G 23/42* (2013.01); *G06K 1/22* (2013.01); *G06K 19/0723* (2013.01); *G06K 15/024* (2013.01)

(58) Field of Classification Search
CPC .... G06Q 20/208; G06K 1/22; G01G 19/4144; G01G 23/14
See application file for complete search history.

(56) References Cited

U.S. PATENT DOCUMENTS

2007/0050271 A1* 3/2007 Ufford ................ G06Q 10/087
                                                        705/28

FOREIGN PATENT DOCUMENTS

| EP | 2594911 A2 | 5/2013 | |
|---|---|---|---|
| EP | E P-2594911 A2 * | 5/2013 | ......... G01G 19/4144 |
| JP | H06-050740 A | 2/1994 | |
| JP | H06-50740 Y2 | 12/1994 | |
| JP | 2018-036911 A | 3/2018 | |

OTHER PUBLICATIONS

Extended European Search Report issued in corresponding European Patent Application 21150600.1 dated Oct. 4, 2021 (39 pages).

* cited by examiner

*Primary Examiner* — Rokib Masud
(74) *Attorney, Agent, or Firm* — Osha Bergman Watanabe & Burton LLP

(57) ABSTRACT

A product sales data processing system includes: a sensor attached to a bulk food container of a product; and a weighing apparatus. The sensor includes: a sensor module that detects displacement of the sensor; a memory that stores a sensor ID that identifies the sensor; and a transmitter that transmits the sensor ID stored in the memory when the sensor module detects a predetermined displacement value. The weighing apparatus includes: a receiver that receives the sensor ID transmitted from the sensor; and a display that displays product information associated with the sensor ID.

20 Claims, 59 Drawing Sheets

FIG. 4

| Product ID | Product Name | Weighing Category | Unit Price (¥) | Unit Weight (g) |
|---|---|---|---|---|
| SH001 | AAA | 0 (Variable-Weight) | 250 | 100 |
| SH002 | BBB | 0 (Variable-Weight) | 225 | 100 |
| SH003 | CCC | 0 (Variable-Weight) | 310 | 100 |
| SH004 | DDD | 0 (Variable-Weight) | 240 | 100 |
| ... | ... | ... | ... | ... |
| SH103 | ABC | 1 (Fixed-Weight) | 90 | 80 |
| SH104 | ABD | 1 (Fixed-Weight) | 70 | 50 |
| ... | ... | ... | ... | ... |
| SH150 | AAAA | 2 (Fixed-Amount) | 120 | — |
| SH151 | BBBB | 2 (Fixed-Amount) | 280 | — |
| ... | ... | ... | ... | ... |

FIG. 5

| Product ID | Product Button ID | Product Button Image |
|---|---|---|
| SH001 | B001 | Button-AAA.JPEG |
| SH002 | B012 | Button-BBB.JPEG |
| SH003 | B008 | Button-CCC.JPEG |
| SH004 | B020 | Button-DDD.JPEG |
| ... | ... | ... |
| SH103 | B089 | Button-ABC.JPEG |
| SH104 | B063 | Button-ABD.JPEG |
| ... | ... | ... |

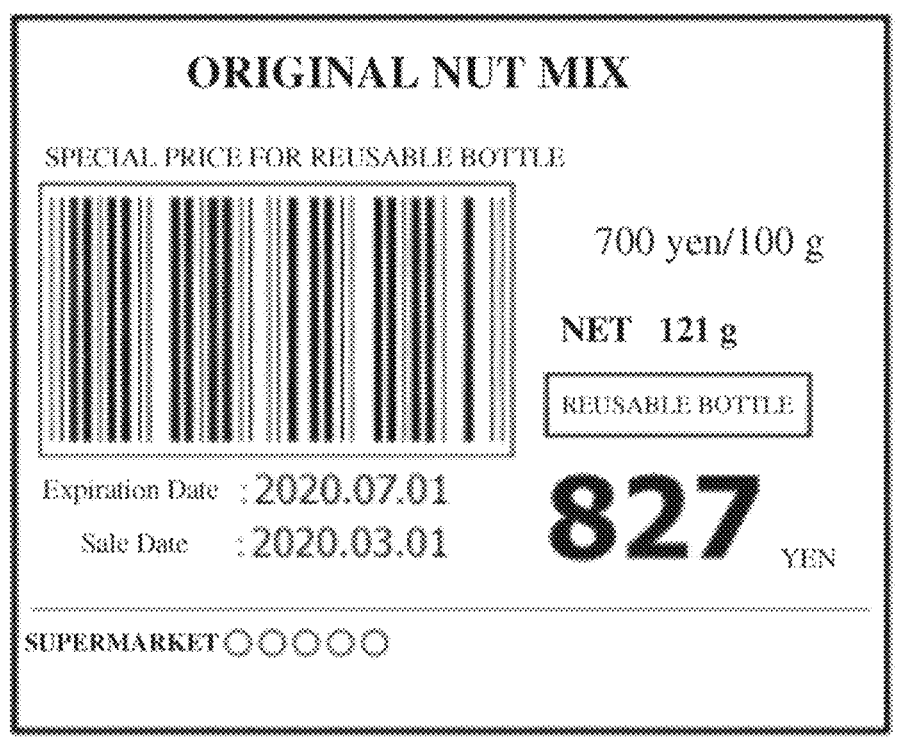

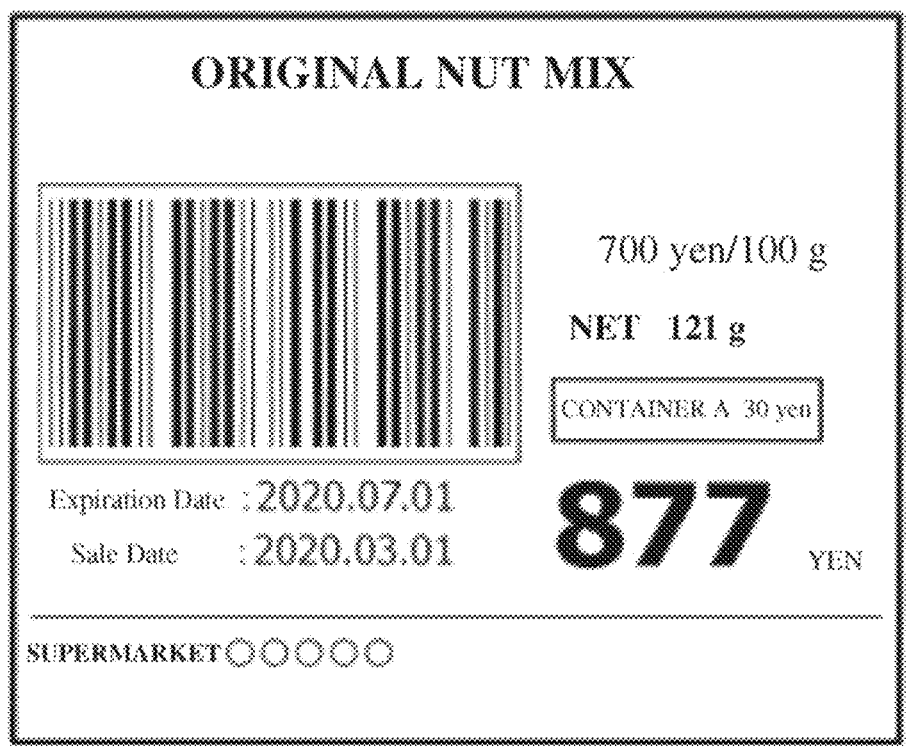

FIG. 18A

| Product Name | | Unit Price (¥/g) |
|---|---|---|
| Tare Weight (g) | Net (g) (Measured Weight (g)) | Price (¥) |

- Product A
- Product B
- Product C
- Product D
- Product E
- Product Search
- Reusable Container
- Store Container

FIG. 18B

| Product Name | | Unit Price (¥/g) |
|---|---|---|
| Tare Weight (g) | Net (g) (Measured Weight (g)) | Price (¥) |

- Product A (selected)
- Product B
- Product C
- Product D
- Product E
- Product Search
- Reusable Container
- Store Container

FIG. 18C

| Product Name Product A | | Unit Price (¥/g) 120 |
|---|---|---|
| Tare Weight (g) | Net (g) (Measured Weight (g)) | Price (¥) |

Please select the container containing Product A

- Reusable Container
- Store Container

FIG. 18D

| Product Name Product A | | Unit Price (¥/g) 120 |
|---|---|---|
| Tare Weight (g) | Net (g) (Measured Weight (g)) | Price (¥) |

Please select the container containing Product A

- Reusable Container (selected)
- Store Container

FIG. 19A

| Product Name Product A | Unit Price (¥/g) 120 |
|---|---|
| Tare Weight (g) Reusable container | Net (g) (Measured Weight (g)) | Price (¥) |

Please place the container
(reusable container)
containing Product A

FIG. 19B

| Product Name Product A | Unit Price (¥/g) 120 |
|---|---|
| Tare Weight (g) Reusable ☺ container 20 | Net (g) (Measured Weight (g)) (170) | Price (¥) |

The reusable container has
been recognized

FIG. 19C

| Product Name Product A | Unit Price (¥/g) 120 |
|---|---|
| Tare Weight (g) Reusable ☺ container 20 | Net (g) (Measured Weight (g)) 150 (170) | Price (¥) 180 (Container ¥0) |

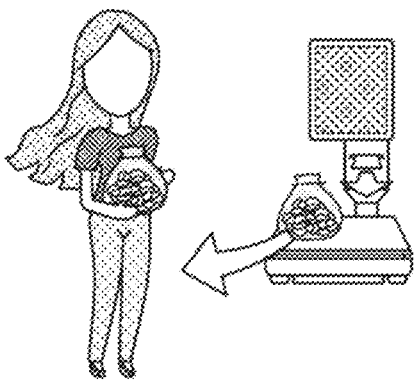

FIG. 19D

| Product Name Product A | Unit Price (¥/g) 120 |
|---|---|
| Tare Weight (g) Reusable ✕ container | Net (g) (Measured Weight (g)) (170) | Price (¥) |

The reusable container has not
been recognized

Please remount the reusable
container ( Call Staff )

FIG. 21A

| Product Name<br>Product A | | Unit Price (¥/g)<br>120 |
|---|---|---|
| Tare Weight (g)<br>Store container | Net (g)<br>(Measured Weight (g)) | Price (¥) |

Please select the store container containing Product A

[Container S 5 Yen] [Container M 7 Yen] [Container L 9 Yen]

FIG. 21B

| Product Name<br>Product A | | Unit Price (¥/g)<br>120 |
|---|---|---|
| Tare Weight (g)<br>Store container | Net (g)<br>(Measured Weight (g)) | Price (¥) |

Please select the store container containing Product A

[Container S 5 Yen] [Container M 7 Yen] [Container L 9 Yen]

FIG. 21C

| Product Name<br>Product A | | Unit Price (¥/g)<br>120 |
|---|---|---|
| Tare Weight (g)<br>Container M<br>12 | Net (g)<br>(Measured Weight (g)) | Price (¥) |

Please place the container (Container M) containing Product A

FIG. 21D

| Product Name<br>Product A | | Unit Price (¥/g)<br>120 |
|---|---|---|
| Tare Weight (g)<br>Container M<br>12 | Net (g)<br>(Measured Weight (g)) 150 (162) | Price (¥)<br>187<br>(Container ¥7) |

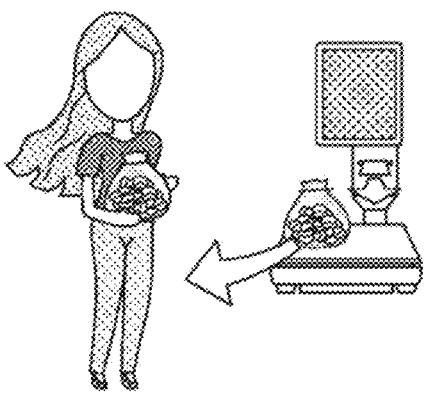

FIG. 22A, FIG. 22B, FIG. 22C, FIG. 22D

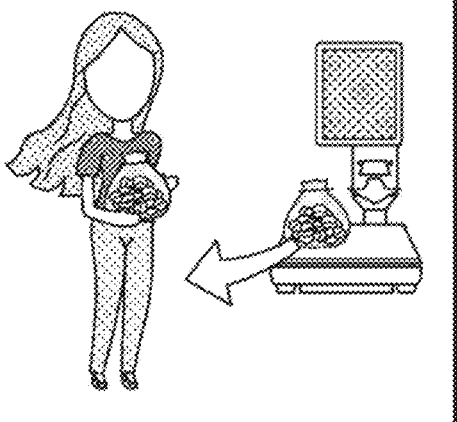

FIG. 24A

| Product Name | | Unit Price (¥/g) |
|---|---|---|
| Tare Weight (g) | Net (g) (Measured Weight (g)) | Price (¥) |

- Product A
- Product B
- Product C
- Product D
- Product E
- Product Search
- Reusable Container
- Store Container

FIG. 24B

| Product Name | | Unit Price (¥/g) |
|---|---|---|
| Tare Weight (g) | Net (g) (Measured Weight (g)) | Price (¥) |

- Product A (selected)
- Product B
- Product C
- Product D
- Product E
- Product Search
- Reusable Container
- Store Container

FIG. 24C

| Product Name Product A | | Unit Price (¥/g) 120 |
|---|---|---|
| Tare Weight (g) | Net (g) (Measured Weight (g)) | Price (¥) |

Please select the container containing Product A

- Reusable Container
- Store Container

FIG. 24D

| Product Name Product A | | Unit Price (¥/g) 120 |
|---|---|---|
| Tare Weight (g) Reusable container 20 | Net (g) (Measured Weight (g)) (170) | Price (¥) |

The reusable container has been recognized

FIG. 26A

| Product Name | | Unit Price (¥/g) |
|---|---|---|
| Tare Weight (g) | Net (g) (Measured Weight (g)) | Price (¥) |

Product A  Product B  Product C
Product D  Product E
Product Search
Reusable Container  Store Container

FIG. 26B

| Product Name | | Unit Price (¥/g) |
|---|---|---|
| Tare Weight (g) | Net (g) (Measured Weight (g)) | Price (¥) |

Product A  Product B  Product C
Product D  Product E
Product Search
Reusable Container  Store Container

FIG. 26C

| Product Name Product A | | Unit Price (¥/g) 120 |
|---|---|---|
| Tare Weight (g) | Net (g) (Measured Weight (g)) | Price (¥) |

Please select the container containing Product A

Reusable Container   Store Container

FIG. 26D

| Product Name Product A | | Unit Price (¥/g) 120 |
|---|---|---|
| Tare Weight (g) | Net (g) (Measured Weight (g)) (162) | Price (¥) |

The reusable container has not been recognized

Is the placed container a store container?

YES (Store Container)   NO (Reusable Container)

FIG. 27A

| Product Name | | Unit Price (¥/g) |
|---|---|---|
| Product A | | 120 |
| Tare Weight (g) | Net (g) (Measured Weight (g)) | Price (¥) |
| | (162) | |

The reusable container has not been recognized

Is the placed container a store container?

[ YES (Store Container) ]   [ NO (Reusable Container) ]

FIG. 27B

| Product Name | | Unit Price (¥/g) |
|---|---|---|
| Product A | | 120 |
| Tare Weight (g) Store container | Net (g) (Measured Weight (g)) | Price (¥) |
| | (162) | |

Please select the placed store container

[ Container S 5 Yen ]  [ Container M 7 Yen ]  [ Container L 9 Yen ]

FIG. 27C

| Product Name | | Unit Price (¥/g) |
|---|---|---|
| Product A | | 120 |
| Tare Weight (g) Store container | Net (g) (Measured Weight (g)) | Price (¥) |
| | (162) | |

Please select the placed store container

[ Container S 5 Yen ]  [ Container M 7 Yen ]  [ Container L 9 Yen ]

FIG. 27D

| Product Name | | Unit Price (¥/g) |
|---|---|---|
| Product A | | 120 |
| Tare Weight (g) Container M 12 | Net (g) (Measured Weight (g)) 150 (162) | Price (¥) 187 (Container ¥7) |

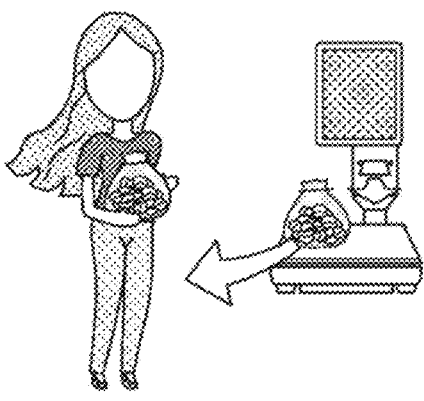

FIG. 29A

| Product Name | | Unit Price (¥/g) |
|---|---|---|
| Product A | | 120 |
| Tare Weight (g) | Net (g) (Measured Weight (g)) | Price (¥) |
| | (170) | |

The reusable container has not been recognized

Is the placed container a store container?

[ YES (Store Container) ]  [ NO (Reusable Container) ]

FIG. 29B

| Product Name | | Unit Price (¥/g) |
|---|---|---|
| Product A | | 120 |
| Tare Weight (g) Reusable × container | Net (g) (Measured Weight (g)) | Price (¥) |
| | (170) | |

The reusable container has not been recognized.
Please remount the reusable container.

[ Call Staff ]

FIG. 31A

| Product Name Product A | | Unit Price (¥/g) 120 |
|---|---|---|
| Tare Weight (g) Reusable container | Net (g) (Measured Weight (g)) | Price (¥) |

Please place the container (reusable container) containing Product A

FIG. 31B

| Product Name Product A | | Unit Price (¥/g) 120 |
|---|---|---|
| Tare Weight (g) Reusable container ◎ 20 | Net (g) (Measured Weight (g)) (170) | Price (¥) |

The reusable container has been recognized

FIG. 31C

| Product Name Product A | | Unit Price (¥/g) 120 |
|---|---|---|
| Tare Weight (g) Reusable container ◎ 20 | Net (g) (Measured Weight (g)) 150 (170) | Price (¥) 180 (Container ¥0) |

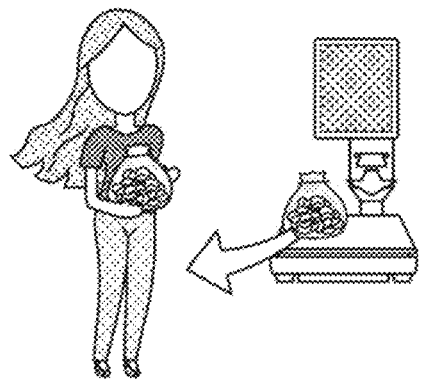

FIG. 31D

| Product Name Product A | | Unit Price (¥/g) 120 |
|---|---|---|
| Tare Weight (g) Reusable container × | Net (g) (Measured Weight (g)) (170) | Price (¥) |

The reusable container has not been recognized

Please remount the reusable container

[ Call Staff ]

FIG. 34A

| Product Name | | Unit Price (¥/g) |
|---|---|---|
| Tare Weight (g) | Net (g) (Measured Weight (g)) | Price (¥) |

Product A  Product B  Product C
Product D  Product E
Product Search
Reusable Container   Store Container

FIG. 34B

| Product Name | | Unit Price (¥/g) |
|---|---|---|
| Tare Weight (g) | Net (g) (Measured Weight (g)) | Price (¥) |

Product A  Product B  Product C
Product D  Product E
Product Search
Reusable Container   *Store Container* (highlighted)

FIG. 34C

| Product Name | | Unit Price (¥/g) |
|---|---|---|
| Tare Weight (g) Store container | Net (g) (Measured Weight (g)) | Price (¥) |

Please select a store container

Container S 5 Yen   Container M 7 Yen   Container L 9 Yen

FIG. 34D

| Product Name | | Unit Price (¥/g) |
|---|---|---|
| Tare Weight (g) Store container | Net (g) (Measured Weight (g)) | Price (¥) |

Please select a store container

Container S 5 Yen   *Container M 7 Yen* (highlighted)   Container L 9 Yen

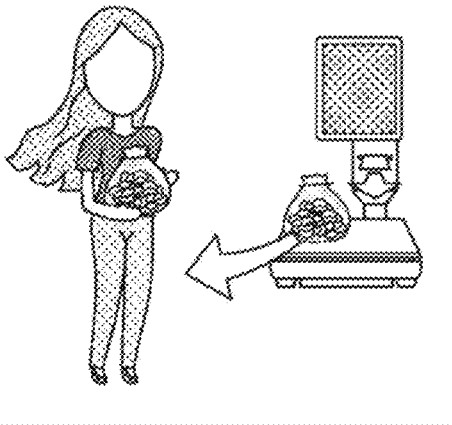

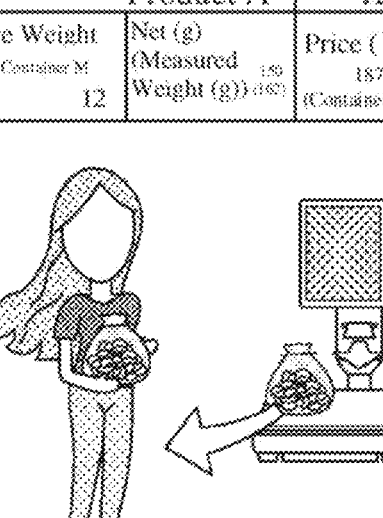

FIG. 37A

| Product Name | | Unit Price (¥/g) |
|---|---|---|
| Tare Weight (g) | Net (g) (Measured Weight (g)) | Price (¥) |

Product A  Product B  Product C
Product D  Product E
Product Search
Reusable Container    Store Container

FIG. 37B

| Product Name | | Unit Price (¥/g) |
|---|---|---|
| Tare Weight (g) | Net (g) (Measured Weight (g)) | Price (¥) |

Product A  Product B  Product C
Product D  Product E
Product Search
Reusable Container    Store Container

FIG. 37C

| Product Name | | Unit Price (¥/g) |
|---|---|---|
| Tare Weight (g) Store container | Net (g) (Measured Weight (g)) | Price (¥) |

Please select a store container

Container S 5 Yen    Container M 7 Yen    Container L 9 Yen

FIG. 37D

| Product Name | | Unit Price (¥/g) |
|---|---|---|
| Tare Weight (g) Store container | Net (g) (Measured Weight (g)) (162) | Price (¥) |

Please select a store container

Container S 5 Yen    Container M 7 Yen    Container L 9 Yen

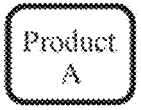

FIG. 39A
FIG. 39B
FIG. 39C
FIG. 39D

FIG. 41A

| Product Name | | | Unit Price (¥/g) |
|---|---|---|---|
| Tare Weight (g) | Net (g) (Measured Weight (g)) | | Price (¥) |

- Product A
- Product B
- Product C
- Product D
- Product E
- Product Search
- Reusable Container
- Store Container

FIG. 41B

| Product Name | | Unit Price (¥/g) |
|---|---|---|
| Tare Weight (g) | Net (g) (Measured Weight (g))_{(162)} | Price (¥) |

The reusable container has not been recognized

Is the placed container a store container?

- YES (Store Container)
- NO (Reusable Container)

FIG. 41C

| Product Name | | Unit Price (¥/g) |
|---|---|---|
| Tare Weight (g) | Net (g) (Measured Weight (g)) (162) | Price (¥) |

The reusable container has not been recognized

Is the placed container a store container?

- YES (Store Container)
- NO (Reusable Container)

FIG. 41D

| Product Name | | Unit Price (¥/g) |
|---|---|---|
| Tare Weight (g) | Net (g) (Measured Weight (g)) (162) | Price (¥) |

Please select the placed store container

- Container S 5 Yen
- Container M 7 Yen
- Container L 9 Yen

FIG. 42A

| Product Name | | Unit Price (¥/g) |
|---|---|---|
| Tare Weight (g) Store Container | Net (g) (Measured Weight (g)) | Price (¥) |

Please select the store container containing Product A

[Container S 5 Yen] [Container M 7 Yen] [Container L 9 Yen]

FIG. 42B

| Product Name | | Unit Price (¥/g) |
|---|---|---|
| Tare Weight (g) Container M 12 | Net (g) (Measured Weight (g)) | Price (¥) |

[Product A] [Product B] [Product C]
[Product D] [Product E]
[Product Search]

FIG. 42C

| Product Name | | Unit Price (¥/g) |
|---|---|---|
| Tare Weight (g) Container M 12 | Net (g) (Measured Weight (g)) | Price (¥) |

[Product A] [Product B] [Product C]
[Product D] [Product E]
[Product Search]

FIG. 42D

| Product Name | Product A | Unit Price (¥/g) 120 |
|---|---|---|
| Tare Weight (g) Container M 12 | Net (g) (Measured Weight (g)) | Price (¥) 187 (Container ¥7) |

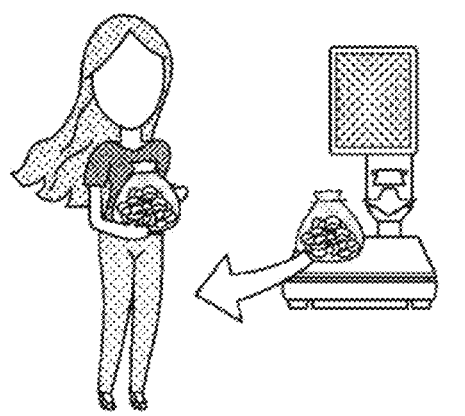

FIG. 43A

| Product Name | | Unit Price (¥/g) |
|---|---|---|
| Tare Weight (g) | Net (g) (Measured Weight (g)) | Price (¥) |

Product A  Product B  Product C
Product D  Product E

Product Search

Reusable Container    Store Container

FIG. 43B

| Product Name | | Unit Price (¥/g) |
|---|---|---|
| Tare Weight (g) | Net (g) (Measured Weight (g)) (170) | Price (¥) |

The reusable container has not been recognized

Is the placed container a store container?

YES (Store Container)    NO (Reusable Container)

FIG. 43C

| Product Name | | Unit Price (¥/g) |
|---|---|---|
| Tare Weight (g) | Net (g) (Measured Weight (g)) (170) | Price (¥) |

The reusable container has not been recognized

Is the placed container a store container?

YES (Store Container)    NO (Reusable Container)

FIG. 43D

| Product Name | | Unit Price (¥/g) |
|---|---|---|
| Tare Weight (g) Reusable container ✕ | Net (g) (Measured Weight (g)) (170) | Price (¥) |

The reusable container has not been recognized

Please remount the reusable container

Call Staff

| Sensor ID | Product button ID |
|---|---|
| K001 | B001 |
| K002 | B012 |
| K003 | B008 |
| K004 | B020 |
| ... | ... |
| K025 | B089 |
| K026 | B063 |
| ... | ... |

| Reception time | Sensor ID | Product button ID | Automatic deletion time |
|---|---|---|---|
| 15:33:40 | K004 | B020 | 15:38:40 |
| 15:36:12 | K001 | B001 | 15:41:12 |
| ... | ... | ... | ... |

# PRODUCT SALES DATA PROCESSING SYSTEM AND WEIGHING APPARATUS

BACKGROUND

Technical Field

The present invention generally relates to a product sales data processing system and a weighing apparatus.

Related Art

Conventional systems are used for weighing and selling products.

Patent Document 1: Japanese examined utility model application publication No. H6-50740

In the above conventional systems, there was room for improvement in the sales of products that were weighed and sold.

SUMMARY

According to one or more embodiments, it is possible to improve the sales of products that are weighed and sold.

According to one or more embodiments, a product sales data processing system includes: a sensor attached to a bulk food container of a product; and a weighing apparatus. The sensor includes: a sensor module that detects displacement of the sensor; a memory that stores a sensor ID that identifies the sensor; and a transmitter that transmits the sensor ID stored in the memory when the sensor module detects a predetermined displacement value. The weighing apparatus includes: a receiver that receives the sensor ID transmitted from the sensor; and a display that displays product information associated with the sensor ID.

According to one or more embodiments, a weighing apparatus includes: a weighing scale that measures a tare weight that is a weight of a container owned by a user when the container is empty; a reader/writer that writes the tare weight to a non-contact IC medium attached to a label; and a display that displays that the writing of the tare weight has been completed.

BRIEF DESCRIPTION OF THE DRAWINGS

FIG. 4 is an example of the information stored in the weighing apparatus according to one or more embodiments.

FIG. 5 is an example of information stored in the weighing apparatus according to one or more embodiments.

FIGS. 9A and 9B shows examples of a label printed and issued by the weighing apparatus according to one or more embodiments.

FIGS. 18A-18D are examples of screen transition in the weighing apparatus according to one or more embodiments.

FIGS. 19A-19D are examples of screen transitions in the weighing apparatus according to one or more embodiments.

FIGS. 21A-21D are examples of screen transitions in the weighing apparatus according to one or more embodiments.

Figures 22A, 22B, 22C, 22D:
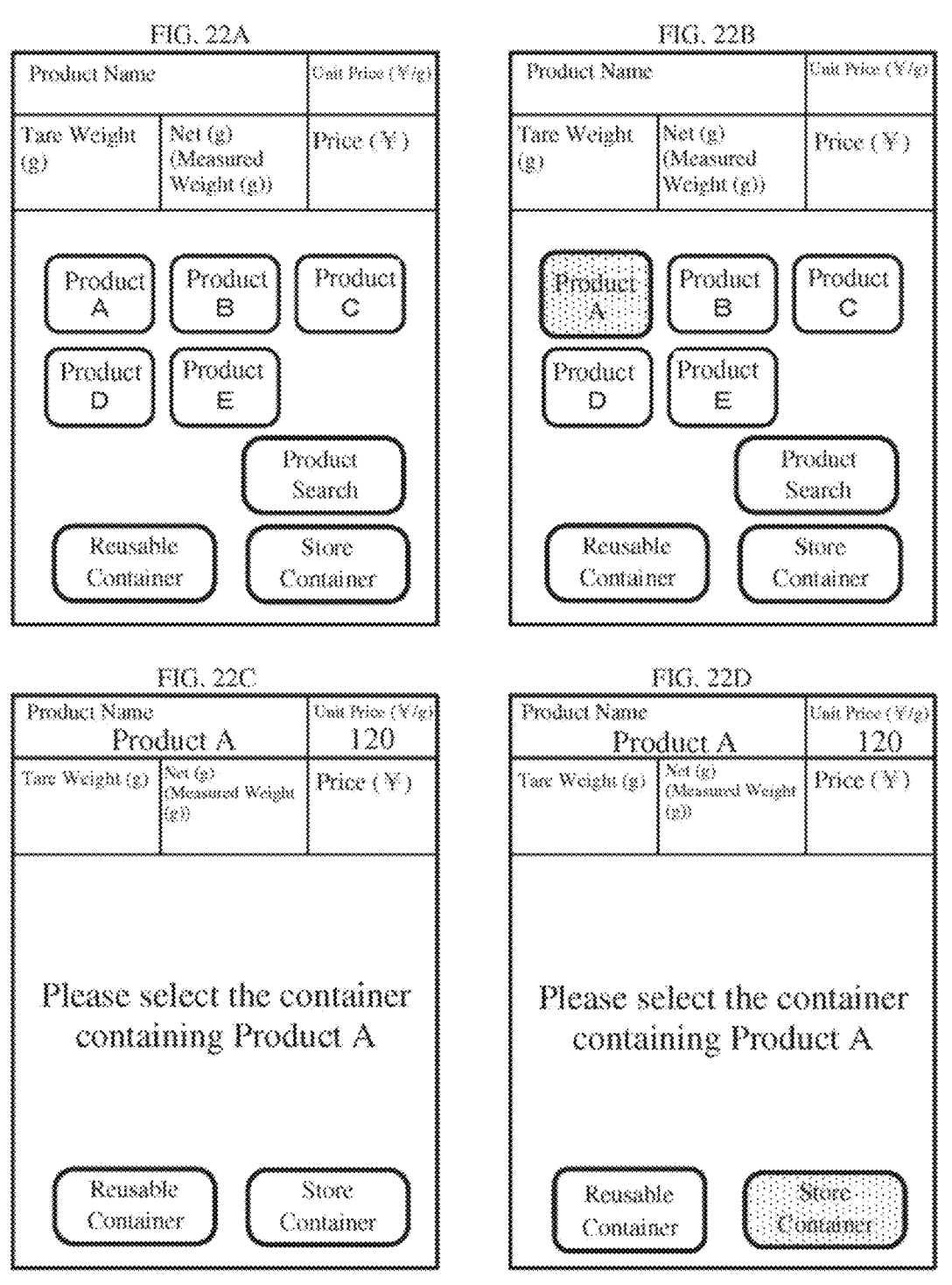

FIGS. 22A-22D are examples of screen transitions in the weighing apparatus according to one or more embodiments.

FIGS. 23A-23D are examples of screen transitions in the weighing apparatus according to one or more embodiments.

FIGS. 24A-24D are examples of screen transitions in the weighing apparatus according to one or more embodiments.

FIGS. 26A-26D are examples of screen transitions in the weighing apparatus according to one or more embodiments.

FIGS. 27A-27D are examples of screen transitions in the weighing apparatus according to one or more embodiments.

FIGS. 28A-28D are examples of screen transitions in the weighing apparatus according to one or more embodiments.

FIGS. 29A and 29B are examples of screen transitions in the weighing apparatus according to one or more embodiments.

FIGS. 31A-31D are examples of screen transitions in the weighing apparatus according to one or more embodiments.

FIGS. 34A-34D are examples of screen transitions in the weighing apparatus according to one or more embodiments.

FIGS. 35A-35D are examples of screen transitions in the weighing apparatus according to one or more embodiments.

FIGS. 36A-36D are examples of screen transitions in the weighing apparatus according to one or more embodiments.

FIGS. 37A-37D are examples of screen transitions in the weighing apparatus according to one or more embodiments.

FIGS. 38A-38D are examples of screen transitions in the weighing apparatus according to one or more embodiments.

FIGS. 39A-39D are examples of screen transitions in the weighing apparatus according to one or more embodiments.

FIGS. 41A-41D are examples of screen transitions in the weighing apparatus according to one or more embodiments.

FIGS. 42A-42D are examples of screen transitions in the weighing apparatus according to one or more embodiments.

FIGS. 43A-43D are examples of screen transitions in the weighing apparatus according to one or more embodiments.

DETAILED DESCRIPTION

In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
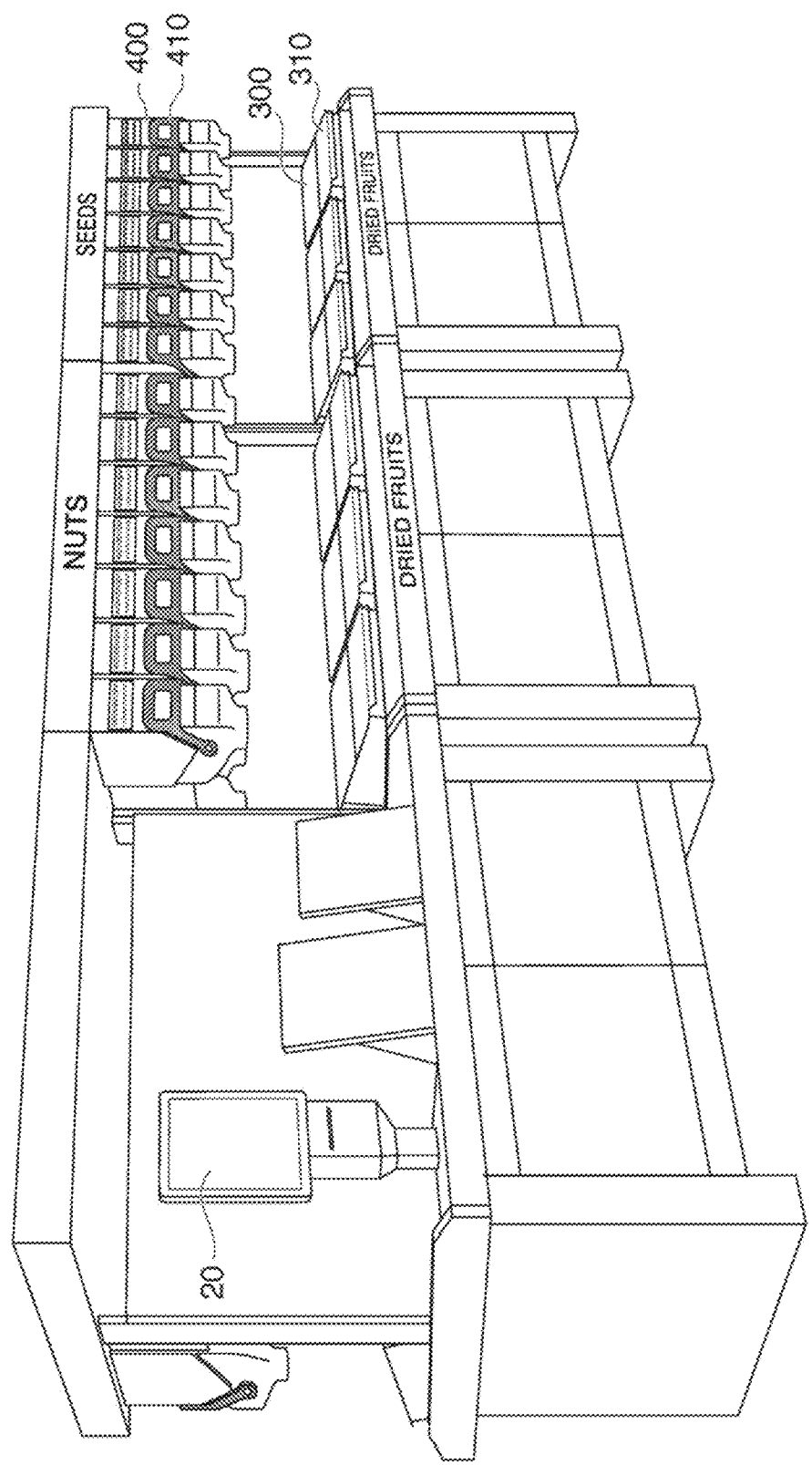
FIG. 1 shows a diagram showing an example of a store applying a weighing apparatus according to one or more embodiments.

FIG. 1 shows an example of an inside of a store that applies a weighing apparatus 20 according to one or more embodiments. FIG. 1 shows a product display area in a right side and a weighing area in a left side. The products may be food products sold by weight such as dried fruits, nuts, and seeds. The food products sold by weight may be called bulk foods.

In the display area, bulk food containers 300 for bulk foods are lined up for each type of bulk foods. The bulk food container 300 includes an upper lid portion 310. The customer lifts the upper lid 310 of the bulk food container 300 and puts the dried fruit from the bulk food container 300 into a reusable container or store container for purchase. The reusable container is a container owned by the customer and brought by the customer and may be referred to as its own container or "My Container."

In the display area, bulk food dispensers 400 for bulk foods are lined up for each type of bulk foods. Nuts and seeds are contained in the food dispensers 400. The bulk food dispenser 400 includes a pressing portion 410 such as a lever or a button. The customer pushes down the pressing portion 410 of the food dispensers 400 and puts the desired nuts and seeds from the food dispensers 400 into the container for purchase. In one or more embodiments, the bulk food dispenser 400 is an example of the bulk food container.

The weighing apparatus 20 is disposed in the weighing area. The customer puts the product in the purchase container in the display area, and moves to the weighing area with the purchase container containing the product. The customer then weighs the products using the weighing apparatus 20. In other words, the weighing apparatus 20 is operated by the customer. However, the clerk who responds to the clerk's call (such as sending a call message to a terminal operated by the clerk) may operate the weighing apparatus 20 on behalf of the customer.

Figure 2:
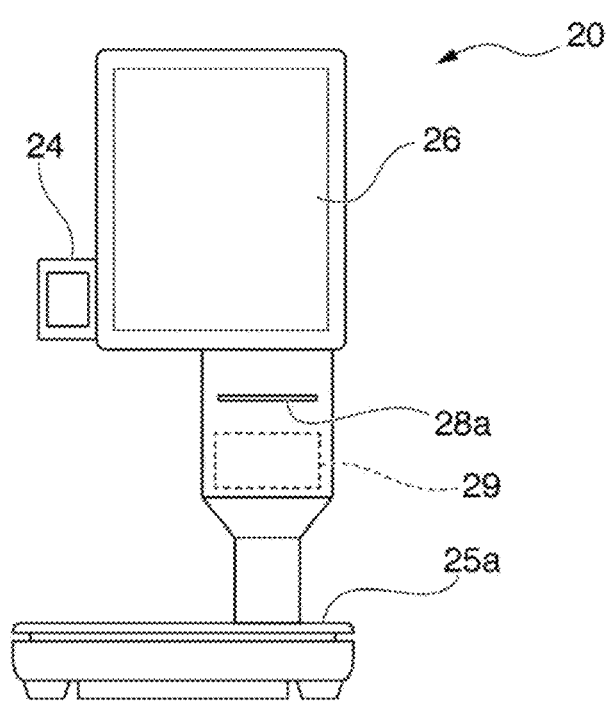
FIG. 2 is a diagram showing an example of the appearance of the weighing apparatus according to one or more embodiments.
Figure 3:
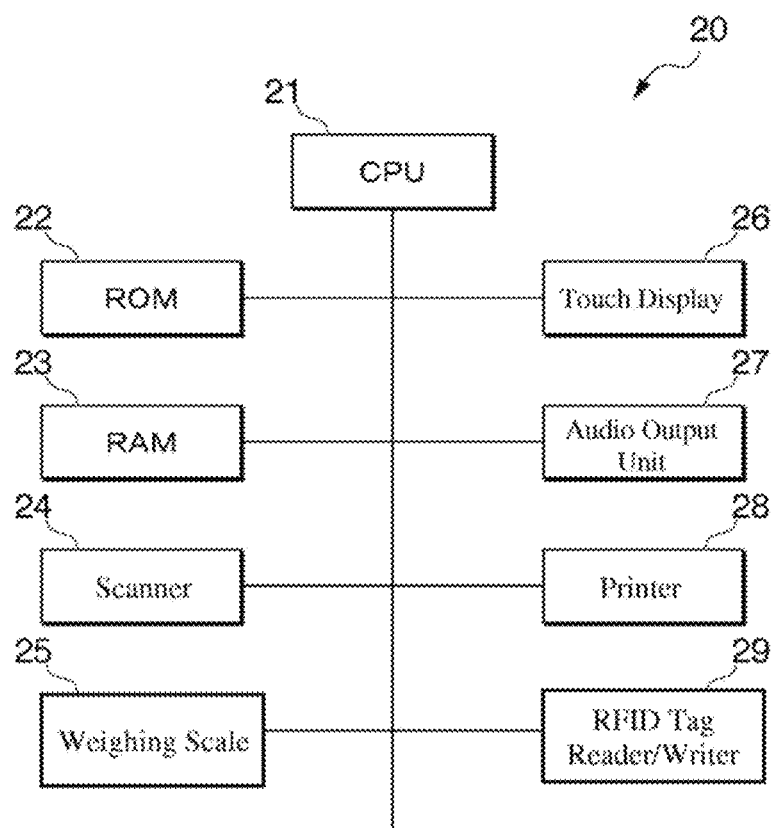
FIG. 3 is a diagram showing an example of the configuration of the weighing apparatus according to one or more embodiments.

FIG. 2 shows an example of an appearance of the weighing apparatus 20. FIG. 3 shows an example of a configuration of the weighing apparatus 20. In FIGS. 2 and 3, the same components are designated by the same reference numerals. The configuration of the weighing apparatus 20 shown in FIG. 3 will be described with reference to FIG. 2.

The weighing apparatus 20 includes a central processing unit (CPU) 21, a read only memory (ROM) 22, a random access memory (RAM) 23, a scanner 24, a weighing scale 25, a touch display 26, an audio output unit 27, a printer 28, a radio frequency identifier (RFID) tag reader/writer 29, and a transceiver 20.

The CPU 21 controls operations of the weighing apparatus 20 by reading and executing a program stored in the ROM 22.

The ROM 22 stores the program executed by the CPU 21.

The RAM 23 stores information read from the ROM 22 and information acquired via the RFID tag reader/writer 29.

The scanner 24 optically reads various codes such as a bar code and a two-dimensional code. In FIG. 1, the scanner 24 is omitted.

The weighing scale 25 weighs the products and containers placed on the weighing platform 25a by a weight detection method using a load cell.

The touch display 26 displays information to the customer and includes a touch panel to receive an operation from a user (e.g., customer).

The audio output unit 27 outputs audio such as a voice guidance message.

The printer 28 issues media. For example, the printer 28 prints a label indicating information about the product to be sold, and issues the printed label from a label ejection port 28a. The information about the product may be a barcode that encodes price information of the product.

The RFID tag reader/writer 29 reads information from the RFID tag and writes information on the RFID tag. The RFID tag is an example of a non-contact type IC tag. The non-contact type IC tag may be referred to as a wireless tag or a wireless IC tag. The RFID tag reader/writer 29 executes reading and writing of information in communication with the RFID tag by short-range wireless communication using electromagnetic fields and radio waves. For example, in one or more embodiments, a label with the RFID tag may be used, and the RFID tag reader/writer 29 reads weight information of a container attached to the label from the RFID tag and writes the weight information on the RFID tag. The label may be incorporated in the RFID tag. The type of the non-contact type IC tag may be a passive tag, an active tag, or a semi-active tag (activated active tag) that combines the passive tag and the active tag. The non-contact type IC tag may be the passive tag that does not need a battery in an inside of the tag because the non-contact type IC tag may be incorporated in the label attached to the container. The RFID tag reader/writer 29 irradiates radio waves that are an energy source for the RFID tags, which are the passive tags.

The transceiver 30 transmits information to another device and receives information from another device by wireless or wired communication. The wireless communication may be wireless local area network (LAN) communication or Bluetooth communication.

The weighing apparatus 20 may have a clock function including a timekeeping function. The weighing apparatus 20 manages the current time, the remaining time until a predetermined time, and the elapsed time from a predetermined state.

FIG. 3 shows an example configuration of the weighing apparatus 20 that includes the CPU 21, the ROM 22, and the RAM 22. However, the weighing apparatus 20 may include a micro controller unit (MCU) instead of the configuration of FIG. 3.

FIGS. 4 and 5 show examples of information stored in the weighing apparatus 20. The weighing apparatus 20 stores a product file, which is called a product master. The product file includes basic product information such as a product name, price.

The weighing apparatus 20 may receive the product file from an external device and store the received product file. The external device is, for example, a management device disposed in a store or a cloud server existing outside the store. The weighing apparatus 20 may receive and store other files (e.g., product button setting file in FIG. 5) which are transmitted from the external device.

As shown in FIG. 4, the product file includes a product ID that identifies each product, a product name that indicates a name of the product, a weighing category, a unit price, and a unit weight as data items.

The weighing category is a category related to weighing. A selling price of the product in the weighing category "0" is determined based on a unit price per unit weight and the weight to be sold (weighing value). In other words, the weighing apparatus 20 needs to weigh the product in the weighing category "0" to determine the selling price using the weight to be sold. The unit price per unit weight may be preset. In one or more embodiments, the unit weight may be 100 g.

When the weighing category is "0," the unit price per unit weight is set to the unit price in FIG. 4, and the unit weight is set to the unit weight in FIG. 4. For example, in FIG. 4, for the product with product ID "SH001" and product name "AAA," the unit price per 100 g is 250 yen. Therefore, for a product with the product name "AAA," if the weighing value is 50 g, the selling price is 125 yen, and if the weighing value is 200 g, the selling price is 500 yen.

A selling price of the product in the weighing category "1" is determined based on a unit price per unit quantity and the selling quantity converted from the unit weight. For example, the quantity of the product is calculated based on the unit weight and the weighing value of the product, and the selling price is calculated based on the calculated quantity of the product and the unit price per unit quantity.

Accordingly, to determine the selling price of the product in the weighing category "1," the weighing apparatus 20 needs to weigh the product. The unit price per unit quantity and the unit weight may be preset. In one or more embodiments, the unit quantity may be one. The weighing apparatus 20 may use an accuracy correction function in a counting scale for calculating a weight error of an individual.

When the weighing category is "1," the unit price per unit weight (that is, quantity 1) is set to the unit price in FIG. 4, and the unit weight corresponding to the quantity 1 is set to the unit weight in FIG. 4. For example, in FIG. 4, for the product with product name "ABC" and product ID "SH103," the unit price per product (unit weight "80 g") is 90 yen. Therefore, for the product with product name "ABC," for example, if the weighing value is about 85 g, the selling price is 90 yen for one piece, and if the weighing value is about 150 g, the selling price is 180 yen for two pieces.

A selling price of the product in the weighing category "2" is determined based on a unit price per unit quantity and a selling quantity to be input. In other words, the selling quantity of the product in the weighing category "2" does not depend on the weight of the product to be sold, the weighing apparatus 20 does not need to weigh the product. The unit price per unit quantity may be preset.

When the weighing category is "2," the unit price per unit quantity is set to the unit price in FIG. 4 and nothing is set to the unit weight in FIG. 4. For example, for the product with product ID "SH150" and product name "AAAA," the unit price per product is 120. Therefore, for the product with product name "AAAA," if the selling quantity to be input is 1, the selling price is 120 yen for one piece, and if the selling quantity is 2, the selling price is 240 for two pieces.

The weighing apparatus 20 stores a store container file, which is called a container master. The store container file includes basic information of the store container (e.g., weight of the store container).

The store container file contains a store container ID that identifies each store container, a container ID, a store container weight that indicates a weight of each store container, and a store container price that indicates a price of each store container as data items. The container ID identifies each of the reusable container, the store container S, the store container M, and the store container L. For example, container IDs "10," "21," "22," and "23" indicate the reusable container, the store container S, the store container M, the store container L, respectively. Further, the store container IDs "21," "22," and "23" may indicate the store container S, the store container M, the store container L, respectively.

The weighing apparatus 20 stores a button setting file related to a button displayed on the touch display 26 in the RAM 22. For example, the weighing apparatus 20 stores a product button setting file in FIG. 5 related to a product button and a container button setting file related to a container button in the RAM 22.

As shown in FIG. 5, the product button setting file includes a product ID, a product button ID, and a button image as data items. The Product ID identifies each product. The product button ID identifies each product button. The button image indicates an image data of the product button. That is, in the product button setting file, the product is associated with the product button.

A container button setting file includes a container ID, a container button ID, and a button image as data items. The container ID identifies each container. The container button ID identifies each container button. The container button ID identifies the reusable container button, the store container button, the container S button (one of the store container type buttons), the container M button (one of the store container type buttons), and the container L button (one of the store container type buttons). The button image is image data of the container button. That is, in the container button setting file the container is associated with the container button.

The above-mentioned file is an example of a file stored by the weighing apparatus 20, and the weighing apparatus 20 may store a file other than the above-mentioned file.

The weighing apparatus 20 need only be able to refer to the above-mentioned file, and the weighing apparatus 20 does not necessarily have to store the above-mentioned file. That is, the above-mentioned files may be stored in an external device (e.g., management device disposed in the store) or a cloud server existing outside the store, and the weighing apparatus 20 may access the external device to get the information in the above-mentioned files.

Figure 6:
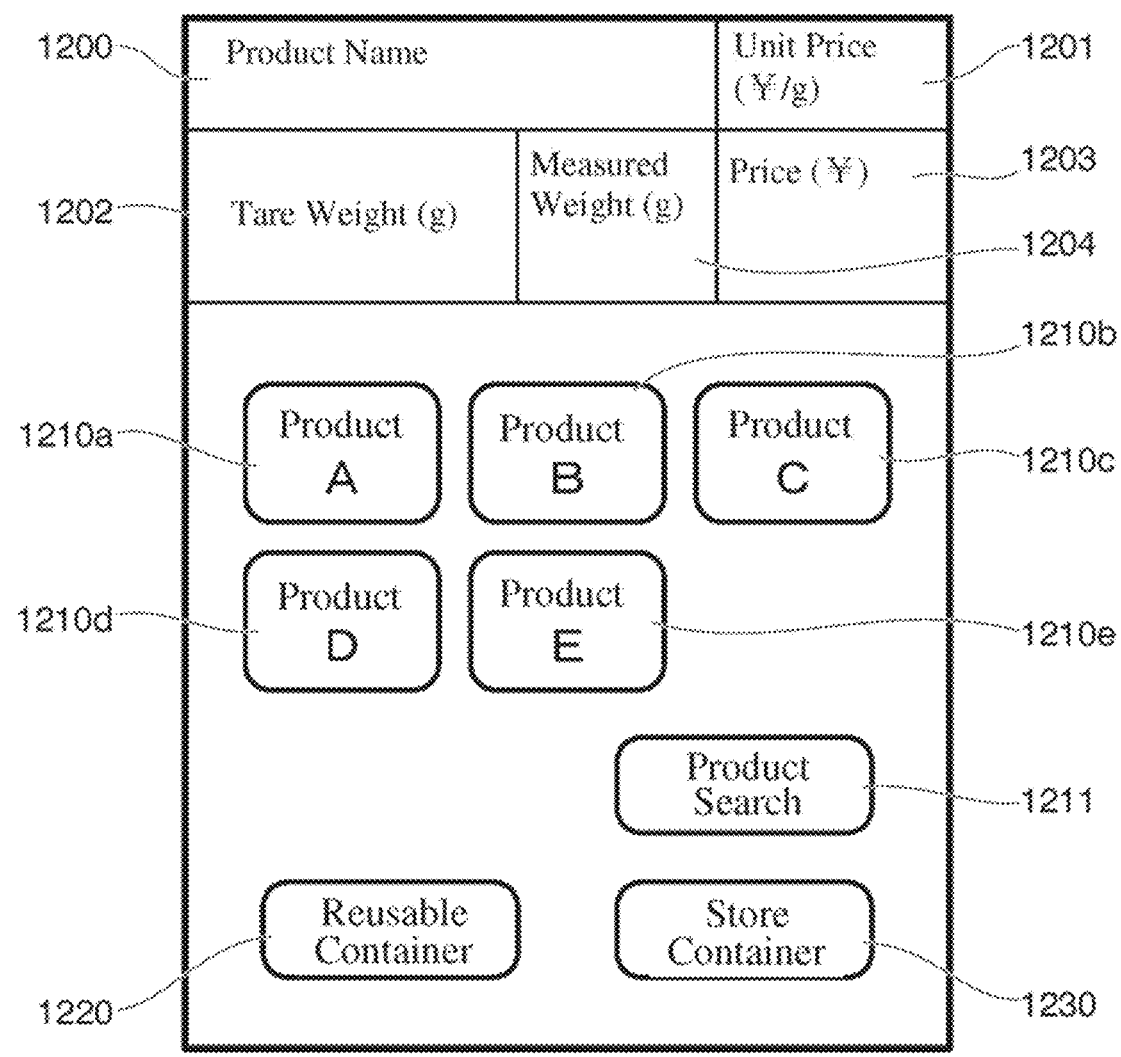
FIG. 6 is an example of a screen in the weighing apparatus according to one or more embodiments.

FIG. 6 is an example of a screen on the weighing apparatus 20. The weighing apparatus 20 displays a screen (weighing operation screen) as shown in FIG. 6 as an initial screen on the touch display 26, for example, before starting the weighing operation.

The weighing operation screen shown in FIG. 6 includes a product name display field 1200, a unit price display field 1201, a tare weight display field 1202, a selling price display field 1203, a net weight/weighing value display field 1204, and various product buttons (a product button 1210a for product A, a product button 1210b for product B, a product button 1210c for product C, a product button 1210d for product D, product button 1210e for product E), product search button 1211, and various container buttons (reusable container button 1220 and store container button 1230).

The product name display field 1200 is a display field for displaying the product name. When a product is specified, the weighing apparatus 20 displays the product name of the product in the product name display field 1200. For example, the weighing apparatus 20 displays the product name of the product in the product name display field 1200 when the product is specified by the operation of the product button.

The unit price display field 1201 is a display field that displays the unit price per unit weight of the product. The weighing apparatus 20 displays the unit price in the unit price display field 1201 when the product is specified. For example, the weighing apparatus 20 displays the unit price in the unit price display field 1201 when the product is specified by the operation of the product button.

The tare weight display field 1202 is a display field for displaying the tare weight. The weighing apparatus 20 displays the weight on the tare weight display field 1202 when the tare weight is specified. For example, the weighing apparatus 20 displays the weight on the tare weight display field 1202 when the weight of the reusable container is read by the RFID tag reader/writer 39. In addition, the weighing apparatus 20 displays the weight of the store container of the type on the tare weight display field 1202 when the store container type is specified by the operation of the store container type button.

The tare weight display field 1202 may display a recognition result of the container type and the reusable container. In FIG. 19B, the tare weight display field 1202 may display a sign indicating that the reusable container has been recognized by the weighing apparatus 20 as the recognition result. In FIG. 19D, the tare weight display field 1202 may display a sign indicating that the reusable container has not been recognized by the weighing apparatus 20 as the recognition result.

In FIG. 21A, the weighing operation screen may display an instruction message that instructs the user to select the store container containing product A. In FIG. 21C, the weighing operation screen may display an instruction message that instructs the user to place the reusable store container containing product A.

The net weight/weighing value display field 1204 displays the net weight (net value) and the weighing value of the container that contains the product. The weighing value is a gross weight that includes the tare weight and the product weight. When the container containing the product is placed on the weighing platform 25a, the weighing apparatus 20 displays the weighing value of the container containing the product in the net weight/weighing value display field 1204. For example, in the weighing apparatus 20, as shown in FIG. 19C, the net weight/weighing value display field 1204 displays the weighing value of the container containing the product. In addition, the weighing apparatus 20 calculates the net weight calculated by subtracting the tare weight from the weighing value when both the weighing value and the tare weight are recognized by the weighing apparatus 20. The weighing apparatus 20 displays the calculated net weight in the net weight/weighing value display field 1204 as shown in FIG. 19C.

The selling price display field 1203 displays the selling price of the product. The weighing apparatus 20 calculates the selling price when both the unit price and the net weight are obtained, and displays the calculated selling price on the selling price display field 1203.

The product buttons 1210a-1210e are used to designate the products A-E, respectively. The product search button 1211 is a button for searching and designating a product, in addition to the designation by the product button. When the product search button 1211 is operated, for example, a screen for searching for a product from a product name and specifying the searched product or a screen for specifying a narrowed-down product based on the classification may be displayed.

The reusable container button 1220 is a button for selecting the reusable container in the selection of either the reusable container or the store container. The store container button 1230 is a button for selecting a store container in selecting either the reusable container or the store container.

In the store, there may be a plurality of types of store containers. When the store container is selected by the customer as a result of selection of the reusable container or the store container, the weighing apparatus 20 displays the store container type button for selecting one of a plurality of types of store containers. For example, in the weighing apparatus 20, when the store container button 1230 is operated, as shown in FIG. 21A, the container S button, the container M button, and the container L button are displayed. For example, the type of the store container and the price of the store container are displayed on the store container type button. For example, "container S: 5 yen," "container M: 7 yen," and "container S5 yen") are displayed on the container S button, the container M button, and the container L button, respectively.

The weighing apparatus 20 may weigh the container containing the product before either the reusable container or the store container is selected. The weighing apparatus 20 displays a button for selecting the container placed on the weighing platform 25a. For example, because the container containing the product is placed on the weighing platform 25a before either the reusable container or the store container is selected, the weighing apparatus 20 does not recognize the container containing the product as the reusable container. In such a case, as shown in FIG. 27A, a "Yes" button indicating selection of the store container button and a "No" button indicating selection of the reusable container are displayed to ask the customer whether the container is the store container.

Figure 7:
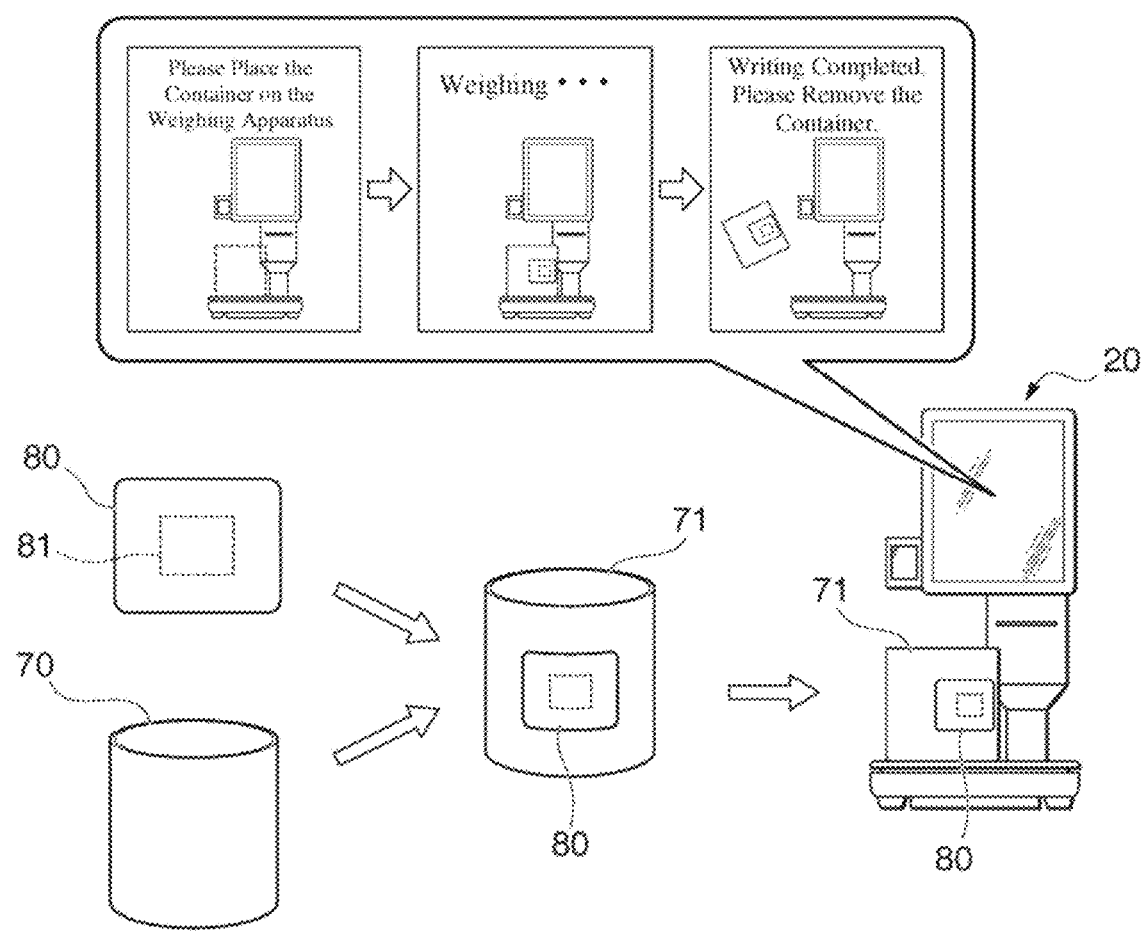
FIG. 7 is a diagram showing the state of registration of the reusable container.

FIG. 7 shows procedures of registration of the reusable container. In one or more embodiments, the RFID tag is attached to a label affixed to the reusable container. In the procedures of the registration of the reusable container, the weight of the reusable container is stored in the RFID tag as the tare weight. When registering the reusable container, first, a label 80 is attached to the container 70 brought by the customer, which is a container to be registered as the reusable container. The RFID tag 81 is attached to the label 80. The label 80 with the RFID tag 81 may be referred to as an RFID label. The central portion of FIG. 7 indicates the unregistered reusable container 71 after the label 80 is affixed. The label 80 may be a water resistant material.

Subsequently, the unregistered reusable container 71 is placed on the weighing apparatus 20. The weighing apparatus 20 weighs the placed unregistered reusable container 71. The weighing value is the tare weight of the reusable container 71. After weighing the reusable container 71, the weighing apparatus 20 writes the weighing value on the RFID tag 81 attached to the label 80 affixed to the reusable container 71. As a result, the unregistered reusable container 71 becomes the registered reusable container 71. FIG. 7 shows the unregistered reusable container 71 and the registered reusable container 71 to explain the registration procedures. In one or embodiments, the reusable container refers to the registered reusable container in figures other than FIG. 7.

The weighing apparatus 20 registers the reusable container 71 on the screen for registering the reusable container in a reusable container registration mode. The weighing apparatus 20 may transition to the screen for registering the reusable container according to the operation. As the screen for registering the reusable container, the weighing apparatus 20 displays a message for mounting on the weighing apparatus 20 before mounting (i.e., before mounting detection) of the unregistered reusable container 71 (as shown in the left screen of the three screens on the left, center, and right at the top of FIG. 7), a message indicting that weighing is in progress during weighing (as shown the center screen of the three screens of FIG. 7), and a message indicating that writing of the weighing value on the RFID tag 81 has been completed after the completion of the writing (as shown in the right screen of the three screens of FIG. 7).

The label 80 to the container 70 may be attached by the customer or by the clerk of the store. The unregistered reusable container 71 may be placed on the weighing apparatus 20 by the customer or by the clerk.

Figure 8:
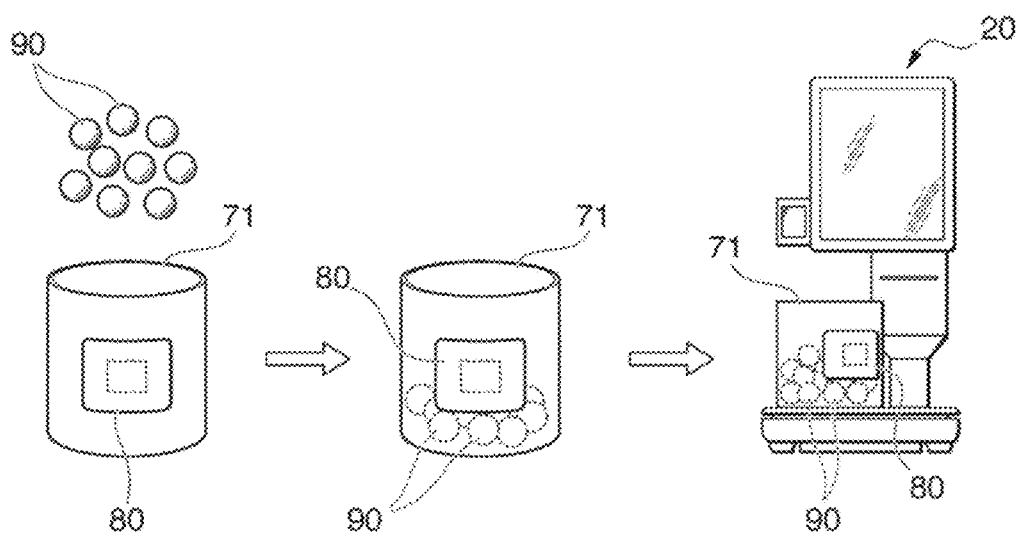
FIG. 8 is a diagram showing a state of product purchase using the reusable container.

FIG. 8 shows procedures of product purchase using the reusable container. The customer puts the desired product 90 in the registered reusable container 71. In the central part of FIG. 8, the reusable container 71 contains the product 90.

Subsequently, the reusable container 71 containing the product 90 is placed on the weighing apparatus 20. The weighing apparatus 20 weighs the products 90 contained in the reusable container 71. The weighing apparatus 20 reads the weight of the reusable container 71 stored in the RFID tag 81 attached to the label 80 affixed to the reusable container 71. The weighing apparatus 20 calculates the net weight of the product 90 based on the weighing value and the weight of the reusable container 71 (calculated by subtracting the tare weight from the weighing value). Further, the weighing apparatus 20 specifies the product contained in the reusable container 71 placed based on the operation of the customer as the product 90. The weighing apparatus 20 calculates the selling price based on the unit price of the product 90 and the net weight of the product 90 (calculated by multiplying the unit price by the net weight). The weighing apparatus 20 prints and issues the label as shown in FIG. 9A after displaying the selling price. The customer attaches the label issued from the weighing apparatus 20 to the reusable container 71, and moves to an installation location of a device capable of performing the registration process for registering the product. The device capable of performing the registration process may be a registration settlement device (e.g., conventional POS terminal) capable of performing the registration process and the settlement process, or a registration-only device that exclusively executes the registration process. After the registration process in the registration-only device, the customer moves to an installation location of a device capable of performing the settlement process. The device capable of performing the settlement process may be the above-mentioned registered settlement device or a dedicated settlement device that exclusively performs the settlement process.

The weighing apparatus 20 used for registering the reusable container 71 and the weighing apparatus 20 used for purchasing the product may be the same or different weighing apparatus 20. For example, the clerk may register the reusable container 71 using the weighing apparatus 20 disposed at the service counter, and the customer may purchase the product contained in the reusable container 71 using the weighing apparatus 20 disposed in the weighing area.

FIGS. 9A and 9B show examples of a label printed and issued by the weighing apparatus 20. The weighing apparatus 20 prints and issues a label as shown in FIG. 9 using the printer 28 after weighing each product (i.e., after calculating the selling price). FIG. 9A is a label when the reusable container is used. On the label of FIG. 9A, "reusable bottle" is printed as a notation indicating that the reusable container is used. In other words, the reusable container may be referred to as a reusable bottle for each store. "827 yen" on the label of FIG. 9A is a special price for the reusable bottle with 20 yen discounted from the price (847 yen) for the net weight (121 g) of the unit price (yen/100 g) of 700 yen (original nut mix). Although not printed in the example of FIG. 9A, the discount amount of the reusable bottle (20 yen) may also be printed. The barcode on the label of FIG. 9A is, for example, a code of the above amount (847 yen). As will be described later, the price of container A is 30 yen, while the price of the reusable container, which is a personal property, is 0 yen. Therefore, the reusable container being 0 yen may be printed on the label.

As a discount when using the reusable container, a predetermined amount (20 yen in the above case) is discounted from the total amount, but other discounts may be used. For example, the unit price may be discounted (that is, a predetermined percentage may be discounted from the total amount). Discounts when using the reusable container may not be applied.

FIG. 9B is a label when the store container is used. On the label of FIG. 9B, container A is printed as a notation indicating that the store container has been used. On the label of FIG. 9B, the price of the container A is printed as 30 yen. "877 yen" on the label of FIG. 9B is the amount obtained by adding the price of 30 yen for the container A to the 847 yen as shown in FIG. 9A. The barcode on the label of FIG. 9B may be a code of the above amount (877 yen).

The barcode on the label is read, for example, by a device capable of executing the registration process. That is, the customer puts the product in the container for purchase in the display area, moves to the weighing area with the container for purchase containing the product, weighs the product using the weighing apparatus 20, and after the label is issued, moves to the installation location of the device capable of executing the registration process. The labels issued by the weighing apparatus 20 may be affixed to the container (e.g., the reusable container and the store container). Further, in the device capable of executing the registration process, the bar code on the label may be read by the clerk or the customer. That is, in the device capable of executing the registration process, the registration process may be performed by the operation of the clerk or by the customer's own operation.

Figure 10:
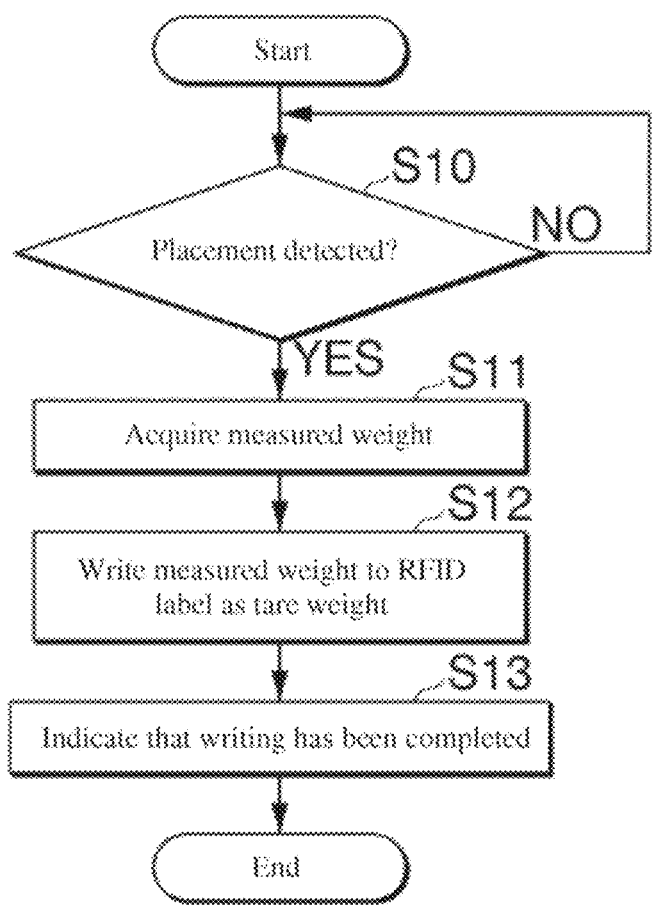
FIG. 10 is a flowchart showing an example of the operation of the weighing apparatus according to one or more embodiments.

FIG. 10 is a flowchart showing an example operation of registration of the reusable container performed by the weighing apparatus 20. At the start of the flowchart of FIG. 10, the weighing apparatus 20 displays the screen for registering the reusable container (for example, the screen on the upper left side of FIG. 7).

At step S10, the weighing apparatus 20 determines whether placement has been detected. If the weighing apparatus 20 determines that the placement has been detected (step S10: YES), the process proceeds to step S11. If the weighing apparatus 20 determines that the placement has not been detected (step S10: NO), the process returns to step S10 (that is, the weighing apparatus 20 waits until the unregistered reusable container is placed on the weighing apparatus 20).

At step S11, the weighing apparatus 20 acquires the weighing value, which is a tare weight of the reusable container. The weighing apparatus 20 acquires a stable numerical value after mounting as a weighing value, but displays a screen indicating that weighing is in progress after mounting and before acquiring the weighing value (until the numerical value stabilizes). In this step, the displayed screen may be the upper center screen of FIG. 7.

At step S12, the weighing apparatus 20 writes the weighing value as the tare weight to the RFID label. For example, the weighing apparatus 20 writes the acquired weighing value on the RFID tag attached to the label affixed to the reusable container.

At step S13, the weighing apparatus 20 displays a screen indicating that the writing has been completed. In this step, the displayed screen may be the screen on the upper right side of FIG. 7. Then, the flowchart of FIG. 10 ends. The weighing apparatus 20 may display the written information indicating the weight of the reusable container in addition to the notification indicating that the writing has been completed.

Figure 11:
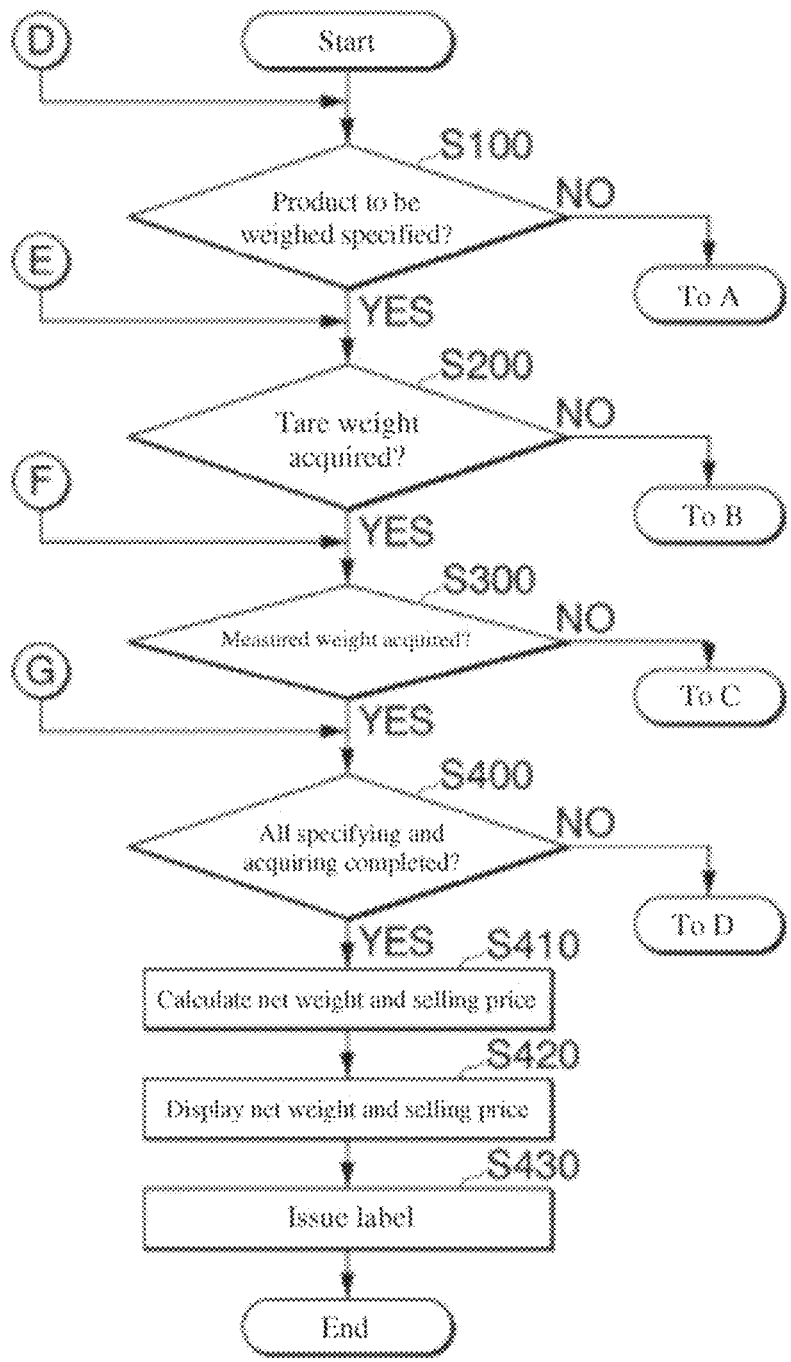
FIG. 11 is a flowchart showing an example of the operation of the weighing apparatus according to one or more embodiments.
Figure 12:
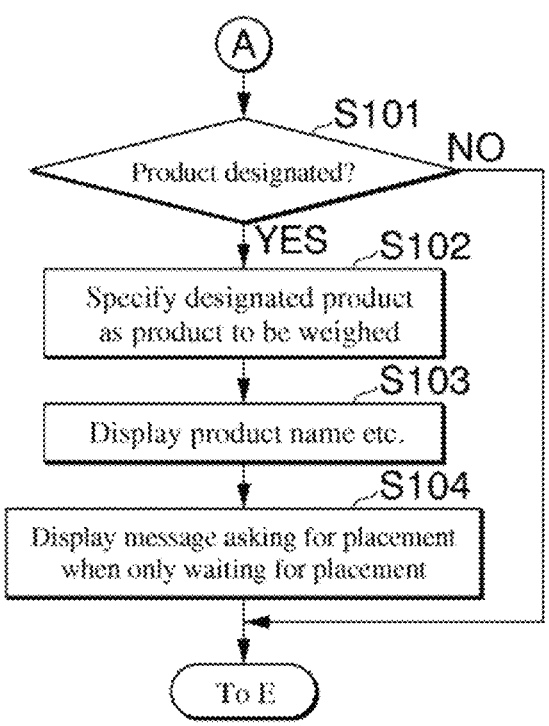
FIG. 12 is a flowchart showing an example of the operation of the weighing apparatus according to one or more embodiments.
Figure 13:
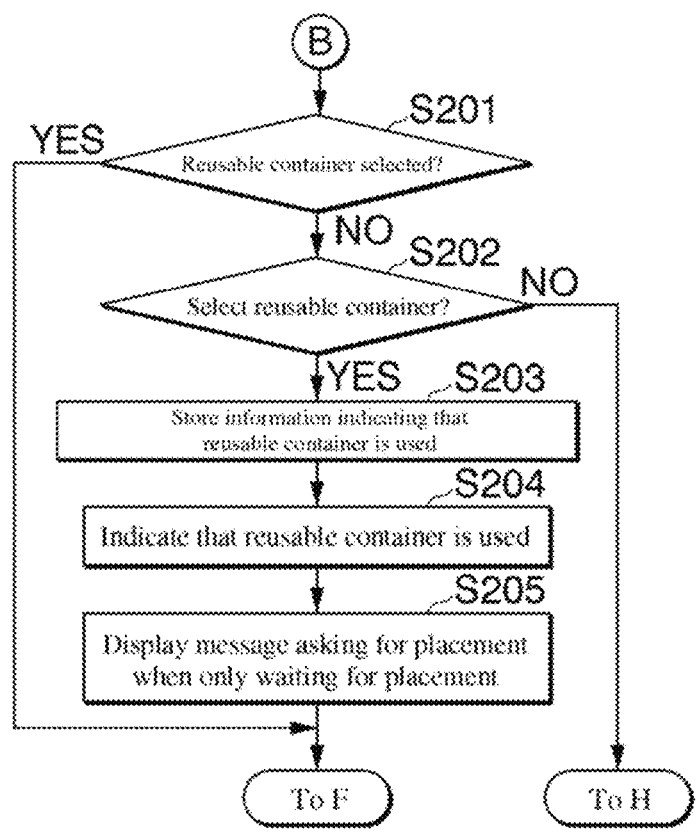
FIG. 13 is a flowchart showing an example of the operation of the weighing apparatus according to one or more embodiments.
Figure 14:
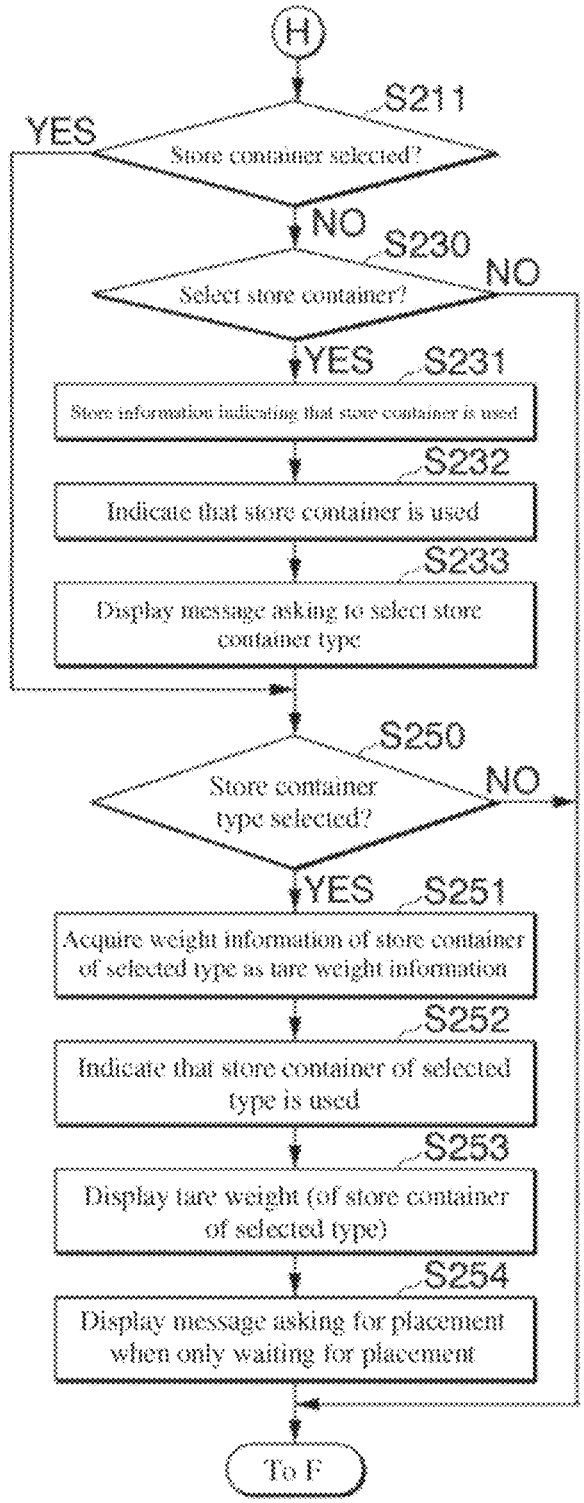
FIG. 14 is a flowchart showing an example of the operation of the weighing apparatus according to one or more embodiments.
Figure 15:
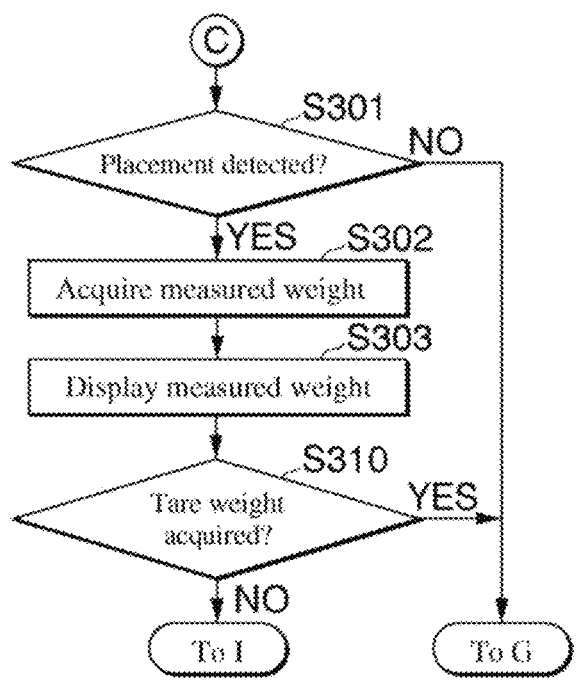
FIG. 15 is a flowchart showing an example of the operation of the weighing apparatus according to one or more embodiments.
Figure 16:
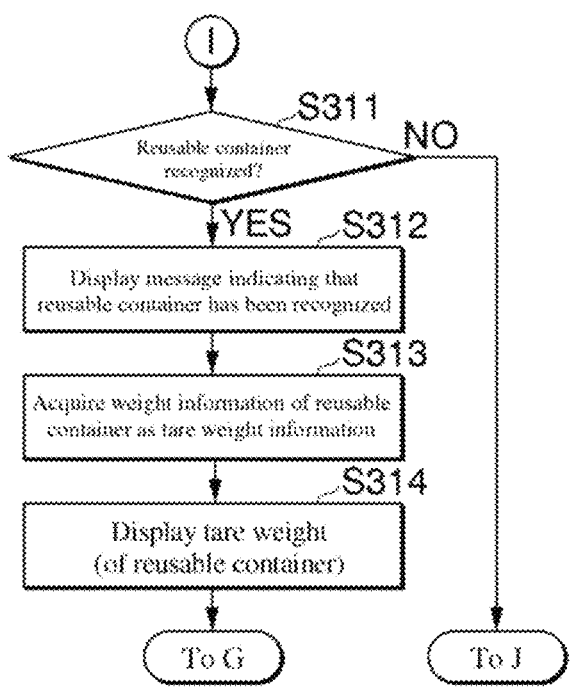
FIG. 16 is a flowchart showing an example of the operation of the weighing apparatus according to one or more embodiments.
Figure 17:
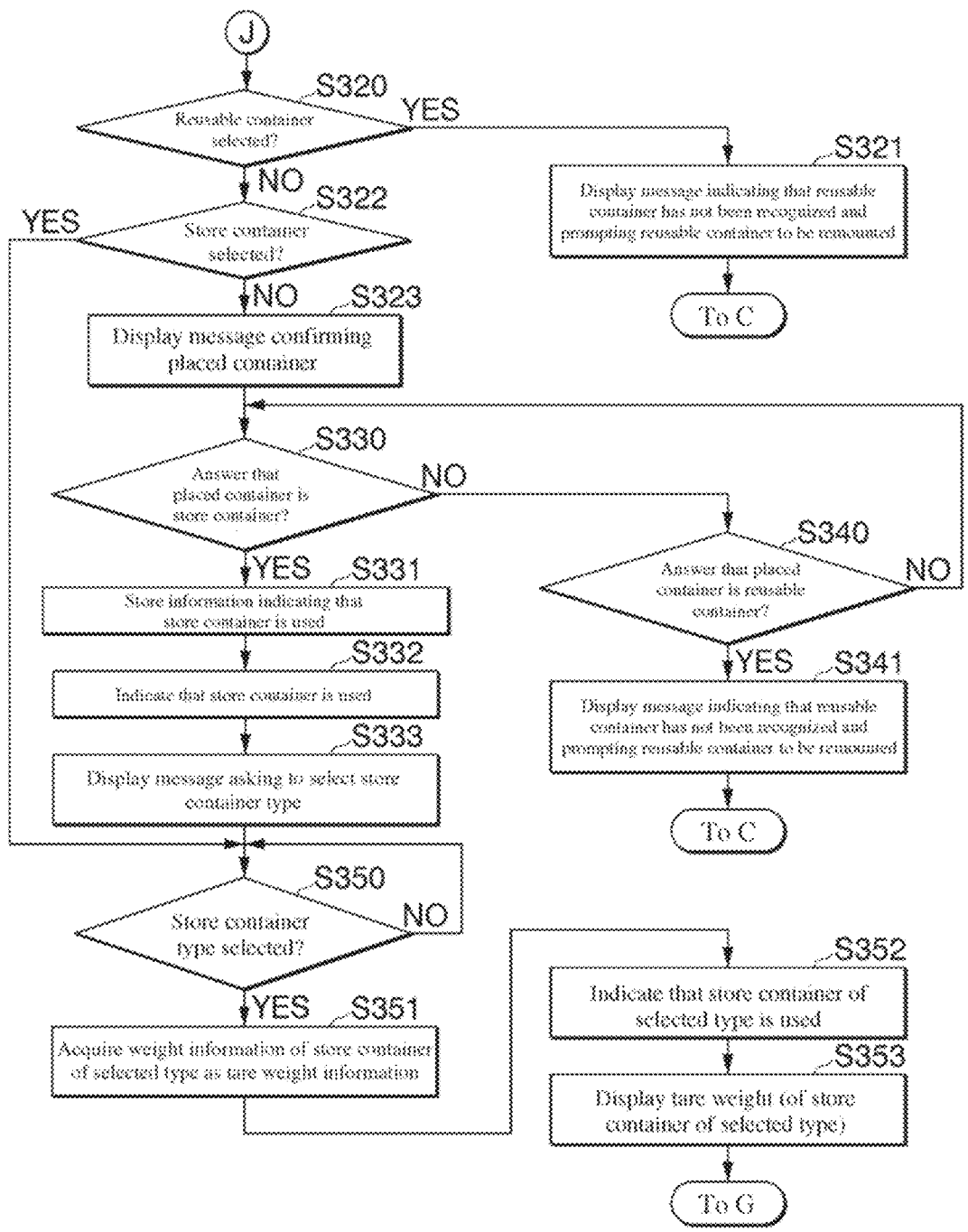
FIG. 17 is a flowchart showing an example of the operation of the weighing apparatus according to one or more embodiments.

FIGS. 11-17 are flowcharts showing example operations of purchasing the product in the weighing apparatus 20. Each process of FIG. 12 is a process following step S100 (NO) of FIG. Each of the processes of FIGS. 13 and 14 is a process following step S200 (NO) of FIG. Each process of FIGS. 15-17 is a process following step S300 (NO) of FIG. 11. In the examples of FIGS. 11-17, there is no discount when using the reusable container.

As shown in FIG. 11, at step S100, the weighing apparatus 20 determines whether the product to be weighed has been specified. That is, the weighing apparatus 20 determines whether the product ID of the product to be weighed is stored. For example, the product ID may be temporarily stored in the RAM 23. Hereinafter, other information may be also stored in the RAM 23. If it is determined that the product to be weighed has been specified (step S100: YES), the process proceeds to step S200. If it is determined that the product to be weighed has not been specified (step S100: NO), the process proceeds to step S101 of FIG. 12.

At step S200, the weighing apparatus 20 determines whether the tare weight has been acquired. That is, the weighing apparatus 20 determines whether tare weight is stored. If it is determined that the tare weight has been acquired (step S200: YES), the process proceeds to step S300. If it is determined that the tare weight has not been acquired (step S200: NO), the process proceeds to step S201 of FIG. 13.

At step S300, the weighing apparatus 20 determines whether the weighing value (gross weight including the tare portion) has been acquired. That is, the weighing apparatus 20 determines whether the weighing information is stored. If it is determined that the weighing value has been acquired (step S300: YES), the process proceeds to step S400. If it is determined that the measuring value has not been acquired (step S300: NO), the process proceeds to step S301 of FIG. 15.

At step S400, the weighing apparatus 20 determines whether all the specifying and acquiring processes have been completed. That is, it is determined whether the product to be weighed has been specified, the tare weight has been acquired, and the weighing value has been acquired. If it is determined that all processes have been completed (step S400: YES), the process proceeds to step S410. If it is determined that one or more processes have not been completed (step S400: NO), the process returns to step S100.

At step S410, the weighing apparatus 20 calculates the net weight of the product to be weighed and the selling price of the product to be weighed. For example, the weighing apparatus 20 calculates the net weight of the product to be weighed based on the weighing value and the tare weight. In addition, the weighing apparatus 20 calculates the selling price of the weighing target product based on the weight unit price of the weighing target product and the net weight of the weighing target product when the container is the reusable container. When the container is a store container, the selling price of the weighed product is calculated based on the weight unit price of the weighed product, the net weight of the weighed product, and the price information of the store container. Then, the process proceeds to step S420.

At step S420, the weighing apparatus 20 displays the net weight of the product to be weighed and the selling price of the product to be weighed. That is, the weighing apparatus 20 displays the net weight of the weighing target product and the selling price of the weighing target product calculated in step S410. Then, the process proceeds to step S430.

At step S430, the weighing apparatus 20 issues the label indicating the selling price of the product to be weighed calculated in step S410. Then, this flowchart ends.

As shown in FIG. 12, at Step S101, the weighing apparatus 20 determines whether a product has been designated. That is, the weighing apparatus 20 determines whether the product button has been touched on the touch display 26. If it is determined that the product has been specified (step S101: YES), the process proceeds to step S102. If it is determined that the product has not been specified (step S101: NO), the process proceeds to step S200 in FIG. 11.

At step S102, the weighing apparatus 20 specifies the designated product as the product to be weighed. Further, the weighing apparatus 20 stores the product ID of the product to be weighed. For example, the weighing apparatus 20 stores the product ID corresponding to the touched product button as the product ID of the product to be weighed. Then, the process proceeds to step S103.

At step S103, the weighing apparatus 20 displays the product name of the product to be weighed. That is, the weighing apparatus 20 displays the product name corresponding to the touched product button on the touch display 26. Then, the process proceeds to step S104.

At Step S104, the weighing apparatus 20 displays a message asking for placement when only waiting for placement. Then, the process proceeds to step S200 of FIG. 11. The case of only waiting for placement means, for example, a case where the product to be weighed has been specified and the weight (tare weight) of the store container has been acquired, but the weighing value has not been acquired, or a case where the product to be weighed has been specified and the reusable container has been selected, but the weight (tare weight) and weighing value of the reusable container have not been obtained.

As shown in FIG. 13, at step S201, the weighing apparatus 20 determines whether the reusable container has been selected. That is, the weighing apparatus 20 determines whether the information to use the reusable container is stored. If it is determined that the reusable container has been selected (step S201: YES), the process proceeds to step S300 in FIG. 11. If it is determined that the reusable container has not been selected (step S201: NO), the process proceeds to step S202.

At step S202: the weighing apparatus 20 determines whether the reusable container has been selected. That is, the weighing apparatus 20 determines whether the reusable container button has been touched on the touch display 26. If it is determined that the reusable container has been selected (step S202: YES), the process proceeds to step S203. If it is determined that the reusable container has not been selected (step S202: NO), the process proceeds to step S211 of FIG. 14.

At step S203, the weighing apparatus 20 stores information that the reusable container is used. For example, the weighing apparatus 20 stores the container ID corresponding to the touched reusable container button as the used container information regarding the used container. Then, the process proceeds to step S204.

At step S204: the weighing apparatus 20 indicates that the reusable container is used. Then, the process proceeds to step S205.

At step S205, the weighing apparatus 20 displays a message asking for placement when only waiting for placement. Then, the process proceeds to step S300 of FIG. 11.

As shown in FIG. 14, step S211, the weighing apparatus 20 determines whether the store container has been selected. That is, the weighing apparatus 20 determines whether the information to use the store container is stored. If it is determined that the store container has been selected (step S211: YES), the process proceeds to step S250. If it is determined that the store container has not been selected (step S211: NO), the process proceeds to step S230.

At step S230, the weighing apparatus 20 determines whether a store container has been selected. That is, the weighing apparatus 20 determines whether the store container button has been touched on the touch display 26. If it is determined that the store container has been selected (step S230: YES), the process proceeds to step S231. If it is determined that the store container has not been selected (step S230: NO), the process proceeds to step S300 in FIG. 11.

At step S231, the weighing apparatus 20 stores information indicating that the store container is used. For example, the weighing apparatus 20 stores the container ID (or store container ID) corresponding to the touched store container button as the used container information regarding the used container. Then, the process proceeds to step S232.

At step S232, the weighing apparatus 20 indicates that the store container is to be used. Then, the process proceeds to step S233.

At step S233, the weighing apparatus 20 displays a message asking the store container type to be selected. Then, the process proceeds to step S250.

At step S250, the weighing apparatus 20 determines whether the store container type has been selected. That is, the weighing apparatus 20 determines whether any of the store container type buttons (for example, the container S button, the container M button, and the container L button) for each store container type is touched on the touch display 26. If it is determined that the store container type has been selected (step S250: YES), the process proceeds to step S251. If it is determined that the store container type has not been selected (step S250: NO), the process proceeds to step S300 in FIG. 11.

At step S251, the weighing apparatus 20, the weight information of the store container of the type is acquired as the tare weight. For example, the weighing apparatus 20 stores the store container weight information corresponding to the touched store container type button as the tare weight. Then, the process proceeds to step S252.

At step S252, the weighing apparatus 20 indicates that the store container of the relevant type is used. Then, the process proceeds to step S253.

At step S253, the weighing apparatus 20 displays the tare weight of the store container of the acquired type. That is, the weighing apparatus 20 displays the weight information of the store container of the type acquired in step S251. Then, the process proceeds to step S254.

At step S254, the weighing apparatus 20 displays a message asking for the placement when only waiting for the placement. Then, the process proceeds to step S300 of FIG. 11.

As shown in FIG. 15, at step S301, the weighing apparatus 20 determines whether placement has been detected. If it is determined that the placement has been detected (step S301: YES), the process proceeds to step S302. If it is determined that the placement has not been detected (step S301: NO), the process proceeds to step S400 of FIG. 11.

At step S302, the weighing apparatus 20 acquires the weighing value, which is a gross weight including the tare weight. The weighing apparatus 20 stores the weighing value as weighing information. Then, the process proceeds to step S303.

At step S303, the weighing apparatus 20 displays the weighing value. That is, the weighing apparatus 20 displays the gross weight including the tare weight obtained in step S301. Then, the process proceeds to step S310.

At step S310, the weighing apparatus 20 determines whether the tare weight has been acquired. If it is determined that the tare weight has been acquired (step S310: YES), the process proceeds to step S400 in FIG. 11. If it is determined that the tare weight has not been acquired (step S310: NO), the process proceeds to step S311 of FIG. 16.

As shown in FIG. 16, at step S311, the weighing apparatus 20 determines whether the reusable container has been recognized. If it is determined that the reusable container has been recognized (step S311: YES), the process proceeds to step S312. If it is determined that the reusable container has not been recognized (step S311: NO), the process proceeds to step S320 in FIG. 17.

At step S312, the weighing apparatus 20 displays a message indicating that the reusable container has been recognized. Then, the process proceeds to step S313.

At step S313, the weighing apparatus 20 acquires the weight information of the reusable container as a tare weight. For example, the weighing apparatus 20 reads the weight information of the reusable container from the RFID label of the reusable container (i.e., from the RFID tag attached to the label) and stores the weight information as the tare weight. Then, the process proceeds to step S314.

At step S314, the weighing apparatus 20 displays the tare weight, which is the weight of the reusable container. That is, the weighing apparatus 20 displays the weight information of the reusable container acquired in step S313. Then, the process proceeds to step S400 of FIG. 11.

As shown in FIG. 17, at Step S320, the weighing apparatus 20 determines whether the reusable container has been selected. If it is determined that the reusable container has been selected (step S320: YES), the process proceeds to step S321. If it is determined that the reusable container has not been selected (step S320: NO), the process proceeds to step S322.

At step S321, the weighing apparatus 20 displays a message indicating that the reusable container has not been recognized and a message prompting the reusable container to be remounted. Then, the process returns to step S301 of FIG. 15. If the state does not change after returning to step S301 (when the state of not recognizing the reusable container continues), the processes of steps S301 to S321 are repeatedly executed. However, after a predetermined time has elapsed, the process of calling the clerk may be executed without the operation of the customer.

For example, damage on the RFID tag, failure of the reader (the RFID tag reader/writer 29), and misreading of information may cause the weighing apparatus 20 not to recognize the reusable container. Even if it is not subject to management (when the data structure is different from the original one, such as the specifications of another store), at least the reusable container may not be recognized as the reusable container.

If the store clerk is called, after trying several more times, the product may be refilled in the store container and sold, or the reusable container may be registered again. Further, a predetermined ratio of the weighing value may be input as the weight of the reusable container. That is, as the tare weight when calculating the net value from the gloss value, a predetermined ratio (percentage) of the gloss value may be treated as the tare weight. The weighing apparatus 20 executes a process (hereinafter referred to as a percentage tare process) in which a predetermined ratio of the gloss value is used as the tare weight based on the operation of the clerk. For example, the weighing apparatus 20 may display a button for executing the percentage tare processing, and may execute the percentage tare processing according to the operation of the button.

At step S322, the weighing apparatus 20 determines whether the store container has been selected. If it is determined that the store container has been selected (step S322: YES), the process proceeds to step S350. If it is determined that the store container has not been selected (step S322: NO), the process proceeds to step S323.

At step S323, the weighing apparatus 20 displays a message indicating that the reusable container has not been recognized and a message confirming the placed container.

That is, the weighing apparatus 20 has detected the placement of the container (step S301 (YES)), but has not recognized the reusable container (step S311 (NO)), and has selected both the reusable container and the store container. Since it has not been completed (step S320 (NO), step S322 (NO)), it is confirmed whether the placed container is a store container. Then, the process proceeds to step S330.

At step S330, the weighing apparatus 20 determines whether there is an answer that the placed container is a store container (in other words, whether there is a selection that the store container is placed). If it is determined that there is an answer that the placed container is a store container (step S330: YES), the process proceeds to step S331. If it is determined that there is no answer that the placed container is a store container (step S330: NO), the process proceeds to step S340.

At step S331, the weighing apparatus 20 stores information indicating that the store container is used. Then, the process proceeds to step S332.

At step S332, the weighing apparatus 20 indicates that the store container is used, the process proceeds to step S333.

At step S333, the weighing apparatus 20 displays a message asking the customer to select the store container type. Then, the process proceeds to step S350.

At step S340, the weighing apparatus 20 determines whether there is an answer that the placed container is not a store container (in other words, whether there is a selection that the reusable container has been placed). If it is determined that there is an answer that the placed container is not a store container (step S340: YES), the process proceeds to step S341. If it is determined that there is no answer that the placed container is not a store container (step S340: NO), the process returns to step S330.

At step S341, the weighing apparatus 20 displays a message indicating that the reusable container has not been recognized and a message prompting the reusable container to be remounted. Then, the process returns to step S301 of FIG. 15. After returning to step S301, if the state does not change, the processes of steps S301 to S321 are repeatedly executed (since it has not been answered in step S340 that it is the reusable container, the process returned to step S301. After that, step S320 (YES) is performed, and the processes of steps S301 to S321 are repeatedly executed), but when the predetermined time elapses, the clerk call process may be executed even if there is no customer operation.

At step S350, the weighing apparatus 20 determines whether the store container type has been selected. If it is determined that the store container type has been selected (step S350: YES), the process proceeds to step S351. If it is determined that the store container type has not been selected (step S350: NO), the process returns to step S350 (that is, waits until the store container type is selected).

At step S351, the weighing apparatus 20 acquires the weight information of the store container of the type as the tare weight. Then, the process proceeds to step S352.

At step S352, the weighing apparatus 20 indicates that the store container of the relevant type is used. Then, the process proceeds to step S353.

At step S353, the weighing apparatus 20 displays the tare weight (the weight of the store container of the relevant type). Then, the process proceeds to step S400 of FIG. 11.

FIGS. 18 to 43 show screen transition examples of the weighing operation screen in the weighing apparatus 20. In FIGS. 18 to 43, the reference signs of the fields and buttons are omitted in order to avoid complication in the drawings.

(Example of First Screen Transition)

FIGS. 18 and 19 show examples of the first screen transition in the weighing apparatus 20. For example, FIGS. 18 and 19 show screens in scenes when the reusable container is recognized by operating the selection of the product A, the selection of the reusable container, and the placement in this order. The transition is in the order of FIG. 18A, FIG. 18B, FIG. 18C, FIG. 18D, FIG. 19A, FIG. 19B, and FIG. 19C. The same applies to the second to fifteenth screen transition examples.

When the reusable container is recognized by operating in the order of selection of the product A, selection of the reusable container, and placement, the weighing apparatus 20 operates according to the following steps in FIGS. 11-17. "Step Sx" is abbreviated simply as "Sx."

S100 (NO)→S101 (YES)→S102→S103→S104→S200 (NO)→S201 (NO)→S202 (YES)→S203→S204→S205→S300 (NO)→S301 (YES)→S302→S303→S310 (NO)→S311 (YES)→S312→S313→S314→S400 (YES)→S410→S420→S430

FIG. 18A shows a screen displayed before the start of operation. FIG. 18B shows a screen displayed when the product A button is touched. FIG. 18C shows a screen displayed after the product A button is touched. In FIG. 18C, the product name and unit price of the product A, which is the product to be weighed (S103). FIG. 18D shows a screen displayed when the reusable container button is touched. FIG. 19A shows the screen displayed after the reusable container button has been touched. In FIG. 19A, the screen displays a message that the reusable container has been used (S204) and a message asking for placement (S205). FIG. 19B shows a screen displayed after the reusable container containing the product A is placed. In FIG. 19B, the screen displays the weighing value (S303), a message indicating that the reusable container has been recognized (S312), and the tare weight (S314). FIG. 19C shows a screen displayed after calculating the net weight and selling price of the product to be weighed. In FIG. 19C, the screen displays the net weight and the selling price of the product to be weighed (S420).

If the reusable container has not been recognized by operating in the order of selection of the product A, selection of the reusable container, and placement, the screen changes in the order of FIG. 18A, FIG. 18B, FIG. 18C, FIG. 18D, FIG. 19A, FIG. 19D.

When the reusable container has not been recognized by operating in the order of selection of the product A, selection of the reusable container, and placement, the weighing apparatus 20 operates according to the following steps in FIGS. 11-17.

S100 (NO)→S101 (YES)→S102→S103→S104→S200 (NO)→S201 (NO)→S202 (YES)→S203→S204→S205→S300 (NO)→S301 (YES)→S302→S303→S310 (NO)→S311 (NO)→S320 (YES)→S321

In FIG. 19D, a screen displays a message indicating that the reusable container has not been recognized and a message prompting the reusable container to be remounted (S321).

(Second Screen Transition Example)

FIGS. 20A-D and 21A-D show examples of the second screen transition in the weighing apparatus 20. In the second screen transition, the screen changes in the order of selection of the product A, selection of the store container, selection of the container M, and placement of the container M.

When the operation is performed in the order of selection of the product A, selection of the store container, selection of the container M, and placement, the weighing apparatus 20 operates according the following steps in FIGS. 11-17.

S100 (NO)→S101 (YES)→S102→S103→S104→S200 (NO)→S201 (NO)→S202 (NO)→S211 (NO)→S230 (YES)→S231→S232→S233→S250 (YES))→S251→S252→S253→S254→300 (NO)→S301 (YES)→S302→S303→S310 (YES)→S400 (YES)→S410→S420→S430

Figure 20A:
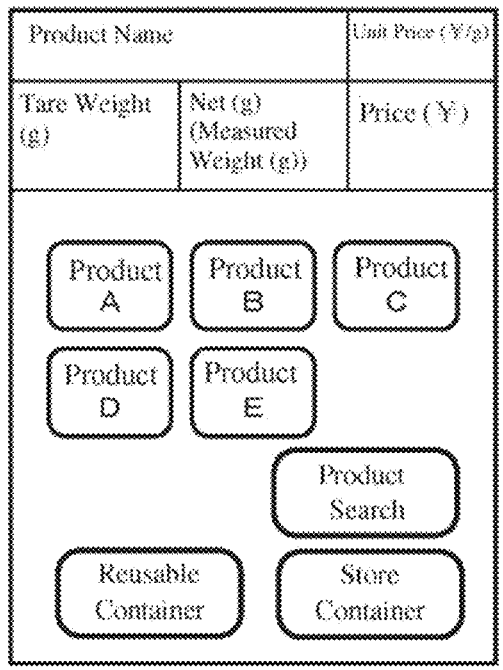
FIGS. 20A-20D are examples of screen transition in the weighing apparatus according to one or more embodiments.
Figure 20B:
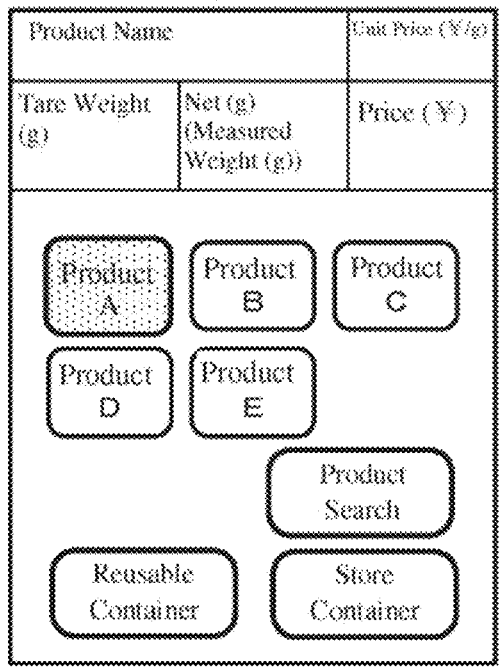
Figure 20C:
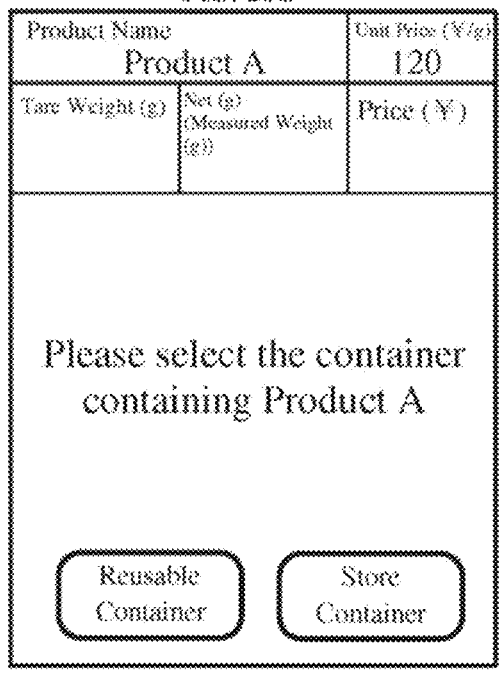
Figure 20D:
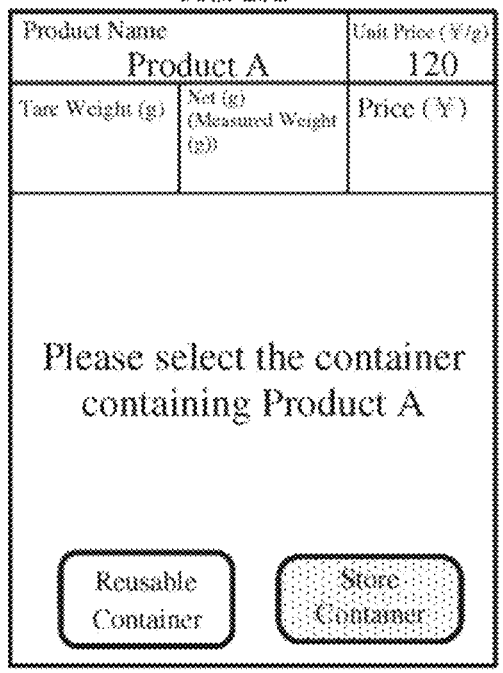

The screes of FIGS. 20A-20C are the same as those of FIGS. 18A to 18C. FIG. 20D shows a screen displayed when the store container button is touched. FIG. 21A shows a screen displayed after the store container button has been touched. In FIG. 21A, the screen displays a message indicating that the store container is to be used (S232), and a message asking for selecting the store container type (S233). FIG. 21B shows a screen displayed when the container M button is touched. FIG. 21C shows a screen displayed after the container M button has been touched. In FIG. 21C, the screen displays a message indicating that the container M is used (S252), the tare weight (S253), and a message asking for mounting (S254). FIG. 21D shows a screen displayed after calculating the net weight and the selling price of the product to be weighed. In FIG. 21D, the screen displays the weighing value (S303), and the net weight and selling price of the product to be weighed (S420).

(Third Screen Transition Example)

FIGS. 22A-D and 23A-D shows examples of the third screen transition in the weighing apparatus 20. In the third screen transition, the screen changes in the order of selection of the product A, selection of the store container, placement of the container, and selection of the container M.

When the operation is performed in the order of selection of the product A, selection of the store container, placement, and selection of container M, the weighing apparatus 20 operates according the following steps in FIGS. 11-17.

S100 (NO)→S101 (YES)→S102→S103→S104→S200 (NO)→S201 (NO)→S202 (NO)→S211 (NO)→S230 (YES)→S231→S232→S233→S250 (NO))→→300 (NO)→S301 (YES)→S302→S303→S310 (NO)→S311 (NO)→S320 (NO)→S322 (YES)→S350 (YES)→S351→S352→S353→S400 (YES))→S410→S420→S430

FIGS. 22A to 23A are the same as those of FIGS. 21A to 22A. FIG. 23B shows a screen displayed after the container M containing the product A is placed. In FIG. 23B, the screen displays the weighing value (S303). FIG. 23C shows a screen displayed when the container M button is touched. FIG. 23D shows a screen displayed after calculating the net weight and the selling price of the product to be weighed. In FIG. 23D, the screen displays a message indicating that the container M is used (S352), the tare weight (weight of the container M) (S353), and the net weight and selling price of the product to be weighed (S420).

(Fourth Screen Transition Example)

Figure 25:
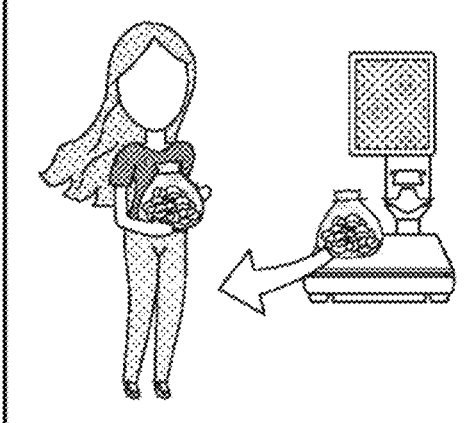
FIG. 25 is an example of screen transitions in the weighing apparatus according to one or more embodiments.

FIGS. 24 and 25 show examples of the fourth screen transition in the weighing apparatus 20. In the fourth screen transition, the screen changes in the order of selection of the product A, placement, and recognition of the reusable container.

When the reusable container is recognized by operating in the order of selection of the product A and placement, the weighing apparatus 20 operates according the following steps in FIGS. 11-17.

S100 (NO)→S101 (YES)→S102→S103→S104→S200 (NO)→S201 (NO)→S202 (NO)→S211 (NO)→S230 (NO)→300 (NO)→S301 (YES)→S302→S303→S310 (NO)→S311 (YES)→S312→S313→S314→S400 (YES)→S410→S420→S430

FIGS. 24A to 24C are the same as those in FIGS. 18A to 18C. FIG. 24D shows a screen displayed after the reusable container containing the product A is placed. The screen of FIG. 24D displays the weighing value (S303), a message indicating that the reusable container has been recognized (S312), and the tare weight (S314). FIG. 25 shows a screen displayed after calculating the net weight and the selling price of the product to be weighed. The screen of FIG. 25 displays the net weight and the selling price of the product to be weighed (S420).

(Fifth Screen Transition Example)

FIGS. 26 and 27 show examples of the fifth screen transition in the weighing apparatus 20. In the fifth screen transition, the screen changes in the order of selection of the product A, placement, and an answer indicating that the store container has been placed.

When the operation is performed in the order of selection of the product A, placement, the answer indicating that the store container has been placed, the weighing apparatus 20 operates according the following steps in FIGS. 11-17.

S100 (NO)→S101 (YES)→S102→S103→S104→S200 (NO)→S201 (NO)→S202 (NO)→S211 (NO)→S230 (NO)→S300 (NO)→S301 (YES)→S302→S303→S310 (NO)→S311 (NO)→S320 (NO)→S322 (NO)→S323→S330 (YES)→S331→S332→S333→S350 (YES)→S351→S352→S353→S400 (YES)→S410→S420→S430

The screens of FIGS. 26A to 26C are the same as the screens of FIGS. 18A to 18C. FIG. 26D shows a screen displayed after the container M containing the product A has been placed. The screen of FIG. 26D displays the weighing value (S303), a message indicating that the reusable container has not been recognized, and a message asking for confirming the placed container (S323). FIG. 27A shows a screen in which the store container has been selected as the placed container. FIG. 27B shows a screen displayed after the store container has been selected. The screen of FIG. 27B displays the store container buttons to be selected (S332), and a message asking for selecting the store container type (S333). FIG. 27C shows a screen displayed when the container M button is touched. FIG. 27D shows a screen displayed after calculating the net weight and the selling price of the product to be weighed. The screen of FIG. 27D displays the container M to be used (S352), the tare weight (S353), and the net selling price of the product to be weighed (S420).

(Sixth Screen Transition Example)

FIGS. 28 and 29 show examples of the sixth screen transition in the weighing apparatus 20. In the sixth screen transition, the screen changes in the order of selection of the product A, placement, and an answer that the reusable container has been placed.

When the operation is performed in the order of selection of the product A, placement, the answer that the reusable container has been placed, the weighing apparatus 20 operates according the following steps in FIGS. 11-17.

S100 (NO)→S101 (YES)→S102→S103→S104→S200 (NO)→S201 (NO)→S202 (NO)→S211 (NO)→S230 (NO)→S300 (NO)→S301 (YES)→S302→S303→S310 (NO)→S311 (NO)→S320 (NO)→S322 (NO)→S323→S330 (NO)→S340 (YES)→S341

The screens of FIGS. 28A to 28D are the same as the screens of FIGS. 26A to 26D. FIG. 29A shows a screen displayed when the reusable container is selected as the placed container. FIG. 29B shows a screen displayed after the reusable container has been selected as the placed container. The screen of FIG. 29B displays a message indicating that the reusable container has not been recognized and a message prompting the reusable container to be remounted (S341).

(Seventh Screen Transition Example)

FIGS. 30 and 31 show examples of the seventh screen transition in the weighing apparatus 20. In the sixth screen transition, the screen changes in the order of selection of the reusable container, selection of the product A, placement, and recognition of the reusable container.

When the reusable container is recognized by operating in the order of the selection of the reusable container, the selection of the product A, and the placement, the weighing apparatus 20 operates according the following steps in FIGS. 11-17.

S100 (NO)→S101 (NO)→S200 (NO)→S201 (NO)→S202 (YES)→S203→S204→S205→S300 (NO)→S301 (NO)→S400 (NO)→S100 (NO)→S101 (YES)→S102→S103→S104→S200 (NO)→S201 (YES)→S300 (NO)→S301 (YES)→S302→S303→S310 (NO)→S311 (YES)→S312→S313→S314→S400 (YES)→S410→S420→S430

Figure 30A:
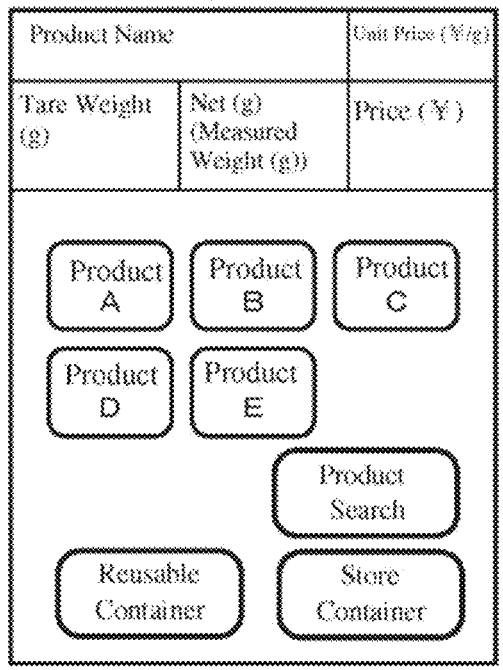
FIGS. 30A-30D are examples of screen transitions in the weighing apparatus according to one or more embodiments.
Figure 30B:
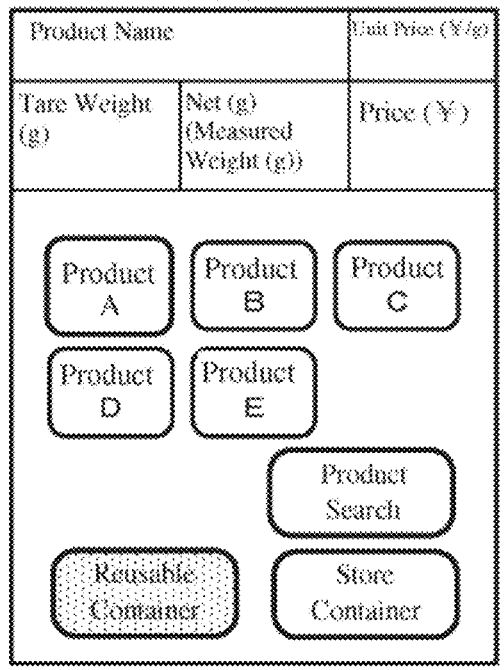
Figure 30C:
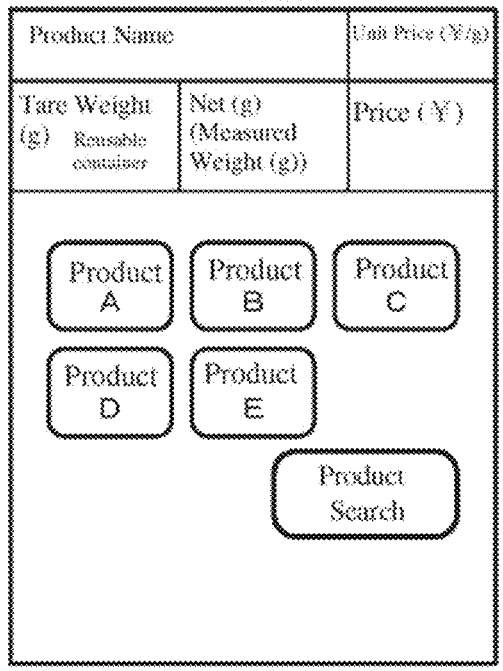
Figure 30D:
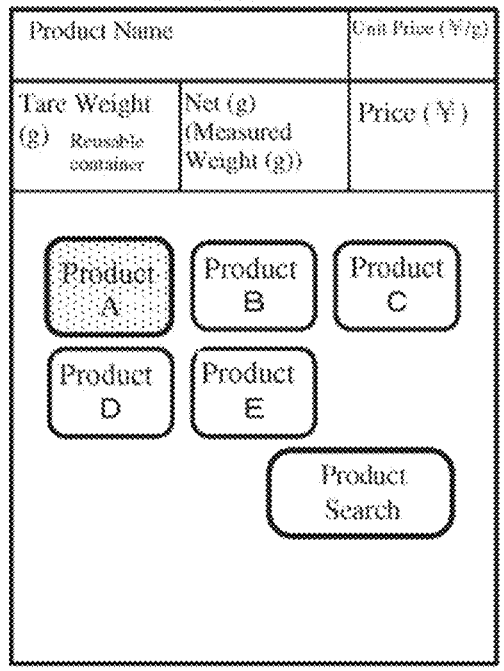

FIG. 30A shows a screen displayed before the start of operation. FIG. 30B shows a screen displayed when the reusable container button is touched. FIG. 30C shows a screen displayed after the reusable container button has been touched. The screen of FIG. 30C displays that the reusable container has been selected (S204). FIG. 30D shows a screen displayed when the product A button is touched. FIG. 31A shows a screen displayed after the product A button has been touched. The screen of FIG. 31A displays the product name and unit price of the product A as the product to be weighed (S103). FIG. 31B shows a screen displayed after the reusable container containing the product A has been placed. The screen of FIG. 31B displays the weighing value (S303), a message indicating that the reusable container has been recognized (S312), and the tare weight (S314). FIG. 31C shows a screen displayed after calculating the net weight and the selling price of the product to be weighed. The screen of FIG. 31C displays the net weight and the selling price of the product to be weighed (S420).

When the reusable container has not been recognized by operating in the order of selection of the reusable container, selection of the product A, and placement, the screen changes in the order of FIG. 30A, FIG. 30B, FIG. 30C, FIG. 30D, FIG. 31A, and FIG. 31D.

When the reusable container has not been recognized by operating in the order of selection of the reusable container, selection of the product A, and placement, the weighing apparatus 20 operates according the following steps in FIGS. 11-17.

S100 (NO)→S101 (NO)→S200 (NO)→S201 (NO)→S202 (YES)→S203→S204→S205→S300 (NO)→S301 (NO)→S400 (NO)→S100 (NO)→S101 (YES)→S102→S103→S104→S200 (NO)→S201 (YES)→S300 (NO)→S301 (YES)→S302→S303→S310 (NO)→S311 (NO)→S320 (YES)→S321

The screen of FIG. 31D displays a message indicating that the reusable container has not been recognized and a message prompting the reusable container to be remounted (S321).

(Eighth Screen Transition Example)

FIGS. 32 and 33 show examples of the eighth screen transition in the weighing apparatus 20. In the eighth screen transition, the screen changes in the order of selection of the reusable container, placement, selection of the product A, and recognition of the reusable container.

When the reusable container is recognized by operating in the order of selection of the reusable container, placement, selection of the product A, the weighing apparatus 20 operates according the following steps in FIGS. 11-17.

S100 (NO)→S101 (NO)→S200 (NO)→S201 (NO)→S202 (YES)→S203→S204→S205→S300 (NO)→S301 (YES)→S302→S303→S310 (NO)→S311 (YES)→S312→S313→S314→S400 (NO)→S100 (NO)→S101 (YES)→S102→S103→S104→S200 (YES)→S300 (YES)→S400 (YES)→S410→S420→S430

Figure 32A:
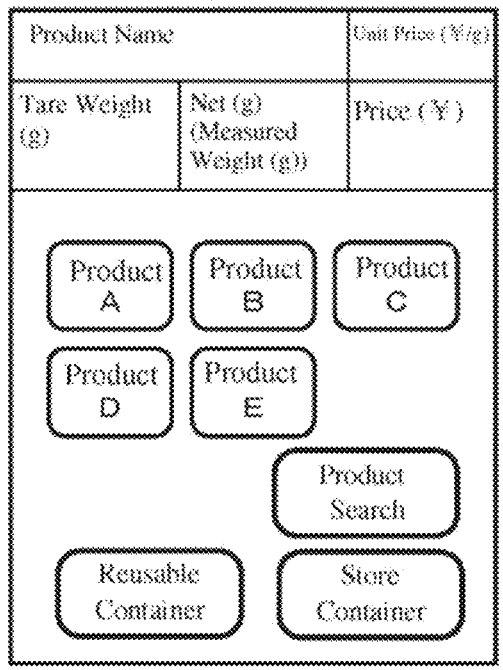
FIGS. 32A-32D are examples of screen transitions in the weighing apparatus according to one or more embodiments.
Figure 32B:
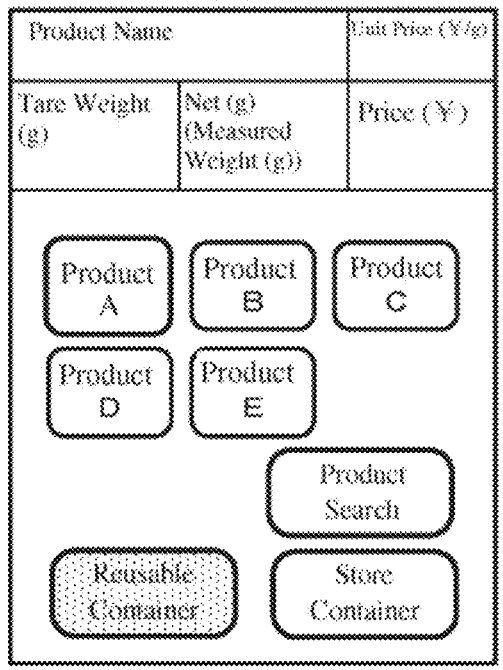
Figure 32C:
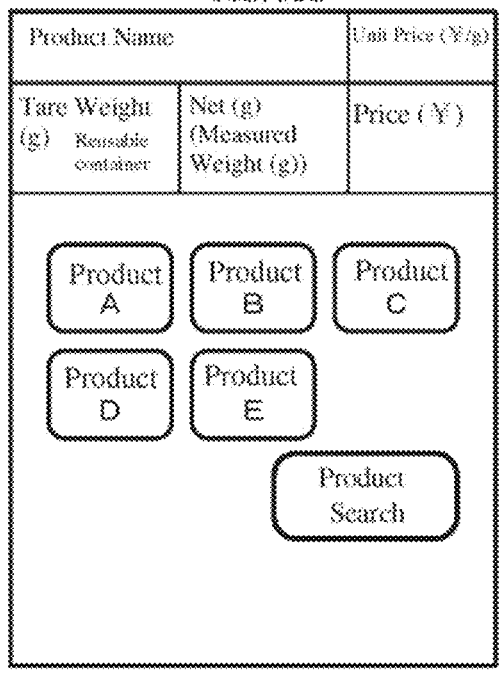
Figure 32D:
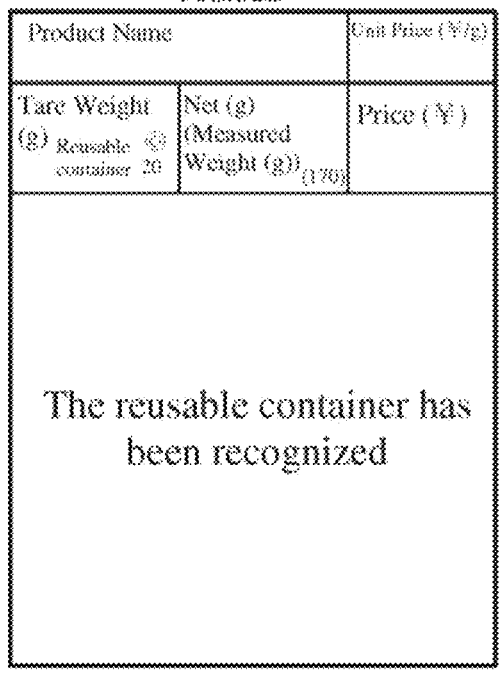
Figure 33A:
FIGS. 33A-33D are examples of screen transitions in the weighing apparatus according to one or more embodiments.
Figure 33B:
Figure 33C:

The screens of FIGS. 32A to 32C are the same as the screens of FIGS. 30A to 30C. FIG. 32D shows a screen displayed after the reusable container containing the product A has been placed. The screen of FIG. 32D displays the weighing value (S303), a message indicating that the reusable container has been recognized (S312), and the tare weight (S314). FIG. 33A shows a screen following FIG. 32D. FIG. 33B shows a screen displayed when the product A button is touched. FIG. 33C shows a screen displayed after calculating the net weight and the selling price of the product to be weighed. The screen of FIG. 33C displays the product name and unit price of the product A, which is the product to be weighed (S103), and the net weight of the product to be weighed and the selling price (S420).

When the reusable container has not been recognized by operating in the order of selection of the reusable container and placement, the screen changes in the order of FIG. 32A, FIG. 32B, FIG. 32C, FIG. 32D, FIG. 33A, and FIG. 33D.

When the reusable container has not been recognized in the order of selection of the reusable container, selection of the product A is selected, and placement, the weighing apparatus 20 operates according the following steps in FIGS. 11-17.

S100 (NO)→S101 (NO)→S200 (NO)→S201 (NO)→S202 (YES)→S203→S204→S205→S300 (NO)→S301 (YES)→S302→S303→S310 (NO)→S311 (NO)→S320 (YES)→S321

Figure 33D:
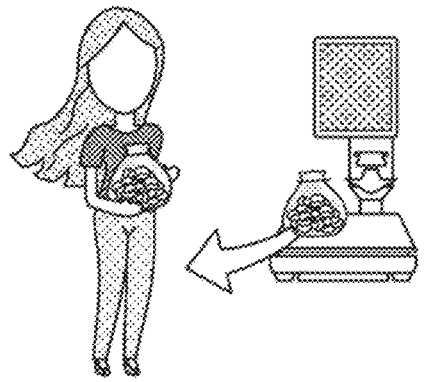

The screen of FIG. 33D displays a message indicating that the reusable container has not been recognized and a message prompting the reusable container to be remounted (S321).

(Ninth Screen Transition Example)

FIGS. 34 and 35 show examples of the ninth screen transition in the weighing apparatus 20. In the ninth screen transition, the screen changes in the order of selection of the store container, selection of the container M, selection of the product A, and placement.

When the operation is performed in the order of selection of the store container, selection of the container M, selection of the product A, and placement, the weighing apparatus 20 operates according the following steps in FIGS. 11-17.

S100 (NO)→S101 (NO)→S200 (NO)→S201 (NO)→S202 (NO)→S211 (NO)→S230 (YES)→S231→S232→S233→S250 (YES)→S251→S252→S253→S254→S300 (NO)→S301 (NO)→S400 (NO)→S100 (NO)→S101 (YES)→S102→S103→S104→S200 (YES)→S300 (NO)→S301 (YES)→S302→S303→S310 (YES)→S400 (YES)→S410→S420→S430

FIG. 34A shows a screen displayed before the start of operation. FIG. 34B shows a screen displayed when the store container button is touched. FIG. 34C shows a screen displayed after the store container button has been touched. The screen of FIG. 34C displays the store container to be used (S232), a message asking for selecting the store container type (S233). FIG. 34D shows a screen displayed when the container M button is touched. FIG. 35A shows a screen displayed after the container M button has been touched. The screen of FIG. 35A displays the container M to be used (S252) and the tare weight (S253). FIG. 35B shows a screen displayed when the product A button is touched. FIG. 35C shows a screen displayed after the product A button is touched. The screen of FIG. 35C displays the product name and unit price of the product A, which is the product to be weighed (S103) and a message asking for placement (S104). FIG. 35D shows a screen displayed after calculating the net weight and the selling price of the product to be weighed. The screen of FIG. 35D displays the weighing value (S303), and the net weight and the selling price of the product to be weighed (S420).

(Tenth Screen Transition Example)

FIG. 36 is an example of the tenth screen transition in the weighing apparatus 20. In the tenth screen transition, the screen changes in the order of selection of the store container, selection of the container M, placement, and selection of the product A.

When the operation is performed in the order of selection of the store container, selection of the container M, placement, and selection of the product A, the weighing apparatus 20 operates according the following steps in FIGS. 11-17.

S100 (NO)→S101 (NO)→S200 (NO)→S201 (NO)→S202 (NO)→S211 (NO)→S230 (YES)→S231→S232→S233→S250 (YES)→S251→S252→S253→S254→S300 (NO)→S301 (YES)→S302→S303→S310 (YES)→S400 (NO)→S100 (NO)→S101 (YES)→S102→S103→S104→S200 (YES)→S300 (YES)→S400 (YES)→S410→S420→S430

In an example of the tenth screen transition, the screens corresponding to FIGS. 34A to 34D are omitted. FIG. 36A is the same as FIG. 35A. FIG. 36B shows a screen displayed after the container M containing the product A has been placed. The screen of FIG. 36B displays the weighing value (S303). FIG. 36C shows a screen displayed when the product A button is touched. FIG. 36D shows a screen displayed after calculating the net weight and the selling price of the product to be weighed. The screen of FIG. 36D displays the product name and unit price of the product A, which is the product to be weighed (S103), and the net weight and the selling price of the product to be weighed (S420).

(Eleventh Screen Transition Example)

FIGS. 37 and 38 show examples of the eleventh screen transition in the weighing apparatus 20. In the eleventh screen transition, the screen changes in the order of selection of the store container, placement, selection of the container M, and selection of the product A.

When the operation is performed in the order of selection of the store container, placement, selection of the container M, selection of the product A, the weighing apparatus 20 operates according the following steps in FIGS. 11-17.

S100 (NO)→S101 (NO)→S200 (NO)→S201 (NO)→S202 (NO)→S211 (NO)→S230 (YES)→S231→S232→S233→S250 (NO)→S300 (NO)→S301 (YES)→S302→S303→S310 (NO)→S311 (NO)→S320 (NO)→S322 (YES)→S350 (YES)→S351→S352→S353→S400 (NO)→S100 (NO)→S101 (YES)→S102→S103→S104→S200 (YES)→S300 (YES)→S400 (YES)→S410→S420→S430

The screens of FIGS. 37A to 37A are the same as those in FIGS. 34A to 34C. FIG. 37D shows a screen displayed after the container M containing the product A has been placed. The screen of FIG. 37D displays the weighing value (S303). FIG. 38A shows a screen displayed when the container M button is touched. FIG. 38B shows a screen displayed after the container M button has been touched. The screen of FIG. 35B displays the container M to be used (S352) and the tare weight (S353). FIG. 38C shows a screen displayed when the product A button is touched. FIG. 38D shows a screen displayed after calculating the net weight and the selling price of the product to be weighed. The screen of FIG. 38D displays the product name and unit price of the product A, which is the product to be weighed (S103), and the net weight and the selling price of the product to be weighed are displayed (S420).

(Twelfth Screen Transition Example)

Figure 40:
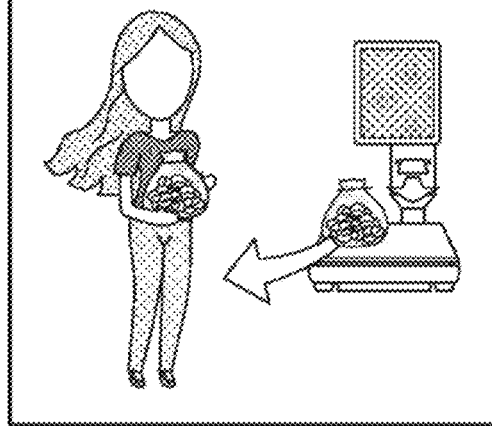
FIG. 40 is an example of screen transitions in the weighing apparatus according to one or more embodiments.

FIGS. 39 and 40 show examples of the twelfth screen transition in the weighing apparatus 20. In the twelfth screen transition, the screen changes in the order of placement and selection of the product A.

When the operation is performed in the order of placement and selection of the product A, the weighing apparatus 20 operates according the following steps in FIGS. 11-17.

S100 (NO)→S101 (NO)→S200 (NO)→S201 (NO)→S202 (NO)→S211 (NO)→S230 (NO)→S300 (NO)→S301 (YES)→S302→S303→S310 (NO)→S311 (YES)→S312→S313→S314→S400 (NO)→S100 (NO)→S101 (YES)→S102→S103→S104→S200 (YES)→S300 (YES)→S400 (YES)→S410→S420→FIG. 430

FIG. 39A shows a screen displayed before the start of operation. FIG. 39B shows a screen displayed after the reusable container containing the product A is placed. The screen of FIG. 39B displays the weighing value (S303), a message indicating that the reusable container has been recognized (S312), and the tare weight (S314). FIG. 39C shows a screen following FIG. 39B. FIG. 39D shows a screen displayed when the product A button is touched. FIG. 40 shows a screen displayed after calculating the net weight and the selling price of the product to be weighed. The screen of FIG. 40 displays the product name and unit price of the product A, which is the product to be weighed (S103), and the net weight and the selling price of the product to be weighed (S420).

(Thirteenth Screen Transition Example)

FIGS. 41 and 42 show examples of the thirteenth screen transition in the weighing apparatus 20. In the thirteenth screen transition, the screen changes in the order of placement, answering that the store container has been placed, selection of the store container, selection of the container M, and selection of the product A.

When the operation is performed in the order of placement, answering that store container has been placed, selection of the store container, selection of the container M, and selection of the product A, the weighing apparatus 20 operates according the following steps in FIGS. 11-17.

S100 (NO)→S101 (NO)→S200 (NO)→S201 (NO)→S202 (NO)→S211 (NO)→S230 (NO)→S300 (NO)→S301 (YES)→S302→S303→S310 (NO)→S311 (NO)→S320 (NO)→S322 (NO)→S323→S330 (YES)→S331→S332→S333→S350 (YES)→S351→S352→S353→S400 (NO) S100 (NO)→S101 (YES)→S102→S103→S104→S200 (YES)→S300 (YES)→S400 (YES)→S410→S420→S430

FIG. 41A shows a screen displayed before the start of operation. FIG. 41B shows a screen displayed after the container M containing the product A has been placed. The screen of FIG. 41B displays the weighing value (S303), a message indicating that the reusable container has not been recognized, and a message asking for confirmation of the placed container (S323). FIG. 41C shows a screen displayed when the placed container is answered to be a store container. FIG. 41D shows a screen displayed after it has been answered that the placed container is a store container. The screen of FIG. 41D the store container to be used (S332), and a message asking for selecting the store container type (S333). FIG. 42A shows a screen displayed when the container M button is touched. FIG. 42B shows a screen displayed after the container M button has been touched. The screen of FIG. 42B displays the container M to be used (S352), and the tare weight (S353). FIG. 42C shows a screen displayed when the product A button is touched. FIG. 42D shows a screen displayed after calculating the net weight and the selling price of the product to be weighed. The screen of FIG. 42D displays the product name and unit price of the product A, which is the product to be weighed (S103), and the net weight and selling price of the product to be weighed (S420).

(Fourteenth Screen Transition Example)

FIG. 43 is an example of the fourteenth screen transition in the weighing apparatus 20. In the fourteenth screen transition, the screen changes in the order of placement and answering that the reusable container has been placed.

When the operation is performed in the order of placement, answering that the reusable container has been placed, the weighing apparatus 20 operates according the following steps in FIGS. 11-17.

S100 (NO)→S101 (NO)→S200 (NO)→S201 (NO)→S202 (NO)→S211 (NO)→S230 (NO)→S300 (NO)→S301 (YES)→S302→S303→S310 (NO)→S311 (NO)→S320 (NO)→S322 (NO)→S323→S330 (NO)→S340 (YES)→S341

FIG. 43A shows a screen displayed before the start of operation. FIG. 43B shows a screen displayed after the reusable container containing the product A is placed. The screen of FIG. 43B, the weighing value (S303), a message indicating that the reusable container has not been recognized, and a message asking for confirmation of the placed container (S323). FIG. 43C shows a screen displayed when the placed container was answered to be the reusable container. In the screen of FIG. 43D, the reusable container is selected as the placed container. The screen of FIG. 43D, a message indicating that the reusable container has not been recognized and a message prompting the reusable container to be remounted (S341).

In one or more embodiments, the weighing apparatus 20 may read the RFID tag during fluctuation of the weighing value or after stabilization of the weighing value. The weighing apparatus 20 may read the RFID after recognizing that the container has been placed by using technologies such as an image recognition method other than weighing methods. The weighing apparatus 20 may determine whether the reusable container has been recognized after the weighing apparatus 20 reads the RFID tag and then performs one or more processes. Reading the RFID tag and determining whether the reusable container has been recognized may not be performed simultaneously. Reading the RFID tag may be performed before determining whether the reusable container has been recognized.

In one or more embodiments, the weighing apparatus 20 may read the RFID tag at least one when the product is specified or when the reusable container is selected.

In one or more embodiments, the RFID tag reader/writer 29 may continue to transmit a radio wave. When the radio wave is constantly transmitted, the weighing apparatus 20 may stop reading the RFID tag before at least one when the product is specified or when the reusable container is selected. As a result, it is possible to prevent accidental acquisition of unnecessary information such as information on the RFID tag of other reusable containers) even if the radio wave is constantly transmitted.

In the above examples, the store container type button is displayed by transitioning to another screen after operating the store container button, but the store container type button may be displayed on a screen that displays the store container button. As another example, the reusable container button, the store container (container S) button, the store container (container M) button, and the store container (container L) button may be displayed on the same screen.

In the above examples, the weighing apparatus 20 calculates and displays the net weight after selection of the product, acquisition of the tare weight, and acquisition of the weighing value. As another example, the weighing apparatus 20 calculates and displays the net weight after acquisition of the tare weight, and acquisition of the weighing value before selection of the product.

In the above examples, the weighing apparatus 20 communicates with the RFID tag, but another device different from the weighing apparatus 20 may communicate with the RFID tag. In such a case, the weighing apparatus 20 may read information from the RFID and write information to the RFID via another device. In other words, the weighing apparatus 20 may not include the RFID tag reader/writer 29 and another device includes an RFID tag reader/writer. For example, a weighing system may include a plurality of devices having functions of the operation display, the weighing scale, and the RFID tag reader/writer.

In one or more embodiments, the weighing apparatus 20 may not register the reusable container. For example, another device different from the weighing apparatus 20 may register the reusable container and have at least a weighing function, the RFID tag reading function, and an output function for outputting the completion of writing the tare weight.

In one or more embodiments, another device different from the weighing apparatus 20 may print and issue the label.

In one or more embodiments, information written on the RFID label is not limited to the weight information. For example, in addition to the weight information, a registration date (registration date and time) and a registration expiration date (for example, one year from the time of registration) may be written on the RFID tag. When registered contents of the RFID tag are confirmed, a confirmation date may be written. In addition, the following information may be written on the RFID tag:

device ID of a registered device used for registration of the reusable container;
store ID of a registered store in which the reusable container is registered;
reusable container characteristics information indicating a material, a shape, and a color of reusable container; and
serial number of the reusable container associated with customer information (e.g., customer number.

The reusable container characteristics information may be written on the RFID by displaying a screen in which the clerk or customer selects the characteristics.

In one or more embodiments, the weighing apparatus 20 may confirm the registered contents of the registered reusable container according to the following steps.

At step S1, the weighing apparatus 20 weighs the registered reusable container placed on the weighing platform and reads the weight information of the reusable container from the RFID label of the reusable container.

At step S2, the weighing apparatus 20 compares the weighing value, which is the weight of the reusable container, with the weight information indicating the registered weight of the reusable container. If there is a fraud that intentionally makes the reusable container heavier or a fraud that replaces the RFID label of another reusable container, the weighing value may be different from the weight information.

At step S3, the weighing apparatus 20 outputs the comparison result of the weighing value and the weight information. If the weighing value and the weight information is the same, the weighing apparatus 20 displays that the weight information read from the RFID label is normal. If the weighing value and the weight information is not the same, the weighing apparatus 20 may display that the weight information read from the RFID label is not normal and replace the registered contents in the RFID tag with weighing value.

In one or more embodiments, when writing the date and time information (e.g., registration date, registration expiration date, and confirmation date) on the RFID label, the weighing apparatus 20 may display a message asking for confirmation the registration contents of the reusable container.

In one or more embodiments, when the weighing apparatus 20 recognizes the reusable container, the weighing apparatus 20 may display the control number on the tare weight display field 1202 or issue a label printed with the control number. In one or more embodiments, when the weighing apparatus 20 recognizes the reusable container, the weighing apparatus 20 displays a message asking for confirming the registration contents of the reusable container based on the registration expiration date or issue a label printed with the above message.

In one or more embodiments, information may be written on the RFID label the product is purchased using the reusable container.

For example, when purchasing a product using the reusable container, the selling price may be written on the RFID label. Another device different from the weighing apparatus 20 may perform the registration process and the weighing apparatus 20 may not need to print and issue a label. The weighing apparatus 20 may write the product name of the product, the product ID, the unit price, and the net weight on the RFID label.

The weighing apparatus 20 may write information such as the number of times of use and the amount of use as purchase history on the RFID label. That is, every time the reusable container is used, the purchase information by the reusable container is stored, and the reusable container itself may store the purchase history of the purchase using the reusable container. For example, flexible discounts may be applied according to the purchase history. The purchase history may be stored outside the reusable container (for example, the weighing apparatus 20, a management device, and a cloud server) in association with the management number (e.g., serial number or membership number).

In one or more embodiments, the screen of the weighing apparatus 20 may display the product button of the product (the product that can be regarded as taken out of the container) in the container (the reusable container, store container), and may not display the product button of the product other than the product that is likely to be operated by the customer.

Figure 44:
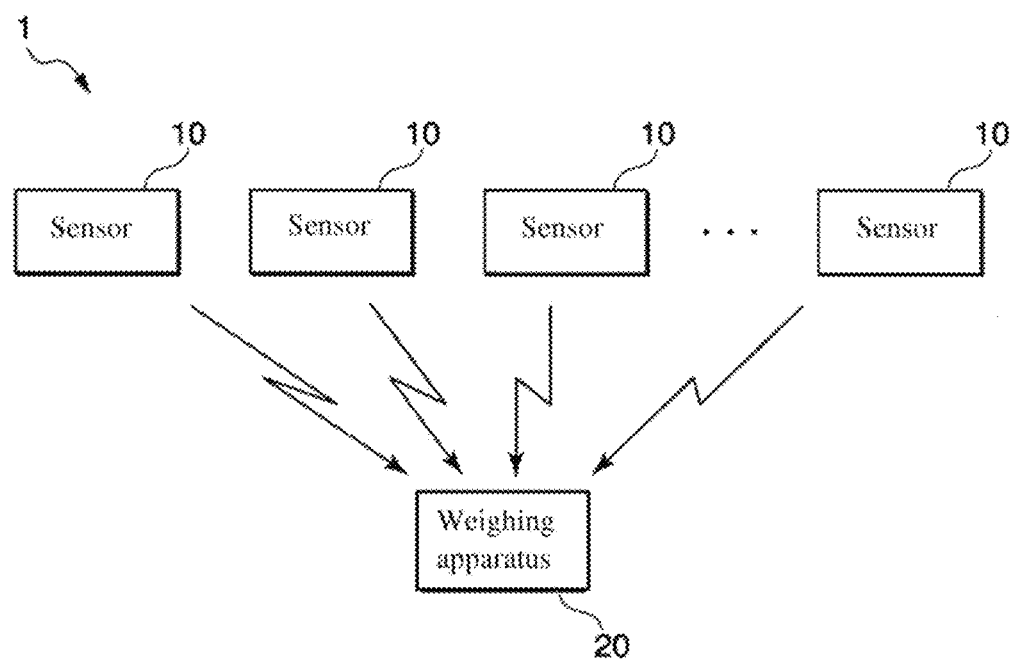
FIG. 44 is a diagram showing an example of a configuration of a product sales data processing system according to one or more embodiments.

According to one or more embodiments, a product sales data processing system 1 may be applied in the store of FIG. 1. As shown in FIG. 44, the product sales data processing system 1 includes a plurality of sensors 10 attached to the bulk food containers 300 and the bulk food dispensers 400 in addition to the weighing apparatus 20. For example, the sensor 10 may be attached to a lid of the bulk food container 300 to be opened and closed or a lever used to open and close the bulk food dispenser 400. The sensor 10 detects displacement (e.g., tilt or rotation) of the sensor. In one or more embodiments, the sensor 10 may be a tilt detection sensor that detects a tilt of the sensor 10. The sensor 10 may be referred to as the tilt detection device or a detection device.

The weighing apparatus 20 has the hardware configuration shown in FIG. 3. The weighing apparatus 20 further stores a sensor setting file shown in FIG. 45 and a display control table (DCT) shown in FIG. 46. The sensor setting file is a file related to the sensors 10. The DCT includes display control information (DCI) used for display control of the product buttons, and may be referred to as a product button display control table.

Figures 45, 46, 47:
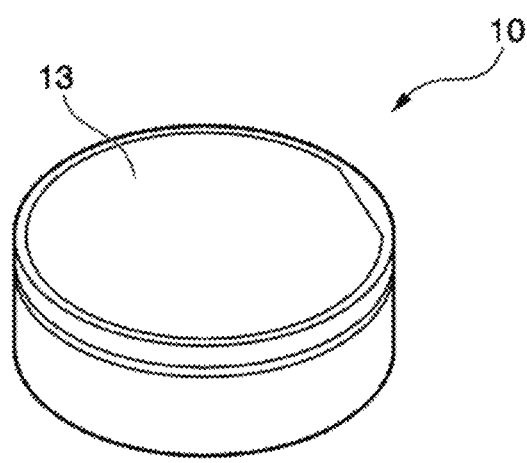
FIG. 45 is an example of a sensor setting file according to one or more embodiments.
FIG. 46 is an example of a display control table (DCT) according to one or more embodiments.
FIG. 47 is a diagram showing an example of the appearance of the sensor according to one or more embodiments.

As shown in FIG. 45, the sensor setting file includes a sensor ID and a product button ID as data items. The sensor ID is identification information that identifies each of the sensors 10. The sensor ID may be referred to as a detection device ID. The product button ID of the sensor setting file indicates the same as the product button ID of FIG. 5. In the sensor setting file, the sensor 10 and the product button are associated with each other. The weighing apparatus 20 may receive the sensor setting file from an external device and store the sensor setting file in the RAM 23.

As shown in FIG. 46, the DCT includes a reception time, a sensor ID, product button ID, and an automatic deletion time as information elements of the DCI. In one or more embodiments, "adding DCI" indicates that the information elements of a row of the DCT of FIG. 16 are added to the DCT. "Deleting DCI" indicates that the information elements of a row of the DCT of FIG. 16 are deleted from the DCT. The reception time indicates a time when the weighing apparatus 20 receives the sensor ID from the sensor 10. The sensor ID and the product button ID of the DCT indicate the same as the sensor ID and the product button ID of the sensor setting file, respectively. The automatic deletion time indicates a time when the sensor ID and the product button ID are automatically deleted from the DCT.

FIG. 47 shows an example of an appearance of the sensor 10. The sensor 10 may detect at least one of a tilt and a rotation. The sensor 10 is attached to an object or installed in the object and detects the tilt operation of the object or a part of the object. In one or more embodiments, the sensor 10 may be attached to the container. As shown in FIG. 45, the sensor 10 may have a cylindrical shape. The sensor 10 is not limited to a cylindrical shape, and may have any shape.

The sensor 10 includes an operation button 13 on an upper surface of the sensor 10. For example, the operation button 13 is not operated by the customer, and is operated by the clerk or a maintenance staff who maintains the product sales data processing system 1. The operation button 13 may be referred to as an operation unit or an operation interface.

Figure 48:
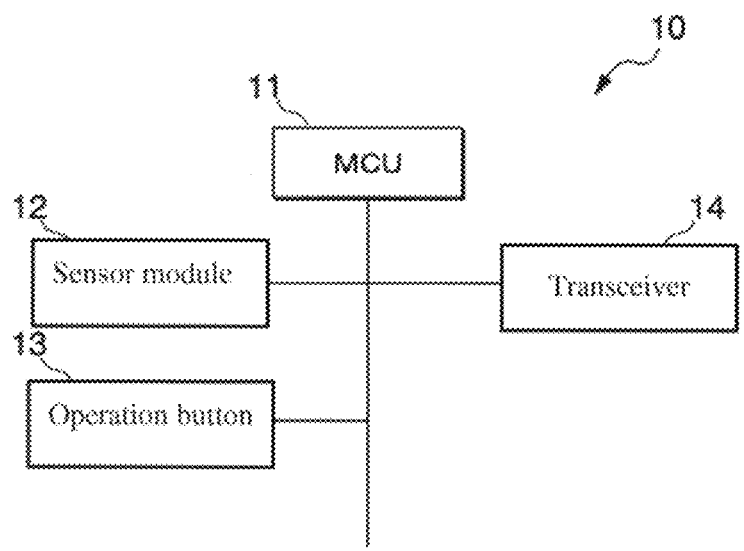
FIG. 48 is a diagram showing an example of hardware configuration of the sensor according to one or more embodiments.

As shown in FIG. 48, the sensor 10 includes a memory controller unit (MCU) 11, a sensor module 12, the operation button 13, and a transceiver 14.

The MCU 11 is a microprocessor that controls the sensor 10. The MCU 11 includes a memory in addition to a processing unit. The MCU 11 controls operations of the sensor 10 by reading and executing a program stored inside. The sensor 10 may have a configuration including a CPU, a ROM, and a RAM instead of the MCU 11.

The sensor module 12 detects a tilt angle of the sensor 10. For example, the sensor module 12 detects the tilt angle in the tilt operation when the sensor 10 is tilted in a predetermined direction. The sensor module 12 includes a sensor element and a signal processing circuit. The sensor module 12 may be referred to as a tilt detection unit.

The operation button 13 is a button pressed for operation.

The transceiver 14 transmits signals to other devices and receives signals from other devices. In one or more embodiments, the transceiver 14 transmits the sensor ID of the sensor 10 to the weighing apparatus 20 using wireless communication. The wireless communication may be communication using Bluetooth, wireless LAN, mobile communication such as long term evolution (LTE) and new radio (NR), and RFID technologies. The sensor 10 communicates with the weighing apparatus 20 using wired communication.

The sensor 10 may have a clock function (timekeeping function). The sensor 10 may measure the remaining time up to a predetermined time and the elapsed time from a certain state.

Figure 49:
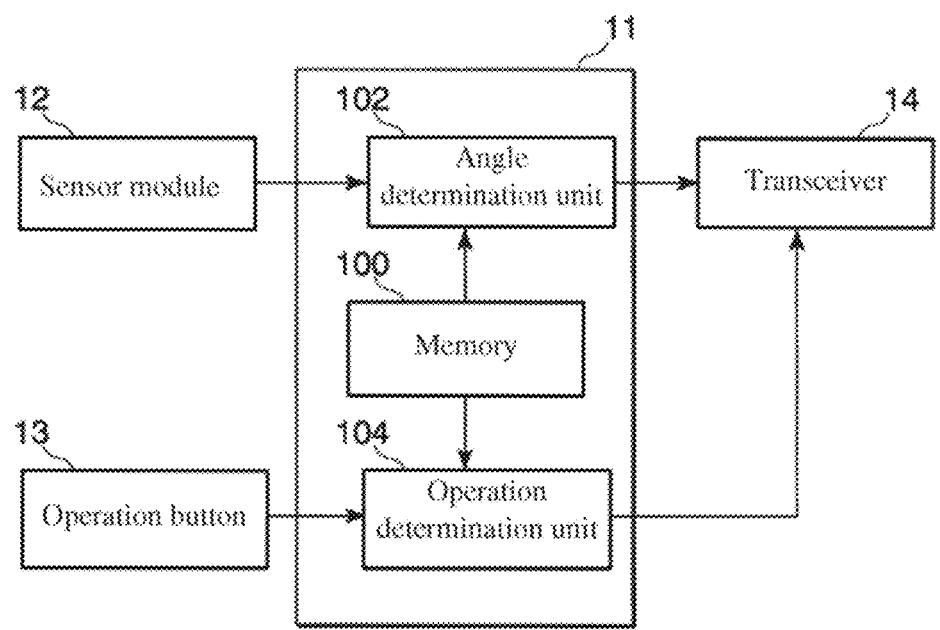
FIG. 49 is a block diagram of the sensor according to one or more embodiments.
Figure 50A:
FIGS. 50A-50C are diagrams for explaining tilt detection according to one or more embodiments.
Figure 50B:
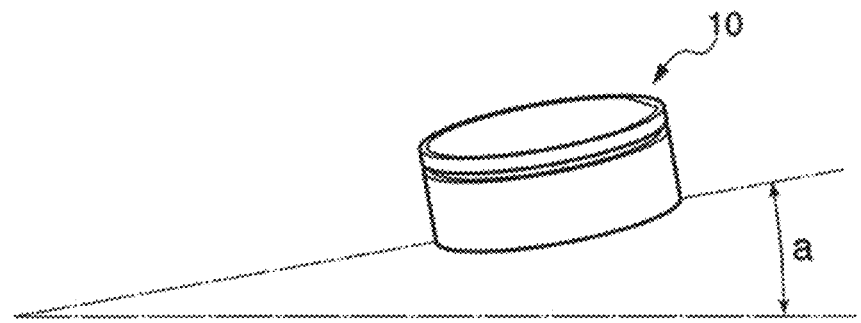
Figure 50C:
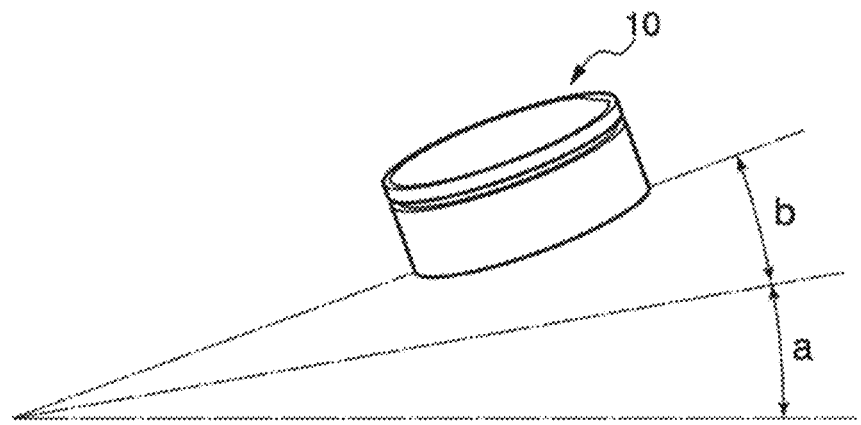

FIG. 49 shows a block diagram of the sensor 10. FIGS. 50A, 50B, and 50C show method of tilt detection according to one or more embodiments.

As shown in FIG. 49, the MCU 11 of the sensor 10 includes a memory 100 and functions an angle determination unit 102 and an operation determination unit 104.

The memory 100 stores a set angle used for the determination by the angle determination unit 102. The set angle is an angle used for determining whether the object of which the tilt is detected is in an open state. The open state is a state in which the product can be taken out from the container and a state in which the product is released from the container. In one or more embodiments, the set angle may be set in each of objects (e.g., containers). In other words, the set angles for the same type of containers may be the same angle.

As another example, the set angle may be set in each product contained in the container. In other words, the set angles for the same type of containers may be different angles.

The memory 100 of each sensor 10 stores the set angle in accordance with the object attached to each sensor 10. The memory 100 further stores the sensor ID of the sensor 10.

The sensor module 12 detects the tilt angle of the sensor 10 and outputs information indicating the tilt angle to the angle determination unit 102. For example, when the sensor 10 is tilted from a position shown in FIG. 50A to a position shown in FIG. 5B, the sensor module 12 outputs "a" degree as the tilt angle to the angle determination unit 102. Further, when the sensor 10 is tilted from the position shown in FIG. 5C to the position shown in FIG. 5B, the sensor module 12 outputs "b" degree as the tilt angle to the determination unit 102.

The operation button 13 can detect the presence or absence of operation of the operation button 13. When the operation button 13 is pushed, the operation button 13 outputs to the operation determination unit 104 information indicating that the operation has been performed.

When the angle determination unit 102 receives the tilt angle of the sensor module 12, the angle determination unit 102 determines whether the tilt angle of the sensor 10 is equal to or greater than the set angle stored in the memory 100. When the tilt angle of the sensor module 12 is equal to or greater than the set angle stored in the memory 100, the angle determination unit 102 causes the transceiver 14 to transmit the sensor ID stored in the memory 100 to the weighing apparatus 20.

When the tilt angle of the sensor module 12 is equal to or greater than the set angle stored in the memory 100, the angle determination unit 102 determines whether the product has been taken out from the container.

The operation determination unit 104 inputs determines whether the operation button 13 has been operated. When the operation determination unit 104 determines that the operation button 13 has been operated, the operation determination unit 104 causes the transceiver 14 to transmit the sensor ID of the sensor 10 to the weighing apparatus 20.

The transceiver 14 transmits the sensor ID of the sensor 10 to the weighing apparatus 20 under the control of the angle determination unit 102 or the operation determination unit 104.

Figure 51A:
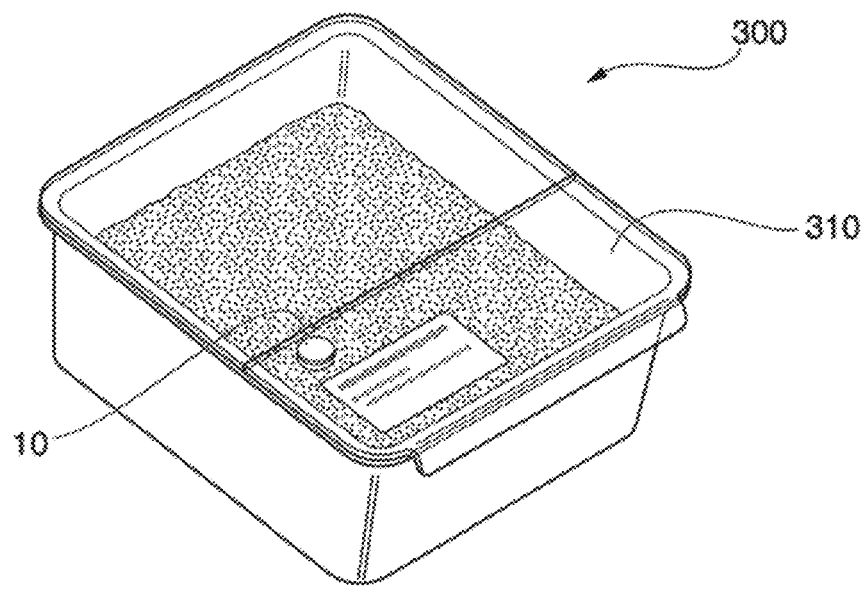
FIGS. 51A and 51B are diagrams showing the sensor attached to a bulk food container.
Figure 51B:
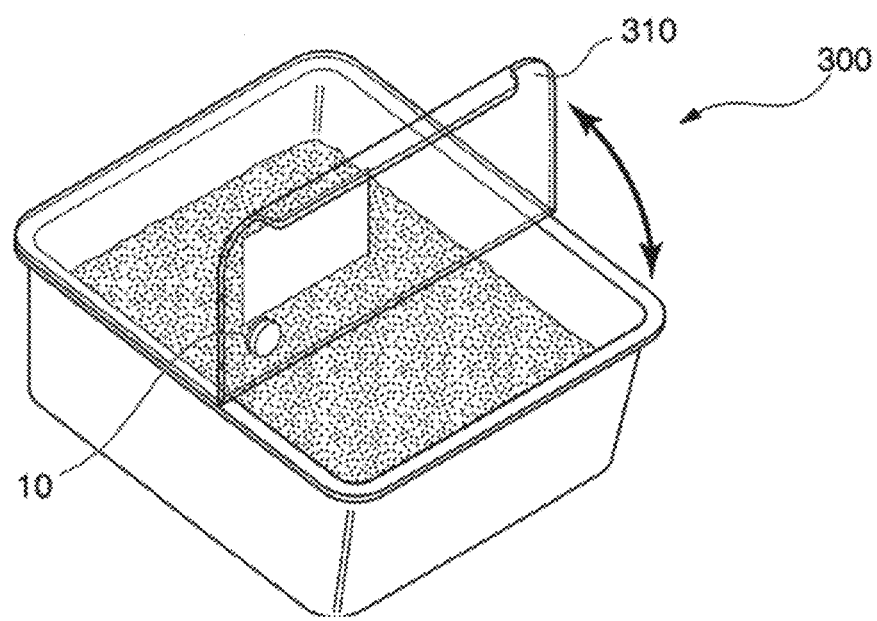

FIGS. 51A and 51B show states of the sensor 10 attached to the container 300. FIG. 51A shows a state in which the upper lid portion 310 is not lifted (i.e., a closed state in which the product cannot be taken out). FIG. 51B shows a state in which the upper lid portion 310 is lifted (i.e., an open state in which the product can be taken out). When the upper lid portion 310 is lifted from the state of FIG. 51A to the state of FIG. 51B, the sensor 10 detects the tilt angle tiled from the state of FIG. 51A to the state of FIG. 51B.

Figure 52A:
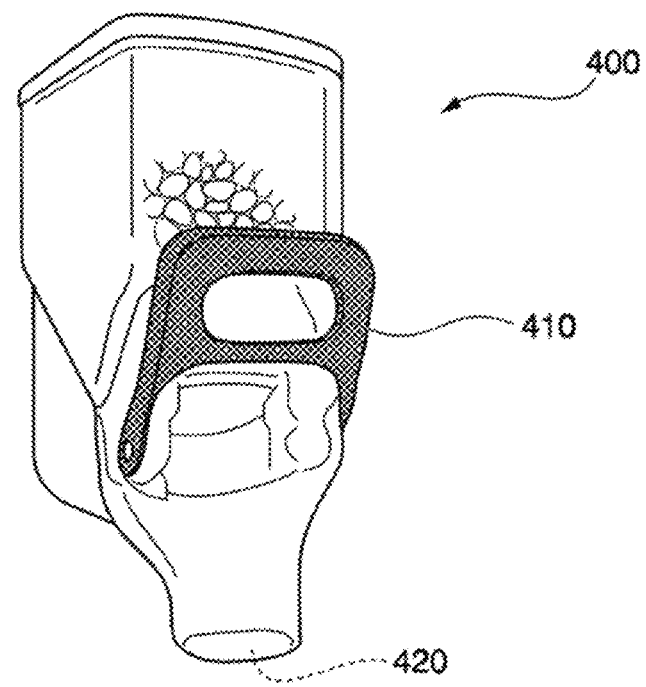
FIGS. 52A and 52B are diagrams showing of the sensor attached to a bulk food dispenser.
Figure 52B:
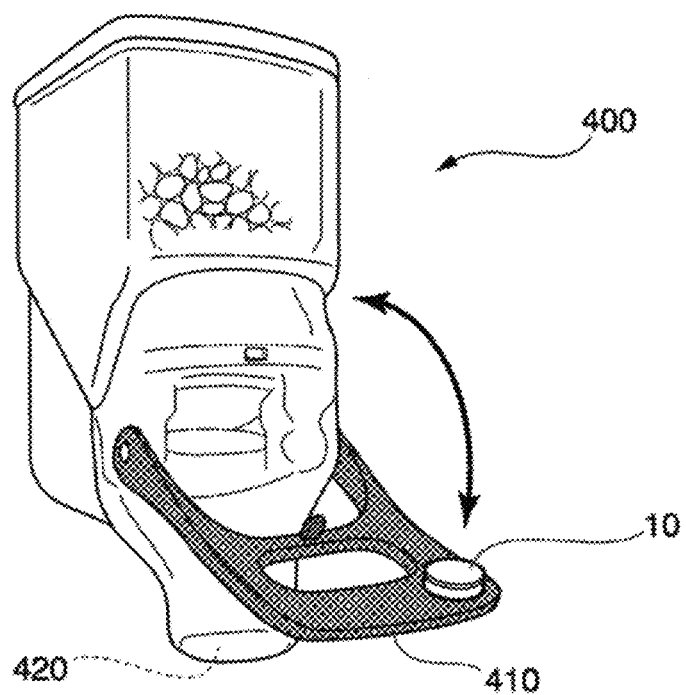

FIGS. 52A and 52B show states of the sensor 10 attached to the container 400. FIG. 52A shows a state in which the pressing portion 410 (e.g., lever) is not pushed down (i.e., a closed state in which the product is not discharged from the discharge port 420). FIG. 52B shows a state in which the pressing portion 410 is pushed down (i.e., an open state in which the product is discharged from the discharge port 420). When the pressing portion 410 is pushed down from the state of FIG. 52A to the state of FIG. 52B, the sensor 10 detects the tilt angle tiled from the state of FIG. 52A to the state of FIG. 52B.

Figure 53A:
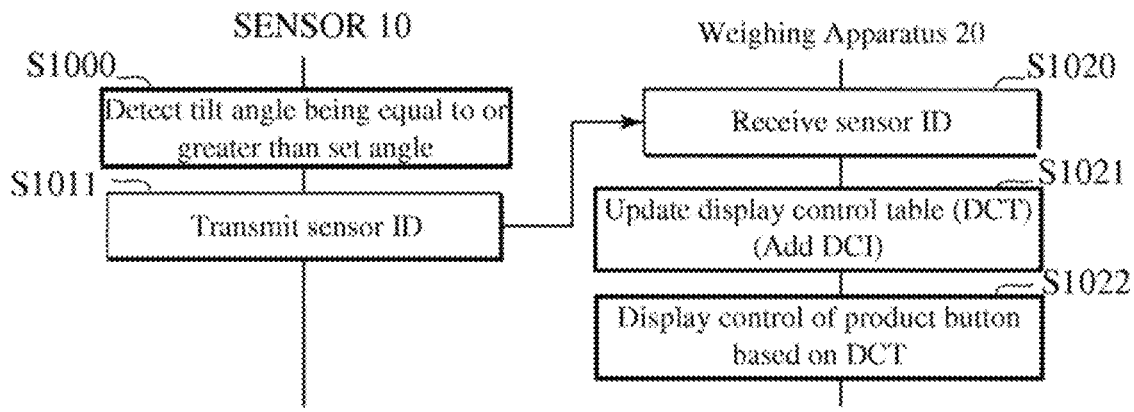
FIGS. 53A-53C are diagrams showing a display control method according to one or more embodiments.
Figure 53B:
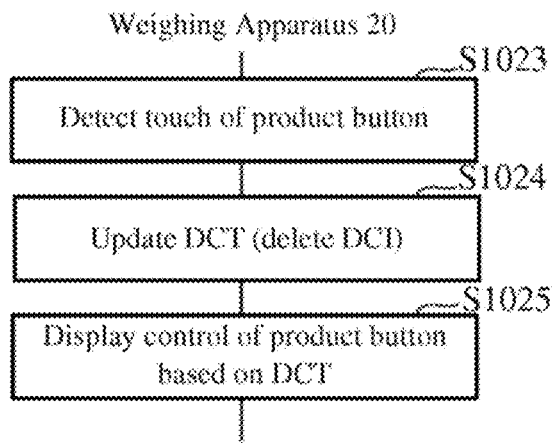
Figure 53C:
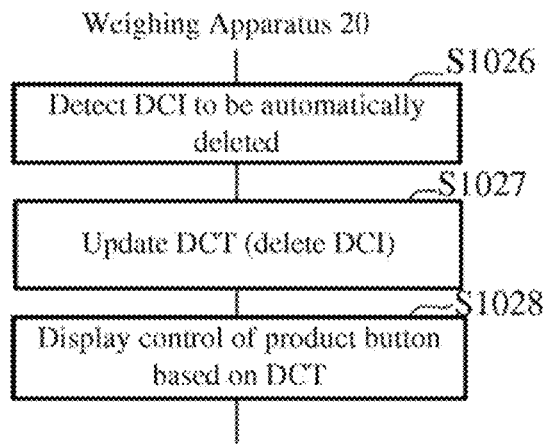

FIGS. 53A, 53B and 53C are diagrams illustrating the display control of the product button. For example, FIG. 53A shows a case where the DCT related to the product button display control in the weighing apparatus 20 is updated when the sensor 10 detects that the tilt angle is equal to or greater than the set angle.

At step S1000, the sensor 10 detects that that the tilt angle is equal to or greater than the set angle.

The set angle may be different in each container.

At step S1011, when the sensor 10 that detects that the tilt angle is equal to or greater than the set angle, the sensor 10 transmits the sensor ID of the sensor 10 to the weighing apparatus 20.

At step S1020, the weighing apparatus 20 receives the sensor ID from the sensor 10.

At step S1021, the weighing apparatus 20 updates the DCT. For example, the weighing apparatus 20 adds the DCI corresponding to the received sensor ID to the DCT.

At step S1022, the weighing apparatus 20 performs the display control of the product button based on the DCT.

Thus, the product sales data processing system 1 according to one or more embodiments includes the sensor 10 attached to the bulk food container 300 or 400 of a product (e.g., bulk food), and the weighing apparatus 20. The sensor 10 detects displacement (e.g., tilt or rotation) of the sensor 10 and stores the sensor ID of the sensor 10. The sensor 10 further transmits the sensor ID to the weighing apparatus 20 when the sensor 10 detects a predetermined displacement value (e.g., when the sensor 10 detects the tilt angle being equal to or greater than the set angle). The weighing apparatus 20 receives the sensor ID transmitted from the sensor 10 and causes the touch display 26 to display product information associated with the sensor ID. The product information may be a product button corresponding to the product contained in the bulk food container 300 or 400.

As a result, even if the grocery store applies a self-checkout system, the product sales data processing system 1 can specify the product properly and efficiently, and display the specified product without customer's operation.

FIG. 53A shows the operation of the sensor 10 and the weighing apparatus 20 when the sensor 10 detects that the tilt angle is equal to or greater than the set angle, the sensor 10 or when the sensor 10 detects the operation of the operation button 13.

FIG. 53B shows a case where the DCT in the weighing apparatus 20 is updated based on the operation of the product button.

At step S1023, the weighing apparatus 20 detects the touch of the product button displayed on the touch display 26.

At step S1024, the weighing apparatus 20 updates the DCT. For example, the weighing apparatus 20 deletes the DCI including the product button ID from the DCT.

At step S1025, the weighing apparatus 20 performs the display control of the product button based on the DCT.

FIG. 53C shows a case where the DCT in the weighing apparatus 20 is updated based on the elapse of a predetermined time from the generation of the DCI.

At step S1026, the weighing apparatus 20 detects DCI to be automatically deleted. For example, as shown in FIG. 46, in the DCI, the time after a predetermined time (e.g., 5 minutes in an example of FIG. 46) has elapsed from the reception time is set as the automatic deletion time, so that the weighing apparatus 20 is set to. The DCI that has reached the automatic deletion time is detected in the button DCT.

At step S1027, the weighing apparatus 20 updates the DCT. For example, the weighing apparatus 20 deletes the DCI for which a predetermined time has passed from the time of generation from the DCT.

At step S1028, the weighing apparatus 20 controls the display of the product button based on the DCT.

Figure 54:
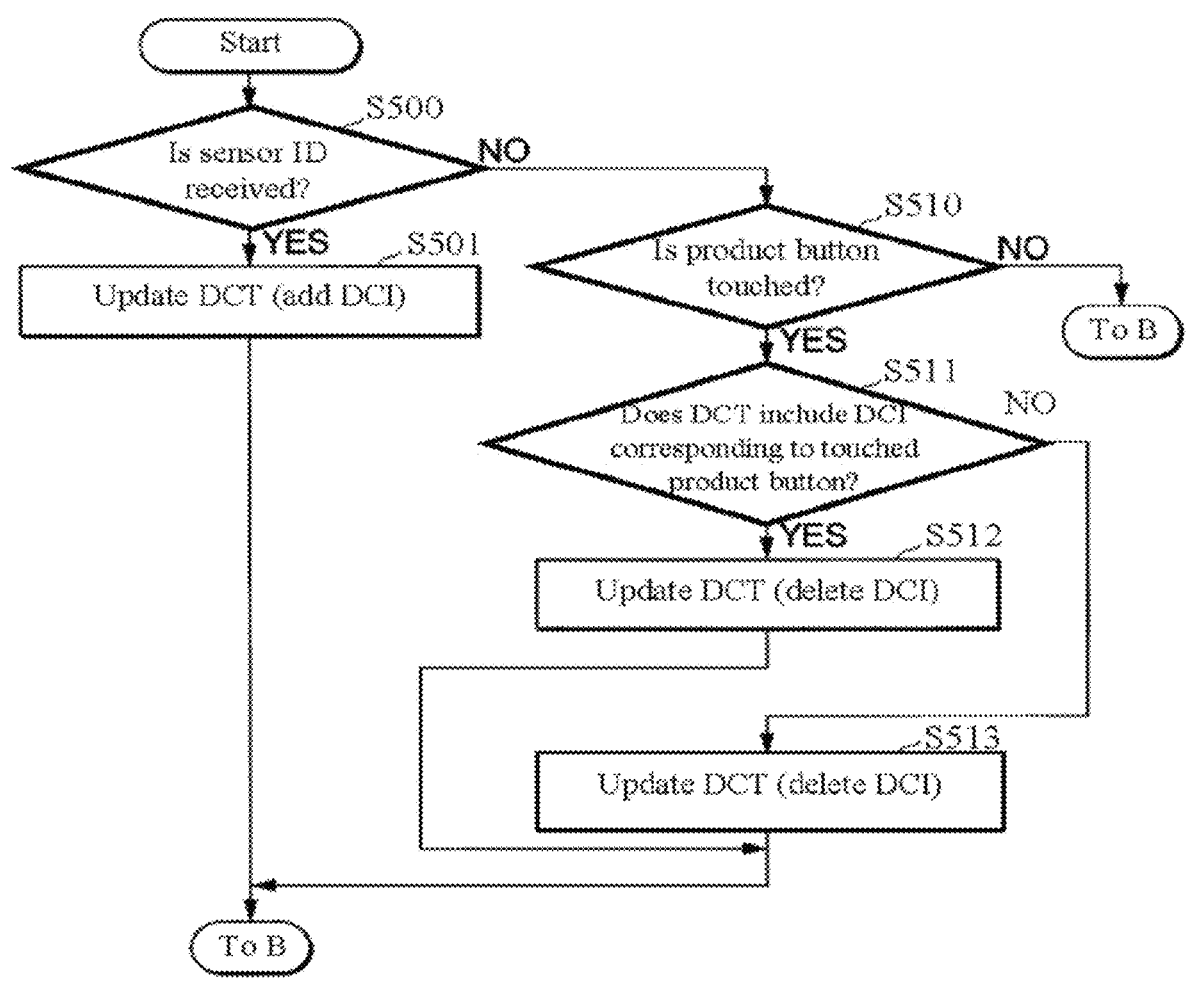
FIG. 54 is a flowchart relating to a display control method according to one or more embodiments.
Figure 55:
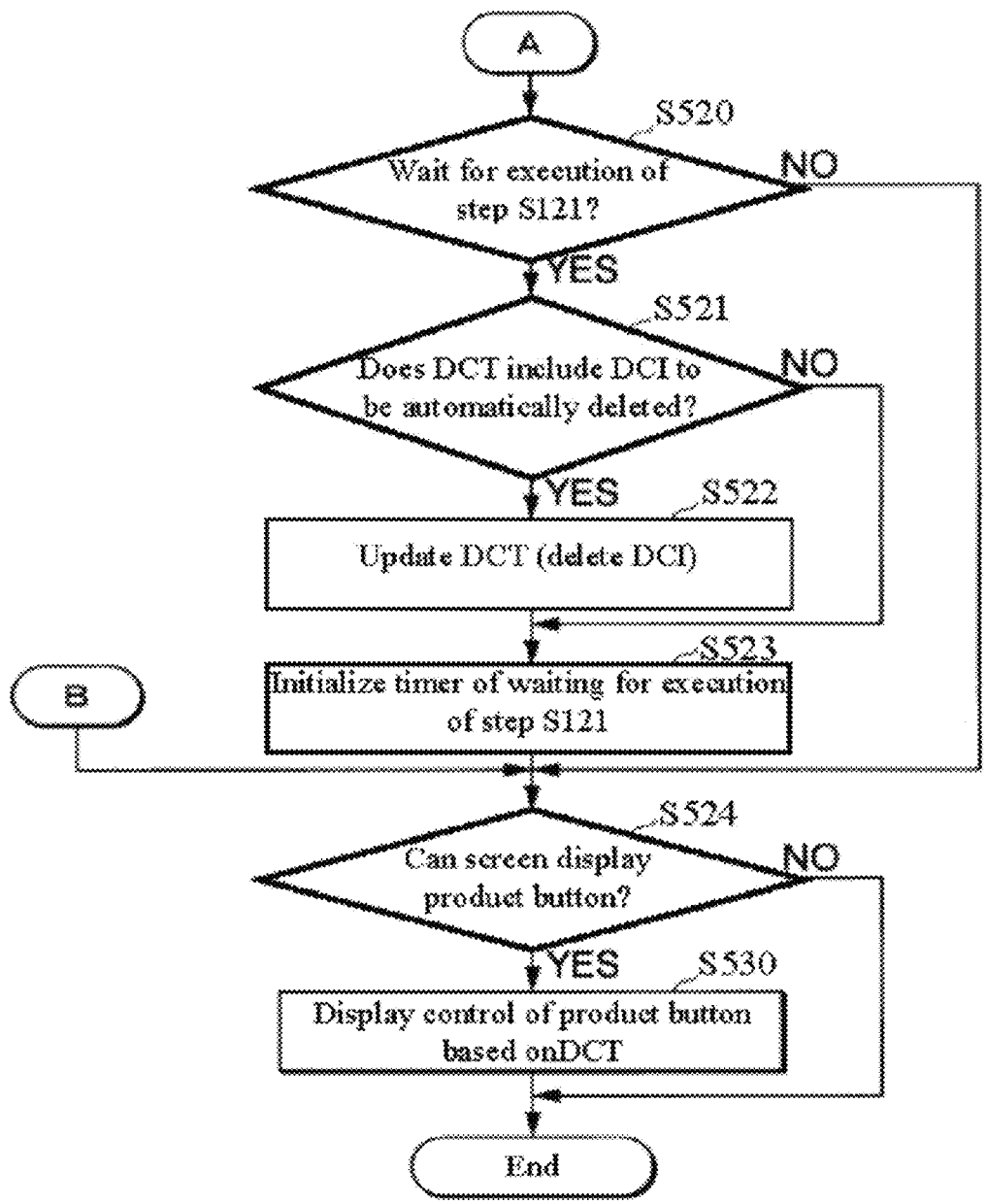
FIG. 55 is a flowchart relating to a display control method according to one or more embodiments.

FIGS. 54 and 55 are flowcharts relating to display control of product buttons.

At step S500 of FIG. 54, the weighing apparatus 20 determines whether the sensor ID has been received. If it is determined that the sensor ID has been received (step S500: YES), the process proceeds to step S501. If it is determined that the sensor ID has not been received (step S500: NO), the process proceeds to step S510.

When the sensor 10 detects the tilt being equal to or greater than the set angle, the sensor 10 transmits the sensor ID of the sensor 10 to the weighing apparatus 20. Further, the sensor 10 may transmit the sensor ID of the sensor 10 to the weighing apparatus 20 when the operation button 13 is operated.

At step S501, the weighing apparatus 20 updates the DCT shown in FIG. 46. For example, the weighing apparatus 20 may add the DCT based on the received sensor ID. Then, the process proceeds to step S524 of FIG. 55.

At step S510, the weighing apparatus 20 determines whether the product button displayed on the touch display 26 has been touched. If the weighing apparatus 20 determines that the product button has been touched (step S510: YES), the process proceeds to step S511. If it is determined that the product button has not been not touched (step S510: NO), the process proceeds to step S520 of FIG. 55.

In step S510, the weighing apparatus 20 determines whether the DCT includes a plurality of product button IDs, which are the same as the product button ID touched at step S510. If it is determined that the DCT includes a plurality of product button IDs (step S510: YES), the process proceeds to step S513. If it is determined that the DCT does not include a plurality of product button IDs (in other words, the DCI includes a single product button ID corresponding to the product button ID of the touched product button) (step S510: NO), the process proceeds to step S512.

At step S512, the weighing apparatus 20 updates the DCT. For example, the weighing apparatus 20 deletes, from the DCT, the DCI including the product button ID corresponding to the product button ID of the touched product button.

At step S513, the weighing apparatus 20 updates the DCT. For example, when there are a plurality of rows including the same product button ID in the DCT, the weighing apparatus 20 deletes, from the plurality of rows, one row including the oldest reception time. Then, the process proceeds to step S524 of FIG. 55.

In step S520, the weighing apparatus 20 determines whether an execution waiting time (for example, 5 seconds) has elapsed. The weighing apparatus 20 may automatically delete the DCI after the execution waiting time has elapsed. If it is determined that the execution waiting time has elapsed (step S520: YES), the process proceeds to step S521. If it is determined that the execution waiting time has not elapsed (step S520: NO), the process proceeds to step S524.

At step S521: the weighing apparatus 20 determines whether the DCI to be automatically deleted exists. If it is determined that the DCI to be automatically deleted exists (step S521: YES), the process proceeds to step S522. If it is determined that the DCI to be automatically deleted does not exist (step S521: NO), the process proceeds to step S523.

At step S522: the weighing apparatus 20 updates the DCT. For example, the weighing apparatus 20 deletes all the DCI that has reached the automatic deletion time from the DCT. Then, the process proceeds to step S523.

At step S523, The weighing apparatus 20 initializes the timer for measuring the execution waiting time used for the processing of step S521. Then, the process proceeds to step S524.

At step S524, the weighing apparatus 20 determines whether the screen displayed on the touch display 26 is a screen capable of displaying the product button. The screen on which the product button can be displayed is a screen for selecting (designating) a product to be weighed (for example, a screen as shown in FIGS. 20B and 20C). If it is determined that the screen can display the product button (step S524: YES), the process proceeds to step S530. If it is determined that the product button is not a displayable screen (step S524: NO), this flowchart ends.

At step S530, the weighing apparatus 20 causes the touch display 26 to display the product button based on the DCT.

FIGS. 56A to 56D shows examples of display control of the product button in the weighing apparatus 20. The right side portion of FIGS. 56A-56D schematically shows the sensor ID and the product button ID stored in the DCT. The left side portion of FIGS. 56A-56D schematically shows one or more product buttons displayed on the touch display 26 corresponding to the right side portion. The touch display 26 displaying the product button transitions in the order of FIG. 56A, FIG. 56B, FIG. 56C, FIG. 56D, FIG. 57A, FIG. 57B, FIG. 57C, and FIG. 57D.

Figure 56A:
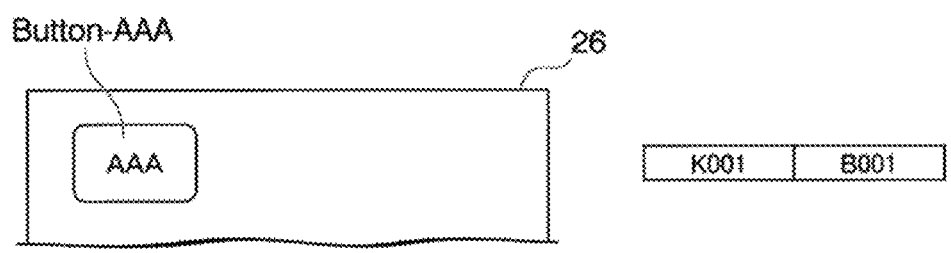
FIGS. 56A-56D are diagrams showing examples of display control by the weighing apparatus according to one or more embodiments.

In FIG. 56A, after the weighing apparatus 20 receives the sensor ID "K001" from the sensor 10 of which the tilt angle is equal to or greater than the set angle, the weighing apparatus 20 specifies the product button ID "B001" corresponding to "K001" using the sensor setting file of FIG. 45. Then, the weighing apparatus 20 stores the sensor ID "K001" and the product button ID "B001" in the DCT. The weighing apparatus 20 specifies the product button image "Button-AAA" corresponding to the product button ID "B001" using the product button setting file of FIG. 5. The weighing apparatus 20 displays the product button image "Button-AAA" on the touch display 26 as shown in FIG. 56A.

Figure 56B:
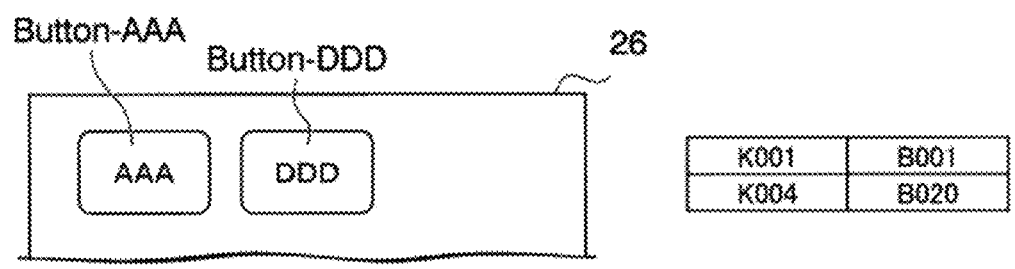

FIG. 56B shows an example where the product button image "Button-DDD" is further displayed on the touch display 26 after the weighing apparatus 20 receives the sensor ID "K004."

Figure 56C:
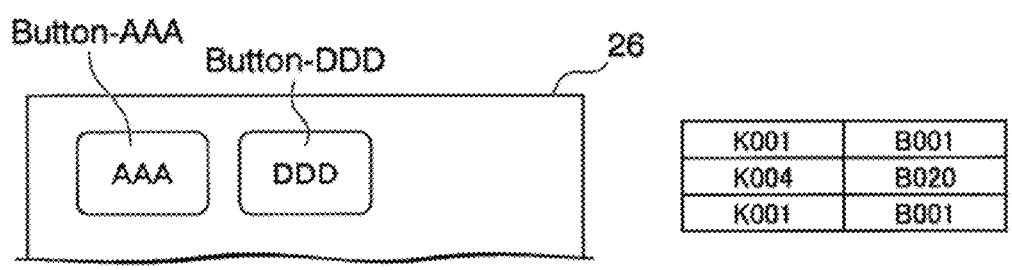
Figure 57A:
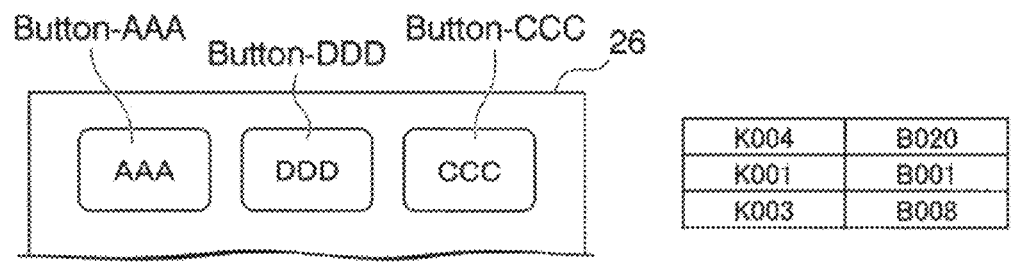
FIGS. 57A-57D are diagrams showing examples of display control by the weighing apparatus according to one or more embodiments.
Figure 57B:
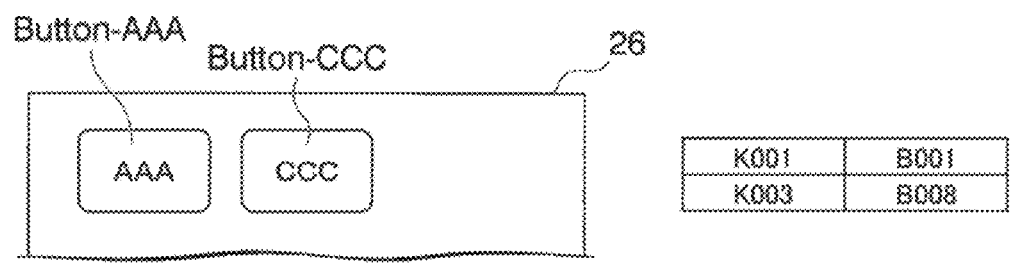

FIG. 56C shows an example where the weighing apparatus 20 receives the sensor ID "K001" after the screen of FIG. 57B is displayed on the touch display 26. In FIG. 56C, the weighing apparatus 20 adds the sensor ID "K001" and the product button ID "B001" to the third row from the top of the DCT. In such a case, the additional product button image "Button-AAA" is not further displayed on the touch display 26.

Figure 56D:
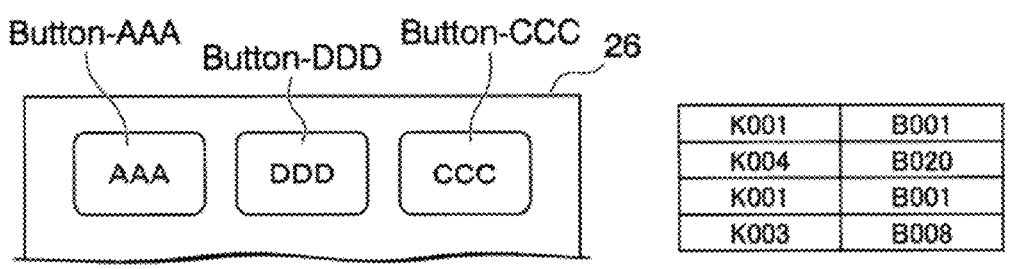

FIG. 56D shows an example where the product button image "Button-CCC" is further displayed on the touch display 26 after the weighing apparatus 20 receives the sensor ID "K003."

As shown in FIG. 57A, when the product button image "Button-AAA" is touched on the screen of FIG. 56D, the weighing apparatus 20 delete, from the DCT, the DCI including the oldest one of the two product button IDs "B001" associated with the product button image "Button-AAA."

FIG. 57B shows an example where the product button image "Button-DDD" is touched on the screen of FIG. 57A.

As shown in FIG. 57B, when the product button image "Button-DDD" is touched on the screen of FIG. 57A, the weighing apparatus 20 delete, from the DCT, the DCI including the product button ID "B020" associated with the product button image "Button-DDD." After the DCI including the product button ID "B020" from the DCT, the weighing apparatus 20 does not cause the touch display 26 to display the product button image "Button-DDD."

Figure 57C:
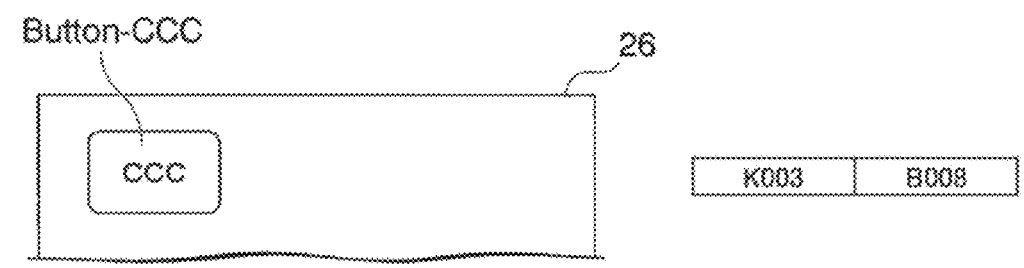

As shown in FIG. 57C, when the product button image "Button-AAA" is touched on the screen of FIG. 57B, the weighing apparatus 20 delete, from the DCT, the DCI including the product button ID "B001" associated with the product button image "Button-AAA." After the DCI including the product button ID "B001" from the DCT, the weighing apparatus 20 does not cause the touch display 26 to display the product button image "Button-AAA."

Figure 57D:
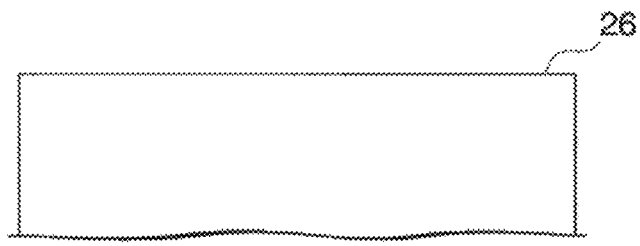

FIG. 57D shows an example where the DCI including the product button ID "B008" is automatically deleted from the DCT. In FIG. 57D, after the DCI including the product button ID "B008" from the DCT, the weighing apparatus 20 does not cause the touch display 26 to display the product button image "Button-CCC."

Figure 58A:
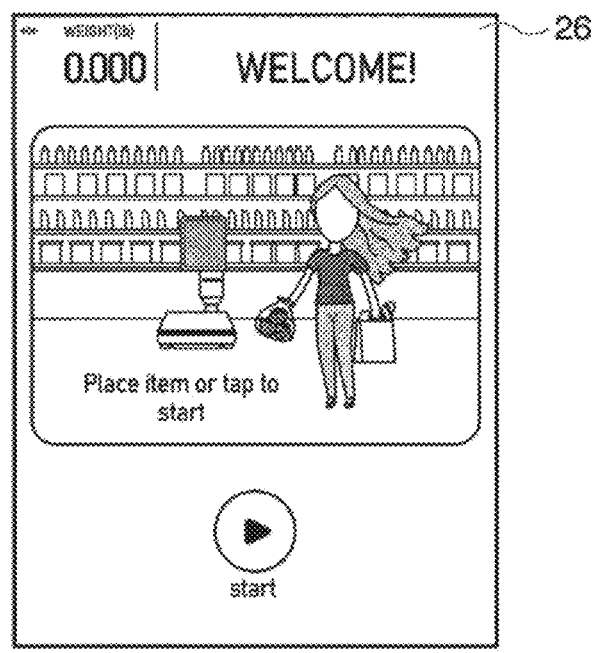
FIGS. 58A-58F are diagrams showing examples of screens displayed in the weighing apparatus according to one or more embodiments.
Figure 58B:
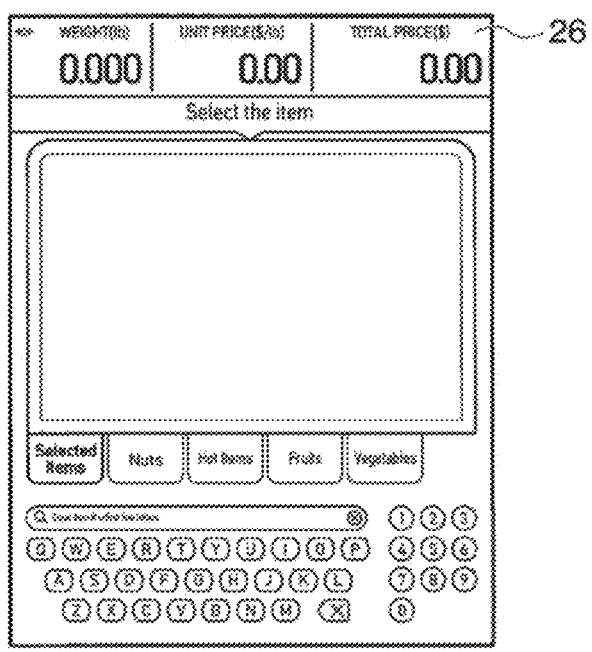
Figure 58C:
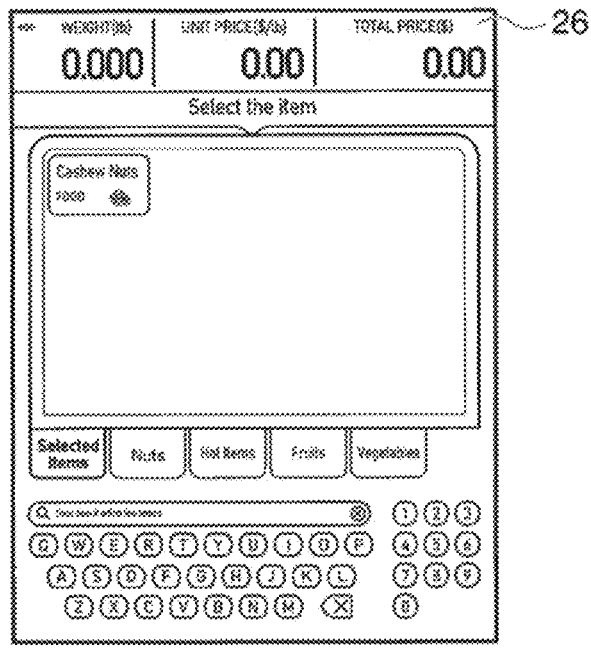
Figure 58D:
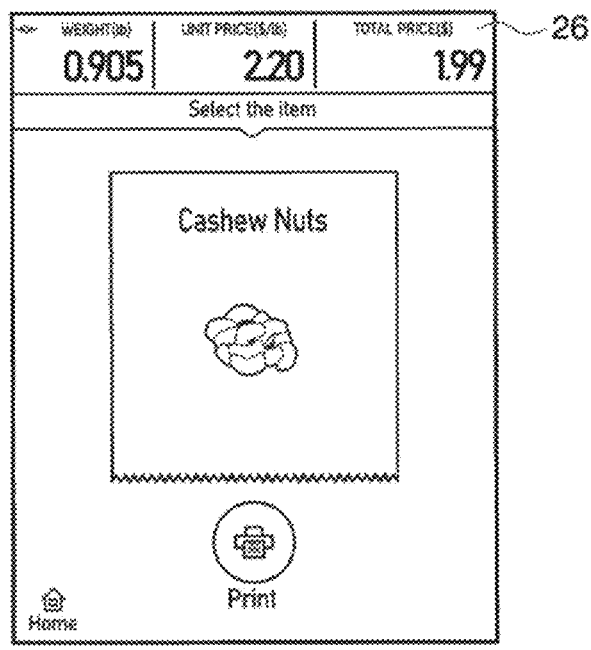
Figure 58E:
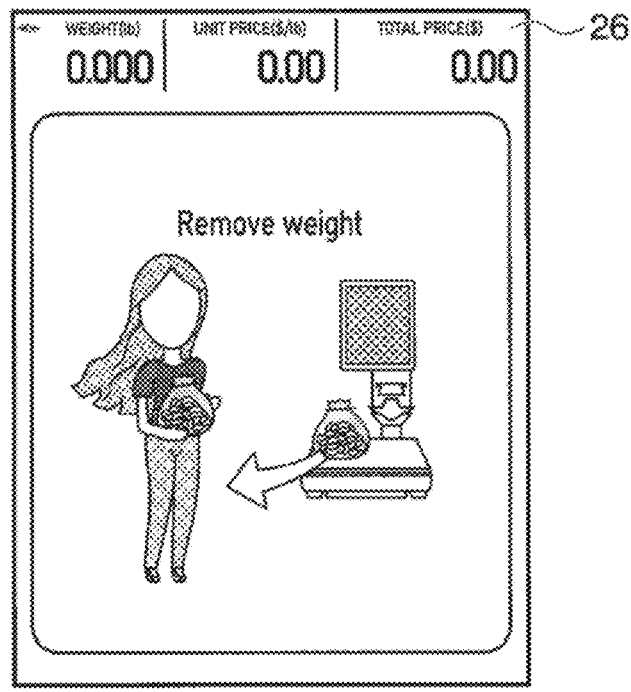
Figure 58F:
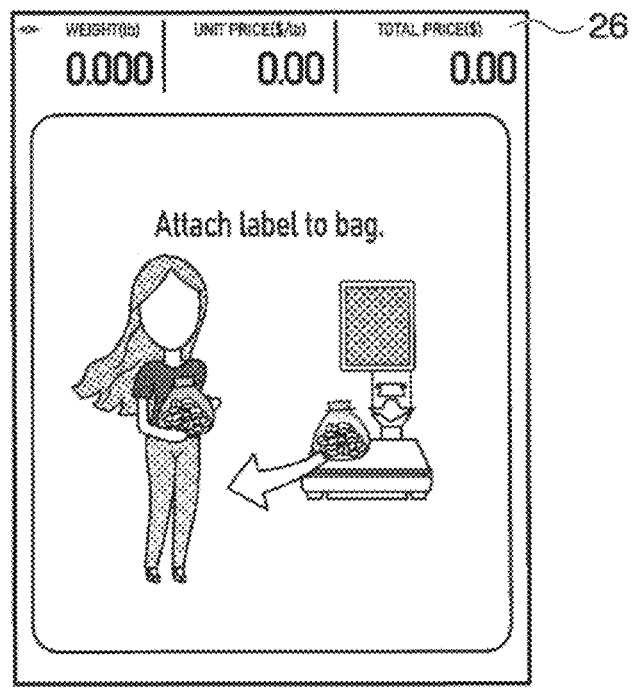

FIGS. 58A to 58F show examples of screens displayed on the touch display 26 of the weighing apparatus 20. FIG. 58A is an example of an initial screen of the weighing apparatus 20. FIGS. 58B and 59C show examples of product selection screens for selecting and searching for the product to be weighed. FIG. 58B is a product selection screen in which the product button is not displayed. FIG. 58C is a product selection screen displaying a product button. FIG. 58D is an example of a label issuing screen after weighing the product. FIGS. 58E and 59F show examples of announcement screens after label issuance.

Among the products sold by weight, products sold by weight using the sensor 10 (products sold by weight stored in containers 300, 400, etc. in which the sensor 10 is disposed, for example, nuts) and products sold by weight not using the sensor 10 (products sold by weight not stored in the container). For example, it is assumed that there is a large-sized product such as a watermelon).

The weighing apparatus 20 displays the initial screen of FIG. 58A when the weighing apparatus 20 is not operated by the user (e.g., customer). The weighing apparatus 20 displays the product selection screen of FIG. 58B or FIG. 58C when a start button has been touched on the initial screen of FIG. 58A.

At the top of the product selection screen, there is an area for displaying a weight, an unit weight, and a total price. A virtual keyboard and a virtual numeric keypad are displayed at the bottom of the product selection screen. An area for displaying a product button (product button area) is disposed in a center of the product selection screen. The product buttons displayed in the product button area can be switched by tabs. The tabs "Nuts", "Hot Items", "Fruits", and "Vegetables" are tabs related to their respective products. When the tab "Nuts" is selected, the product buttons of all the products contained in the nuts are listed in the product button area. The same applies when the tab "Hot Items", the tab "Fruits", and the tab "Vegetables" are selected. The tab "Selected Items" is a tab related to the product selected by the customer. When the tab "Selected Items" is selected, the product button of the product based on the detection result of the sensor 10, that is, the product button of the product selected by the customer is displayed in the product button area. That is, the product button displayed by the tab "Selected Items" is a part of the product button of all products.

The weighing apparatus 20 is displayed on the initial screen of FIG. 58A when at least one row of the DCI is stored in the DCT when the weighing apparatus 20 is not operated. Instead, the product selection screen of FIG. 58C may be displayed.

A customer who purchases a product sold by weight (e.g., nuts) using the sensor 10 touches one product button, which is a product to be weighed, on the product selection screen (product selection screen of FIG. 58C). The customer places the product to be weighed, which corresponds to the touched product button, on the weighing platform 25a. The weighing apparatus 20 weighs the products placed on the weighing platform 25a and refers to the product file of FIG. 4 to set the price according to the weighing value of the product to be weighed. Then, the weighing apparatus 20 calculates the total price and display the total price on the touch display 26. The customer confirms the price, and performs an operation for issuing the label by touching the print button of FIG. 58D. The weighing apparatus 20 issues the label based on the customer's operations. Further, the weighing apparatus 20 displays an announcement screen shown in FIGS. 58E and 59F after issuing the label. The customer unloads the relevant product from the weighing platform 25a and affixes the label issued by the weighing apparatus 20 to the relevant product or packaging of the relevant product.

In one or more embodiments, the timer for measuring the execution waiting time in FIGS. 55 and 56 may be initialized at least when the weighing apparatus 20 receives the sensor ID or when the product button has been touched.

Further, in the above, the weighing apparatus 20 is determined regardless of whether the sensor 10 detects the tilt of the set angle or more (determined by the angle determination unit 102) or the operation button 13 is operated. An example of executing the same process (processing of adding one DCI including the sensor ID of the sensor 10 to the DCT) without distinguishing between the two has been described. However, the processing by the weighing apparatus 20 may be different depending on whether the sensor 10 detects the tilt of the set angle or more and the operation button 13 is operated. For example, when the sensor 10 transmits the sensor ID of the sensor 10 to the weighing apparatus 20, the sensor 10 transmits information capable of identifying whether the tilt of the set angle or more is detected or the operation button 13 is operated. (When the tilt of the set angle or more is detected, the value "1" is transmitted as transmission classification information together with the sensor ID of the sensor 10, and when the operation button 13 is operated, the sensor ID of the sensor 10 is performed. The value "2" is transmitted as the transmission classification information together with the information), and the weighing apparatus 20 may have different display control of the product button, for example, depending on the value of the above identifiable information (transmission classification information) . . . . As an example, the weighing apparatus 20 is set according to the value of the transmission classification information. The display mode may be different. As another example, the weighing apparatus 20 may have a different time until automatic erasing (that is, a time that continues to be displayed even if there is no operation) depending on the value of the transmission classification information.

In one or more embodiments, information may be added to the product button. For example, information that shows the passage of time may be displayed for each product button. For example, the product button of the product is displayed on the weighing apparatus 20 based on the fact that the sensor 10 attached to the container containing the product detects the tilt of the set angle or more. A number related to the passage of time may be displayed in association with the product button (for example, overlaid on a part of the product button or in the vicinity of the button). For example, a number that counts down the remaining time until the automatic deletion time (for example, a number that counts down in seconds) may be displayed. The countdown of the remaining time may be based on the time when the tilt is detected. For example, when the hidden product button is newly displayed (the DCI including the product button ID of the product button does not exist in the DCT). When one DCI including the product button ID of the product button is added to the DCT from the state), the time (300 seconds) until the automatic deletion time is maximized. When the countdown is started as a value and the product button is continuously displayed even after the displayed product button has been touched (DCI including the product button ID of the product button in the DCT). When deleting one item of DCI including the item button ID of the product button from the state where there are multiple items), it is touched from the time until the automatic deletion time (300 seconds). The countdown may be started with the maximum value obtained by subtracting the elapsed time until the time is reached. In other words, when the product button that was displayed on the back of the same type of product button is displayed on the front, when it is displayed on the front, it counts down from the number obtained by subtracting the elapsed time when it was displayed on the back. May start. The countdown may be started when the remaining time until the automatic erasure time is less than (or less than) a predetermined time. Further, the display may be performed every 5 seconds or every 10 seconds instead of the display in seconds. Further, the remaining time may be displayed by something like a meter.

In the above examples, when the sensor 10 is tilted by the set angle or more, one DCI including the sensor ID of the sensor 10 is always added to the DCT. did. That is, an example has been described in which the number of times the product button of the product corresponding to the sensor 10 is displayed is counted up every time the sensor 10 is tilted by the set angle or more. On the other hand, even when the sensor 10 is tilted by a set angle or more, the number of times the product button of the product corresponding to the sensor 10 is displayed may not be counted up. As the mounting method, control by the sensor 10 and control by the weighing apparatus 20 can be considered as described below.

(Example of Control by Sensor 10)

The sensor 10 does not transmit the sensor ID again within a predetermined time (for example, about 10 seconds) after transmitting the sensor ID. For example, the sensor 10 may not transmit the sensor ID within a predetermined time after the transmission of the sensor ID, even if it determines that the tilt of the set angle or more is detected. Alternatively, it may not be possible to determine whether the tilt equal to or greater than the set angle has been detected. The above-mentioned predetermined time may be managed (stored) as a threshold value.

(Example of Control by the Weighing Apparatus 20)

The weighing apparatus 20 is set to ignore even if the same sensor ID is received again within a predetermined time (for example, about 10 seconds) after receiving the sensor ID. For example, the weighing apparatus 20 receives sensor ID from a certain sensor 10 and adds one DCI including the sensor ID of the sensor 10 to the DCT. Even if the sensor ID is received from the sensor 10 again within the predetermined time, the DCI including the sensor ID of the sensor 10 is not added to the DCT. You may do so. The above-mentioned predetermined time may be managed (stored) as a threshold value.

According to the above-mentioned control, when a certain container is opened and closed a plurality of times in a short time, the number of times the product button of the product contained in the container is displayed can be prevented from being counted up more than necessary. That is, when the detection interval is short and the food is not actually taken out from the container a plurality of times, it is possible to prevent the product button from being displayed more than necessary. As an example, if the lid is opened and closed, but the lid is opened again to buy immediately, the count can be set to 1 instead of 2. In addition, it is assumed that products are added or returned in order to adjust the weight (price), but such a screen can be dealt with by adjusting the predetermined time. The above-mentioned predetermined time may be different depending on the container type. In addition, the control may be performed in a specific container.

Further, the transmission of the sensor ID may be controlled by the time when the tilt is detected instead of or in addition to the number of times the tilt is detected. For example, if the detection time for detecting the tilt greater than or equal to the set angle (which may be the tilt including less than the set angle) is longer than a predetermined time, it is counted, and if the detection time is less than a predetermined time, it is not counted. It may be. For example, the sensor 10 may transmit the sensor ID when the detection time reaches a predetermined time (when the detection is continuously performed for a predetermined time). As a result, if the hand slips, or if the purchase is decided to be stopped immediately and the product is returned immediately, no count can be obtained.

In one or more embodiments, the product sales data processing system 1 may include two or more the weighing apparatus 20. When the weighing apparatus 20 is two or more, the product button may be displayed in the same manner on any of the weighing apparatus 20. That is, when a certain weighing apparatus 20 displays, for example, the product A button and the product button of the product BBB, the product A button and the product BBB are displayed in the other weighing apparatus 20.

The program for realizing the weighing apparatus 20 or the like described above may be recorded on a computer-readable recording medium, and the program may be read into a computer system and executed. The term "computer system" as used herein includes hardware such as an OS and peripheral devices. Further, the "computer-readable recording medium" refers to a portable medium such as a flexible disk, a magneto-optical disk, a ROM, or a CD-ROM, or a storage device such as a hard disk built in a computer system. Furthermore, a "computer-readable recording medium" is a volatile memory (RAM) inside a computer system that serves as a server or client when a program is transmitted via a network such as the Internet or a communication line such as a telephone line. In addition, it shall include those that hold the program for a certain period of time. Further, the program may be transmitted from a computer system in which this program is stored in a storage device or the like to another computer system via a transmission medium or by a transmission wave in the transmission medium. Here, the "transmission medium" for transmitting a program refers to a medium having a function of transmitting information, such as a network (communication network) such as the Internet or a communication line (communication line) such as a telephone line. Further, the above program may be for realizing a part of the above-mentioned functions. Further, a so-called difference file (difference program) may be used, which can realize the above-mentioned functions in combination with a program already recorded in the computer system.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A product sales data processing system comprising:
   a sensor attached to a bulk food container of a product and that comprises:
   a sensor module that detects a change of a tilt angle or a rotation angle of the sensor;
   a processor that determines whether the tilt angle or the rotation angle is equal to or greater than a predetermined value;
   a memory that stores a sensor ID that identifies the sensor; and
   a transmitter that transmits the sensor ID stored in the memory after the processor of the sensor determines that the tilt angle or the rotation angle is equal to or greater than the predetermined value; and
   a weighing apparatus that comprises:
   a receiver that receives the sensor ID transmitted from the sensor; and
   a display that:
   is a touch display that receives a user operation, and displays product information associated with the sensor ID, the product information including a product button that receives a user operation to specify the product as a weighing object.

2. The product sales data processing system according to claim 1, wherein the sensor is attached to a lid of the container to be opened and closed or a lever used to open and close the container.

3. The product sales data processing system according to claim 1, wherein
the processor of the sensor measures time during which the change of the tilt angle or the rotation angle is detected by the sensor module, and
the transmitter transmits the sensor ID after the measured time reaches a predetermined time.

4. The product sales data processing system according to claim 1, wherein after the receiver receives the sensor ID of the same sensor a plurality of times within a predetermined period, the display displays the product information associated with the sensor ID once.

5. The product sales data processing system according to claim 1, wherein
the weighing apparatus comprises:
a weighing scale that measures a tare weight that is a weight of a container owned by a user when the container is empty; and
a reader/writer that writes the tare weight to a non-contact IC medium attached to a label, and
the display displays that the writing of the tare weight has been completed.

6. The product sales data processing system according to claim 1, wherein
the weighing apparatus comprises:
a weighing scale that measures a tare weight that is a weight of the container when the container is empty;
a reader/writer that writes the tare weight to a non-contact IC medium attached to a label; and
a printer that prints the label with the non-contact IC medium on which the tare weight is written and issues the printed label, and
the reader/writer writes the tare weight to the non-contact IC medium before the printer issues the printed label.

7. The product sales data processing system according to claim 1, wherein
the weighing apparatus comprises:
a weighing scale that measures a gross weight that is a weight of the container that contains the product;
a reader/writer that reads, from a non-contact IC medium attached to a label, a tare weight that is a weight of the container when the container is empty; and
a processor that calculates a net weight that is a weight of the product contained in the container, wherein
the processor of the weighing apparatus:
upon determining that the reader/writer reads the tare weight, calculates the net weight based on the gross weight and the tare weight; and
upon determining that the reader/writer does not read the tare weight, determines a tare weight based on the user operation, and calculates the net weight based on the gross weight and the tare weight determined based on the user operation.

8. The product sales data processing system according to claim 7, wherein
the display receives a first user operation to select, from a plurality of types of containers, a type,
the plurality of types of containers have different tare weights, respectively, and
upon determining that the reader/writer does not read the tare weight, the processor of the weighing apparatus calculates the net weight based on the gross weight and a tare weight of the selected type.

9. The product sales data processing system according to claim 7, wherein
the processor of the weighing apparatus determines a predetermined ratio to the gross weight as a tare weight, and
upon determining that the reader/writer does not read the tare weight, the processor of the weighing apparatus calculates the net weight based on the gross weight and the determined tare weight.

10. The product sales data processing system according to claim 7, wherein the reader/writer reads the tare weight after the processor of the weighing apparatus determines that the container is placed on a weighing platform of the weighing scale.

11. The product sales data processing system according to claim 7, wherein the reader/writer reads the tare weight after the processor of the weighing apparatus specifies the product.

12. The product sales data processing system according to claim 7, wherein
the display receives a second user operation to select whether a tare weight can be read from the container by the reader/writer, and
the reader/writer reads the tare weight based on the reception of the second user operation.

13. A weighing apparatus comprising:
a weighing scale that comprises a weighing platform on which a container owned by a user is placed and that measures a tare weight that is a weight of the container owned by a user when the container is empty;
a reader/writer that writes the tare weight to a non-contact IC medium attached to a label;
a processor that registers, after the writing of the tare weight has been completed, the container owned by the user as a reusable container; and
a display that displays a message indicating that the writing of the tare weight has been completed and a message prompting the user to take the container owned by the user from the weighing platform.

14. The weighing apparatus according to claim 13, further comprising:
a printer that prints the label with the non-contact IC medium on which the tare weight is written and issues the printed label, wherein
the reader/writer writes the tare weight to the non-contact IC medium before the printer issues the printed label.

15. The weighing apparatus according to claim 13, wherein
the processor calculates a net weight that is a weight of a product contained in the container,
the weighing scale measures a gross weight that is a weight of the container that contains the product,
the display is a touch display that receives a user operation, and
the processor:
upon determining that the reader/writer reads the tare weight, calculates the net weight based on the gross weight and the tare weight; and
upon determining that the reader/writer does not read the tare weight, determines a tare weight based on the user operation, and calculates the net weight based on the gross weight and the tare weight determined based on the user operation.

16. The weighing apparatus according to claim 15, further comprising:

the display receives a first user operation to select, from a plurality of types of containers, a type, the plurality of types of containers have different tare weights, respectively, and upon determining that the reader/writer does not read the tare weight, the processor calculates the net weight based on the gross weight and a tare weight of the selected type.

17. The weighing apparatus according to claim 15, further comprising:

the processor determines a predetermined ratio to the gross weight as a tare weight, and upon determining that the reader/writer does not read the tare weight, the processor calculates the net weight based on the gross weight and the determined tare weight.

18. The weighing apparatus according to claim 15, wherein the reader/writer reads the tare weight after the processor determines that the container is placed on the weighing platform.

19. The weighing apparatus according to claim 15, wherein the reader/writer reads the tare weight after the processor specifies the product.

20. The weighing apparatus according to claim 15, wherein the display receives a second user operation to select whether a tare weight can be read from the container by the reader/writer, and the reader/writer reads the tare weight based on the reception of the second user operation.

\* \* \* \* \*